United States Patent
Wikswo et al.

(10) Patent No.: US 10,876,942 B2
(45) Date of Patent: Dec. 29, 2020

(54) DEVICES AND METHODS FOR TENSION MEASUREMENTS AND APPLICATIONS OF SAME

(71) Applicant: VANDERBILT UNIVERSITY, Nashville, TN (US)

(72) Inventors: John P. Wikswo, Brentwood, TN (US); Philip C. Samson, Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 0 days.

(21) Appl. No.: 16/935,457

(22) Filed: Jul. 22, 2020

(65) Prior Publication Data
US 2020/0348218 A1 Nov. 5, 2020

Related U.S. Application Data

(62) Division of application No. 16/064,151, filed as application No. PCT/US2017/013816 on Jan. 17, 2017, now Pat. No. 10,761,001.

(60) Provisional application No. 62/279,389, filed on Jan. 15, 2016.

(51) Int. Cl.
| | |
|---|---|
| *G01N 3/20* | (2006.01) |
| *G02B 21/00* | (2006.01) |
| *G02B 21/08* | (2006.01) |
| *G02B 21/26* | (2006.01) |
| *G02B 21/36* | (2006.01) |
| *G01L 5/04* | (2006.01) |

(52) U.S. Cl.
CPC ........... *G01N 3/20* (2013.01); *G02B 21/0004* (2013.01); *G02B 21/08* (2013.01); *G02B 21/26* (2013.01); *G02B 21/365* (2013.01); *G01L 5/04* (2013.01); *G01N 2203/0089* (2013.01); *G01N 2203/0094* (2013.01); *G01N 2203/028* (2013.01); *G01N 2203/0647* (2013.01)

(58) Field of Classification Search
CPC ............... G01N 3/20; G01N 2203/028; G01N 2203/0647; G01N 2203/0089; G01N 2203/0094; G02B 21/0004; G02B 21/08; G02B 21/26; G02B 21/365; G01L 5/04
See application file for complete search history.

(56) References Cited

U.S. PATENT DOCUMENTS

| | | | | |
|---|---|---|---|---|
| 5,861,624 A * | 1/1999 | Alexander | ............. | G01Q 60/38 850/6 |
| 7,958,790 B2 * | 6/2011 | Gleghorn | ................ | G01L 1/044 73/862.632 |

(Continued)

FOREIGN PATENT DOCUMENTS

| | | | | |
|---|---|---|---|---|
| WO | WO-2004011084 A1 * | 2/2004 | ........... | A61N 1/0472 |
| WO | WO-2013090738 A1 * | 6/2013 | ............... | G01N 3/08 |

*Primary Examiner* — Jonathan M Dunlap
(74) *Attorney, Agent, or Firm* — Locke Lord LLP; Tim Tingkang Xia, Esq.

(57) ABSTRACT

A system for applying and measuring tensions of a plurality of bio-object constructs includes a base; and a flexible body disposed on the base, wherein the flexible body defines a plurality of construct holes for accommodating the plurality of bio-object constructs, such that when the flexible body is bent, the bending of the flexible body causes tensions to be applied to the plurality of bio-object constructs, thereby causing displacements of the plurality of bio-object constructs.

9 Claims, 75 Drawing Sheets

(56) References Cited

U.S. PATENT DOCUMENTS

| | | | | |
|---|---|---|---|---|
| 8,499,645 B2* | 8/2013 | Chasiotis | ............ | D01D 5/0007 |
| | | | | 73/789 |
| 8,984,966 B2* | 3/2015 | Beyeler | ................ | G01L 5/0057 |
| | | | | 73/862.626 |
| 9,046,548 B2* | 6/2015 | Beyeler | .................. | G02B 21/32 |
| 2012/0186365 A1* | 7/2012 | Beyeler | ................ | B81C 99/003 |
| | | | | 73/862.541 |
| 2012/0271555 A1* | 10/2012 | Levental | ............. | A61B 5/0057 |
| | | | | 702/19 |
| 2013/0212749 A1* | 8/2013 | Watanabe | ............. | G01Q 10/04 |
| | | | | 850/4 |
| 2014/0004345 A1* | 1/2014 | Chasiotis | ................ | D02G 3/22 |
| | | | | 428/399 |
| 2014/0230576 A1* | 8/2014 | Beyeler | .................. | G01L 1/148 |
| | | | | 73/862.626 |
| 2015/0338248 A1* | 11/2015 | Kalelkar | ................ | G01N 11/16 |
| | | | | 73/862.624 |
| 2020/0129270 A1* | 4/2020 | Hofmann | ................ | A61C 7/08 |

* cited by examiner

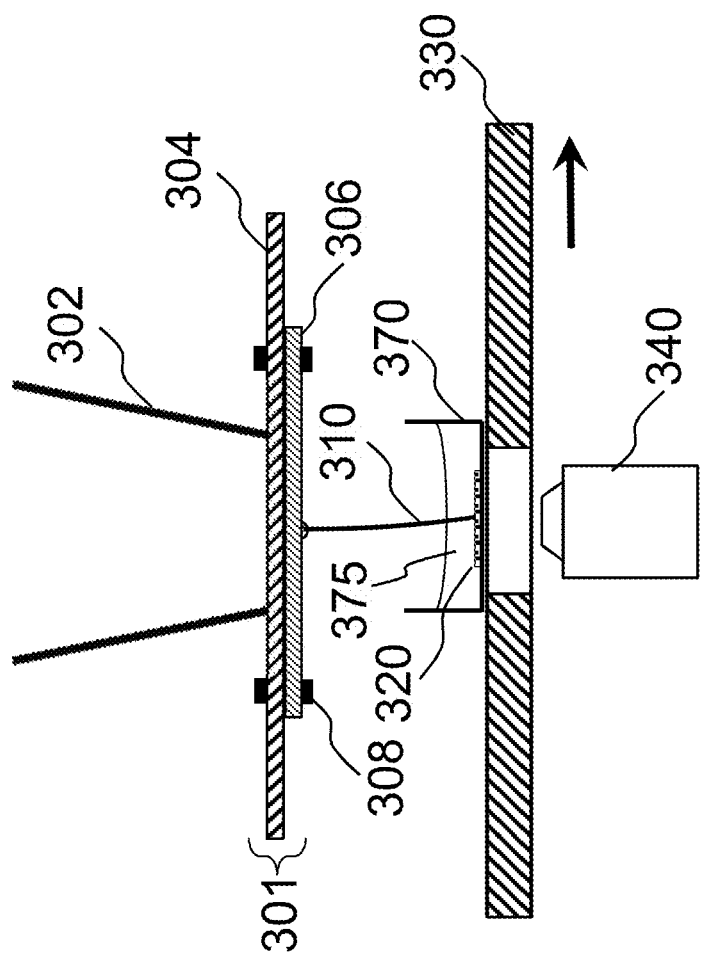

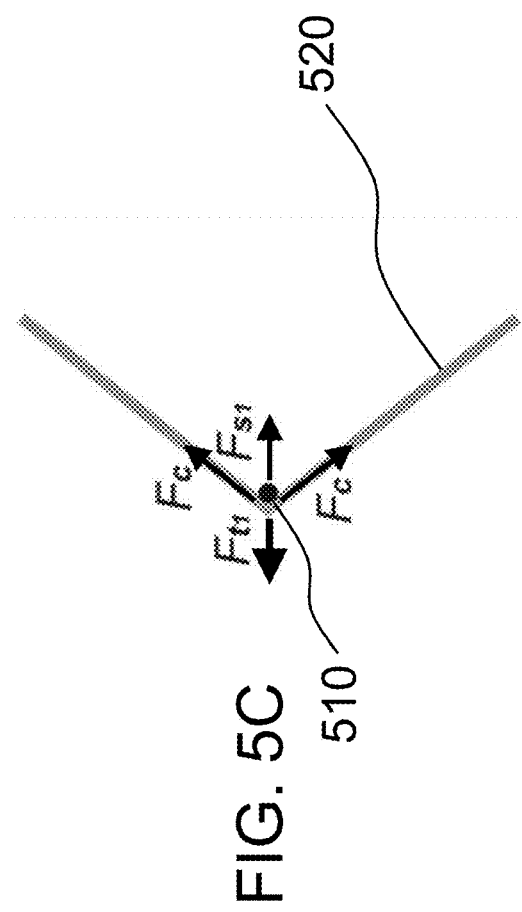
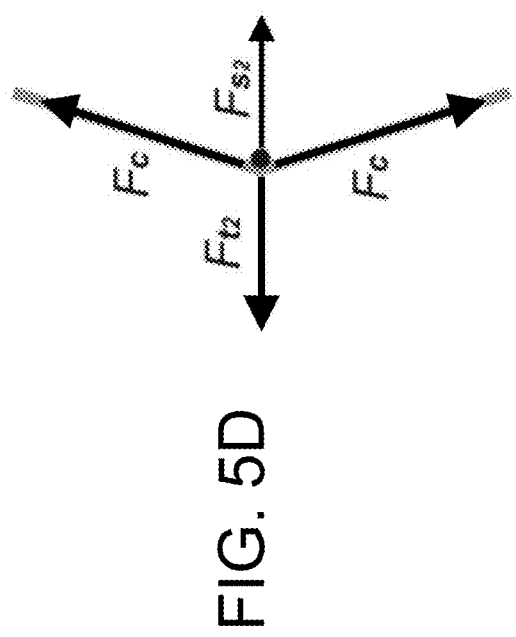
FIG. 5C
FIG. 5D

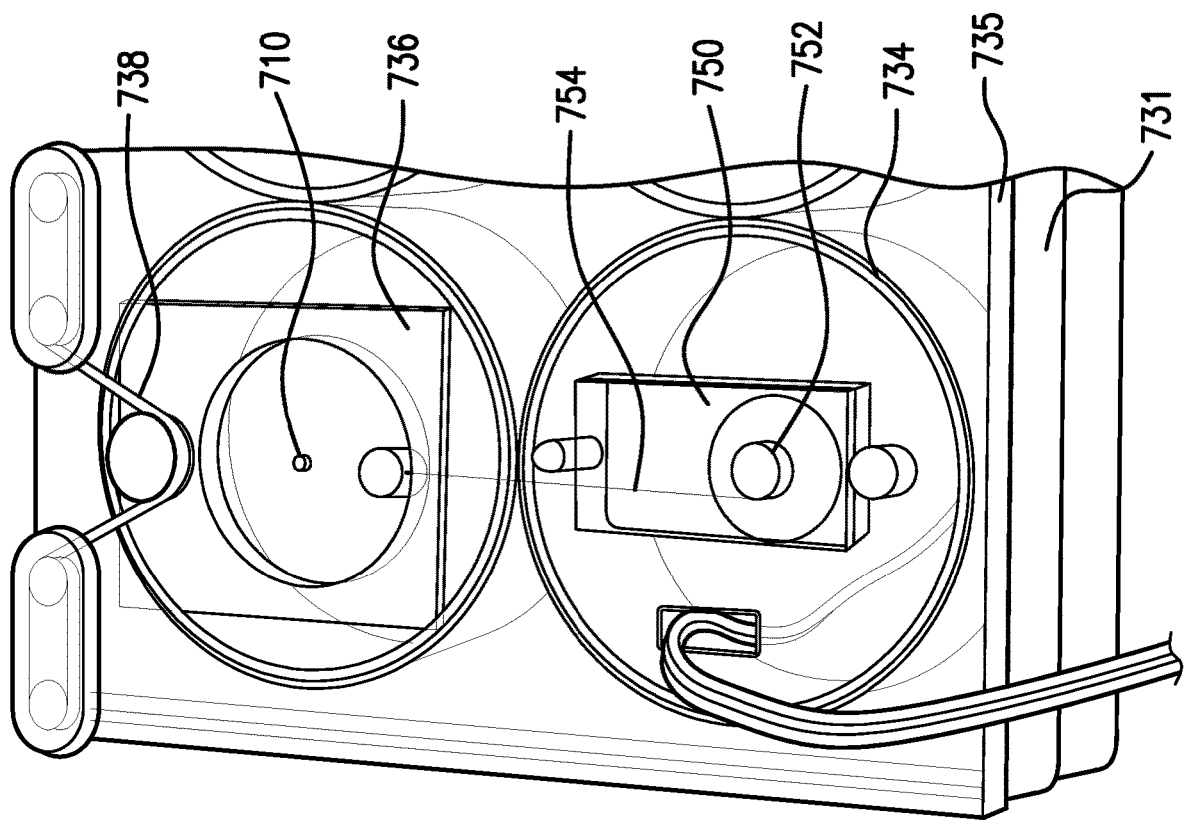

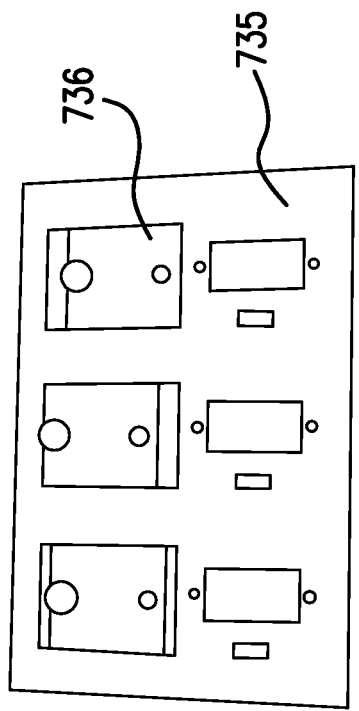
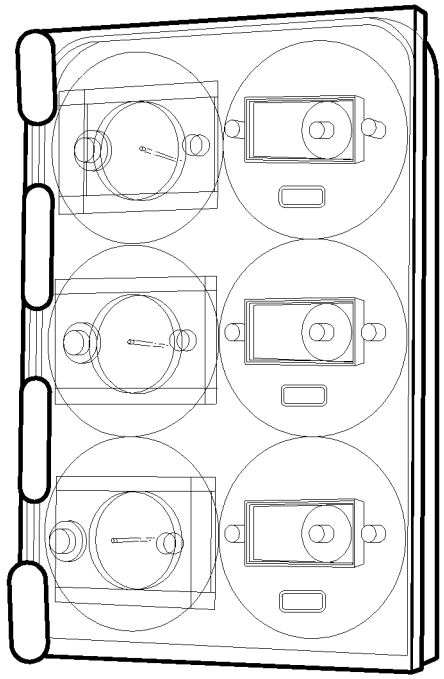
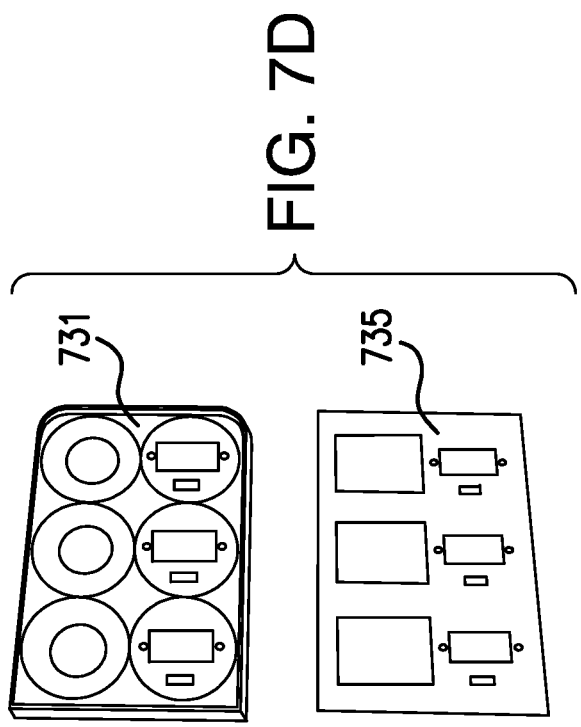
FIG. 7E
FIG. 7F
FIG. 7D

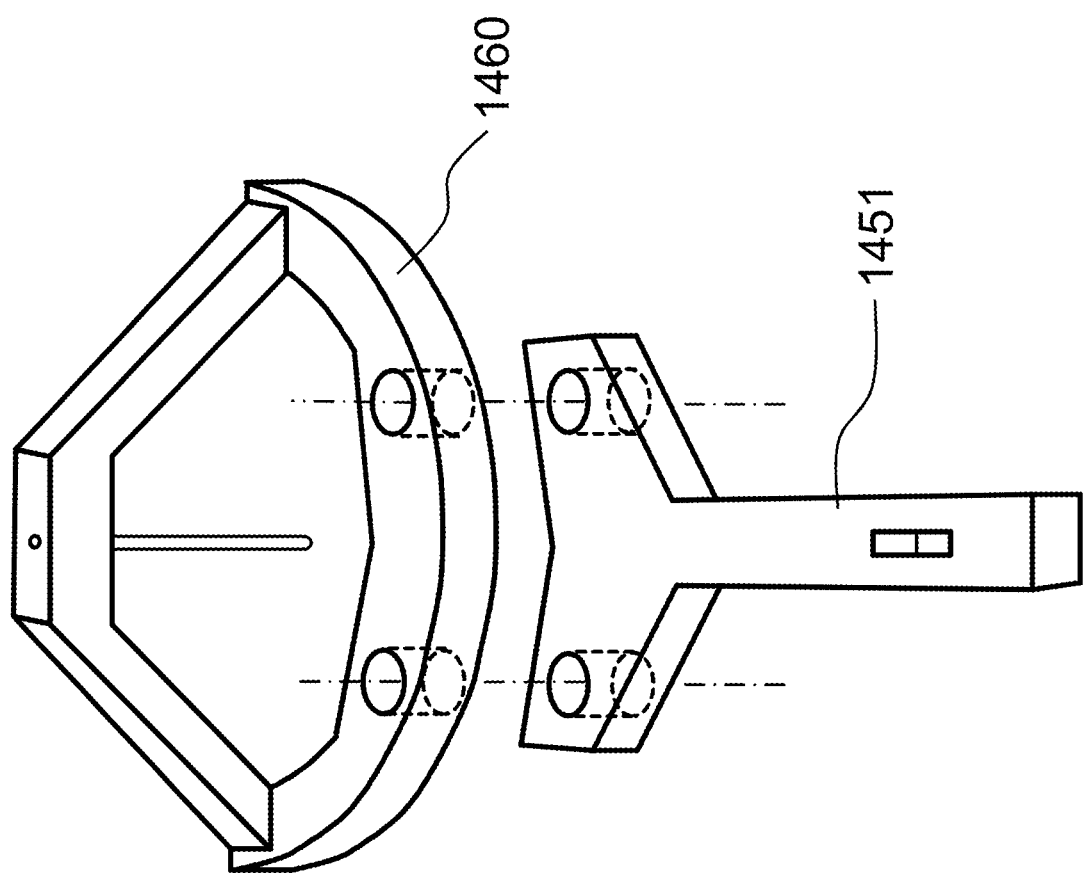

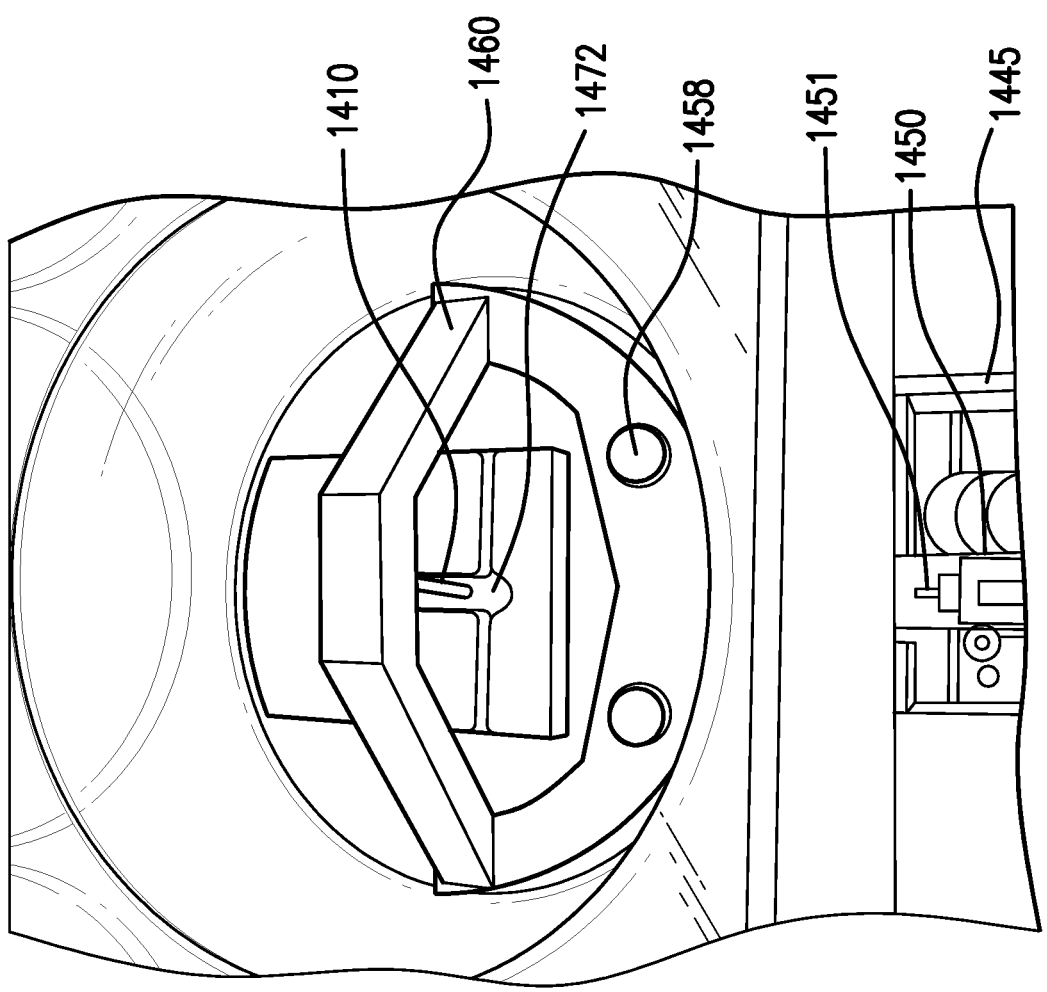

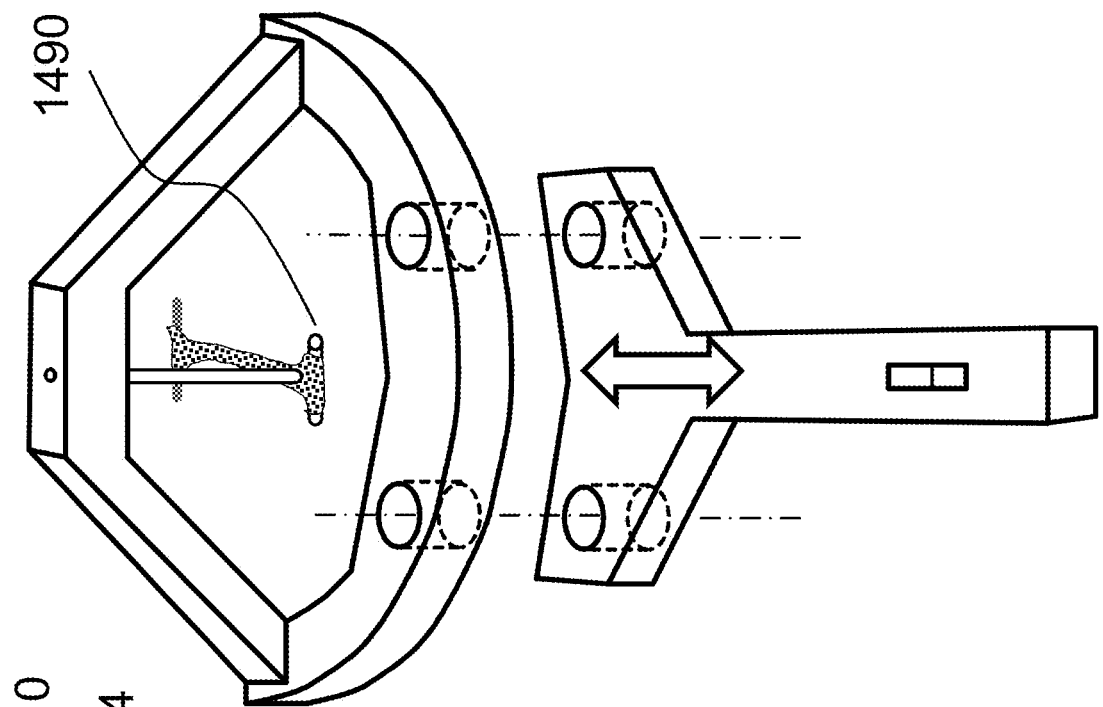
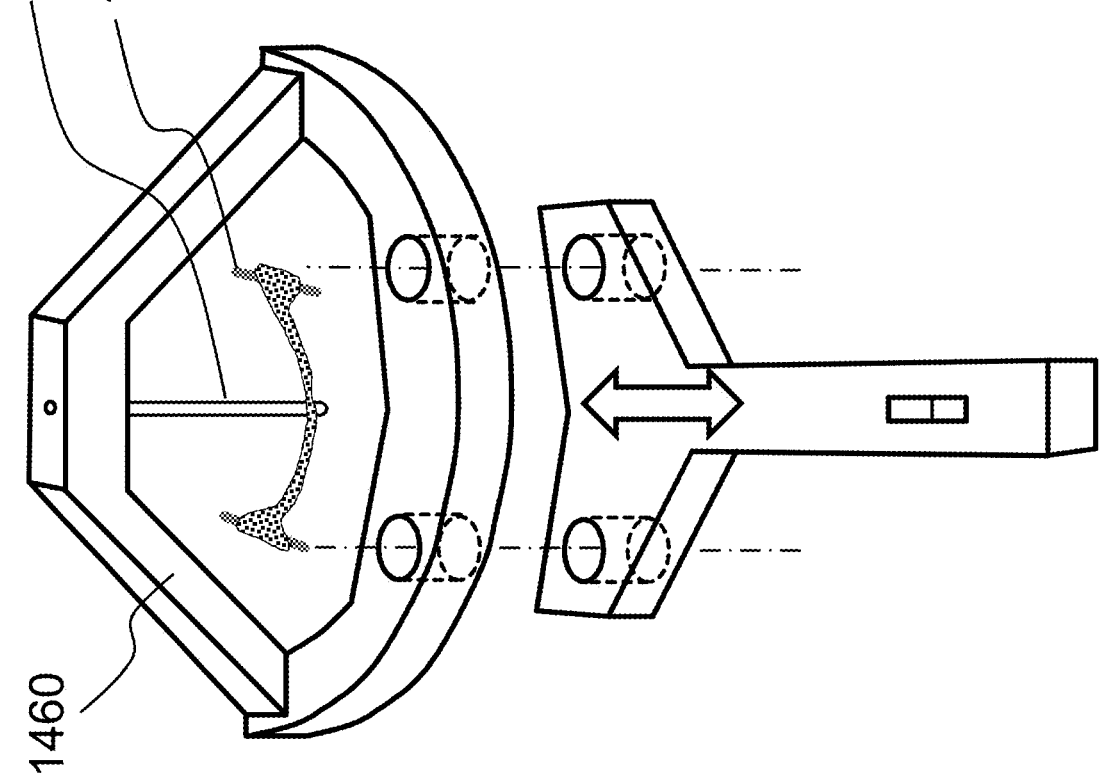

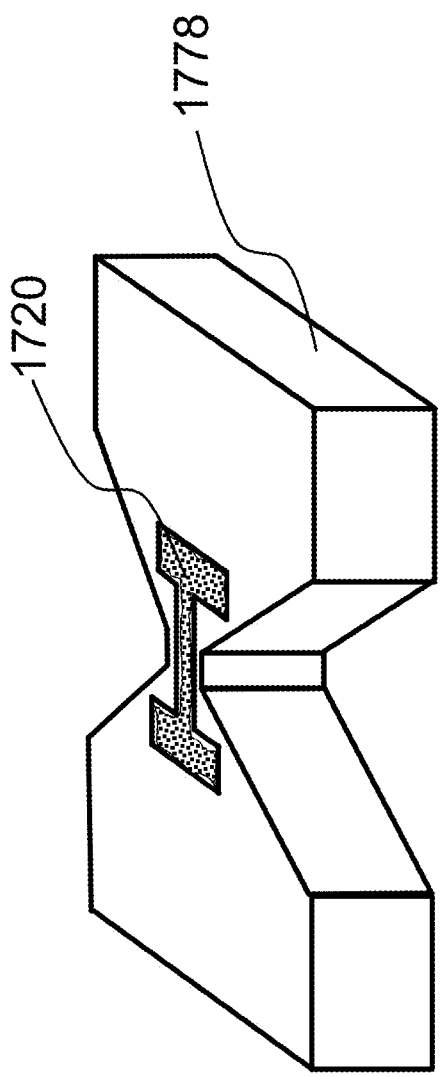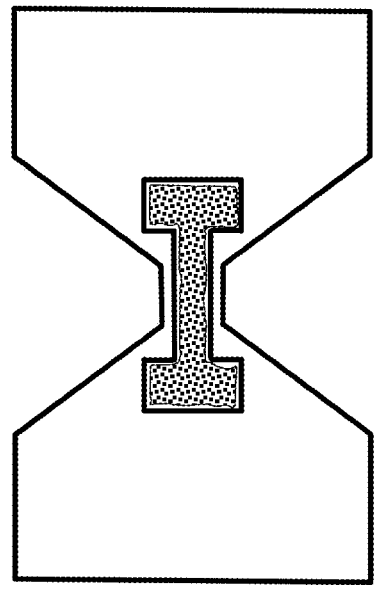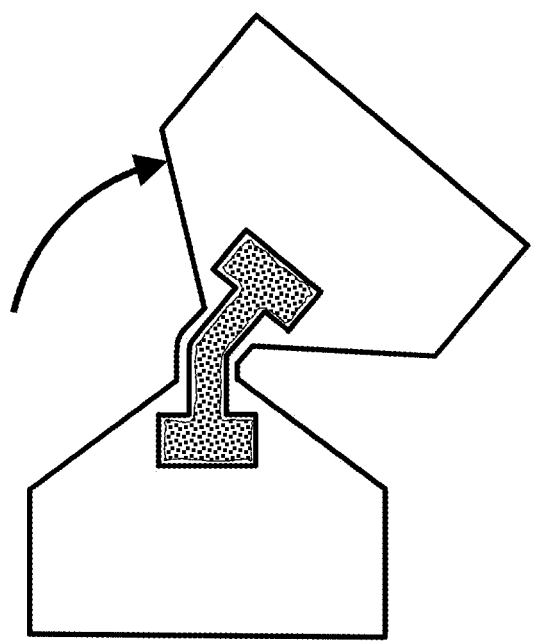

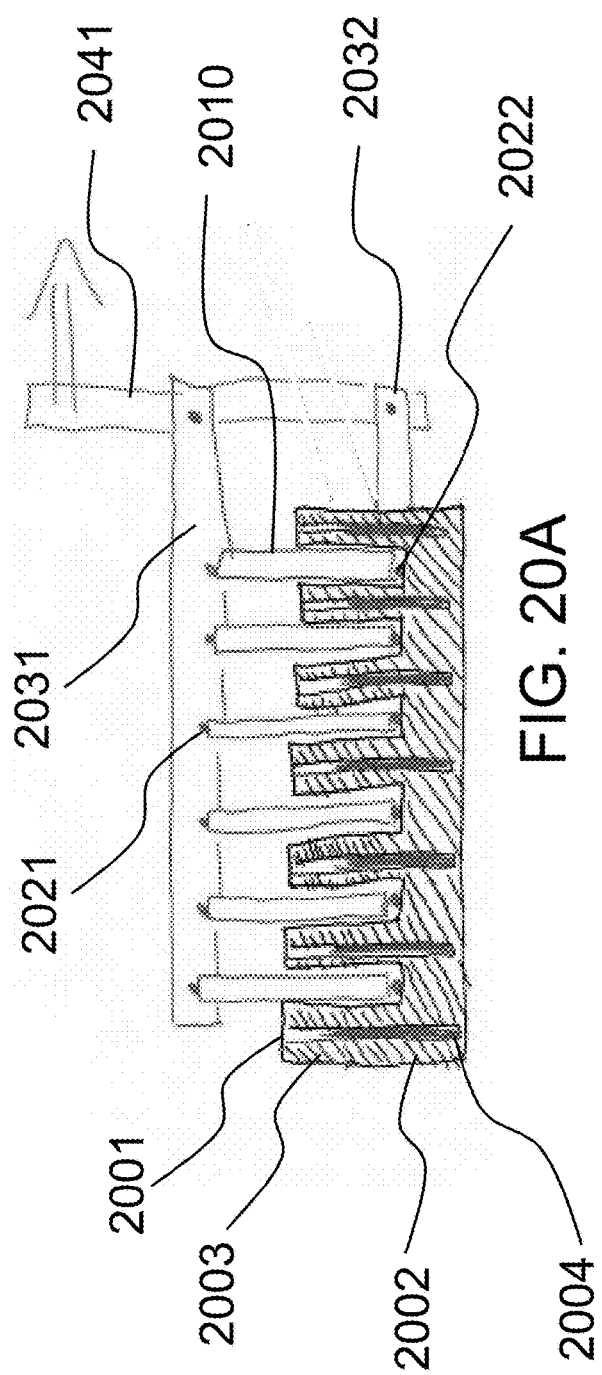
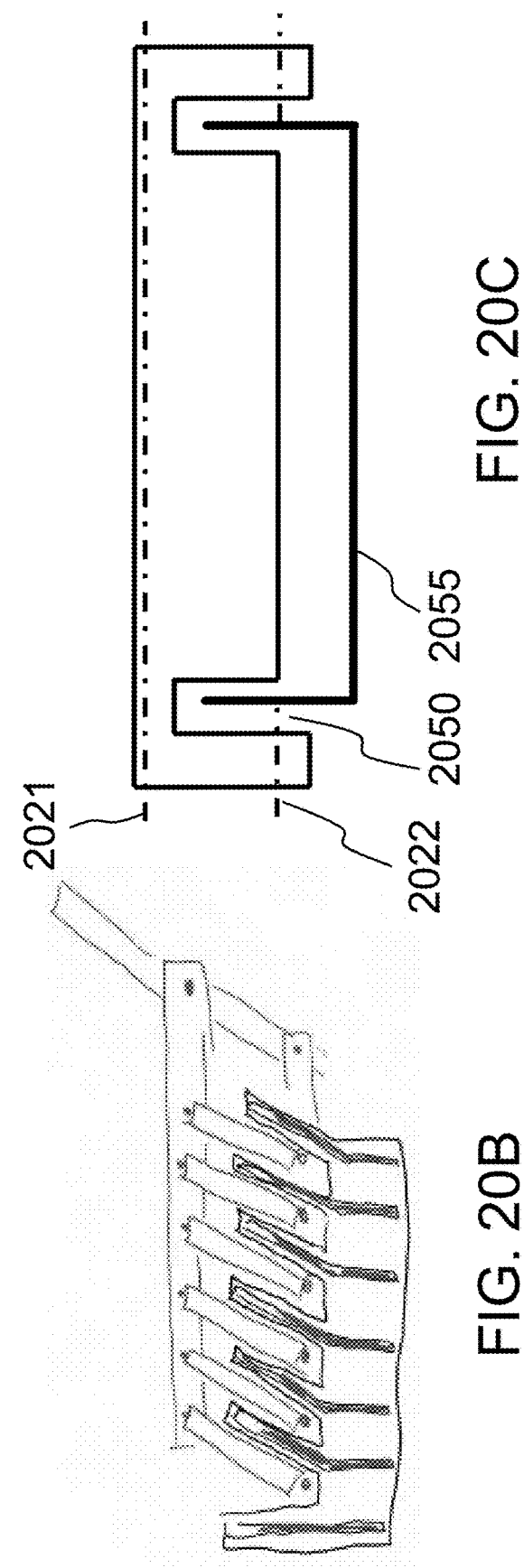
FIG. 20A
FIG. 20B
FIG. 20C

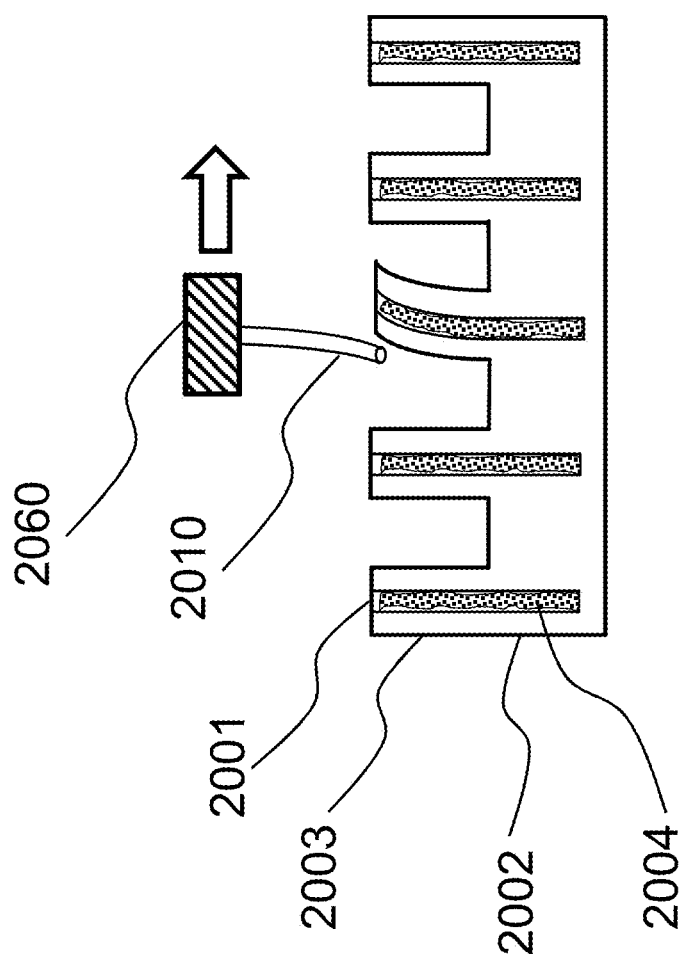

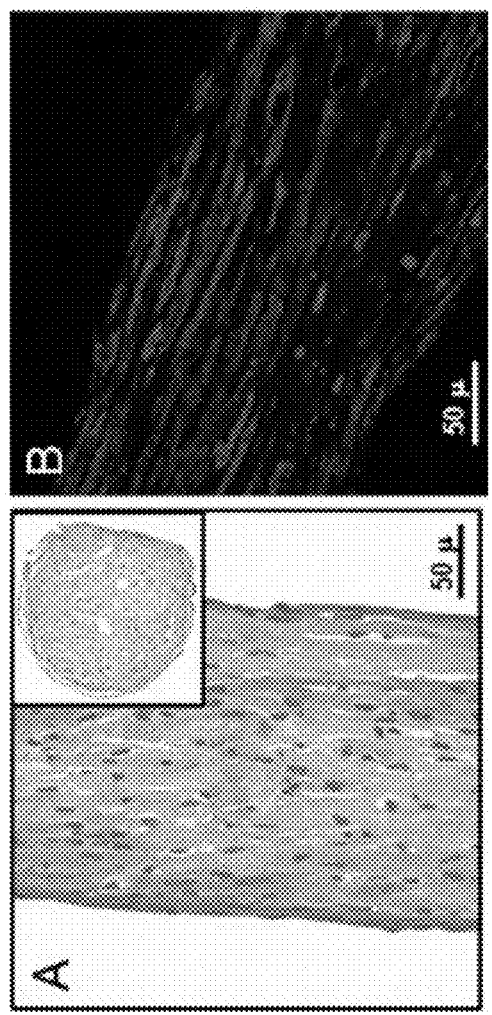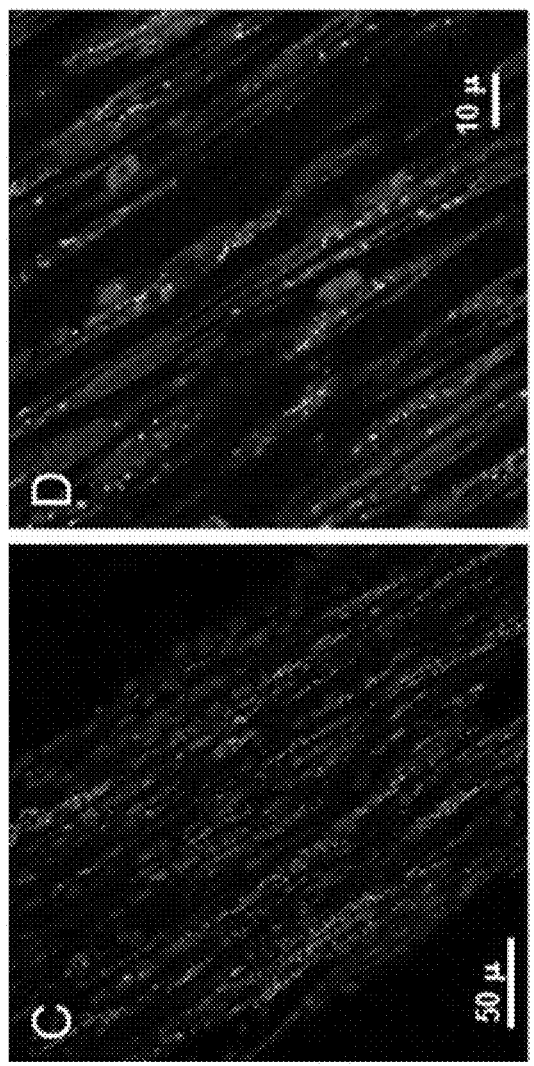
FIG. 22A
FIG. 22B
FIG. 22C
FIG. 22D

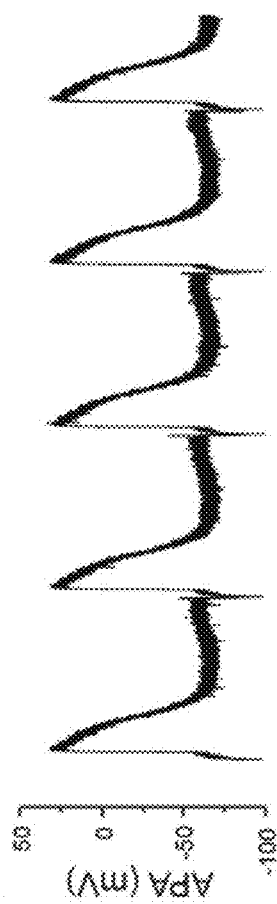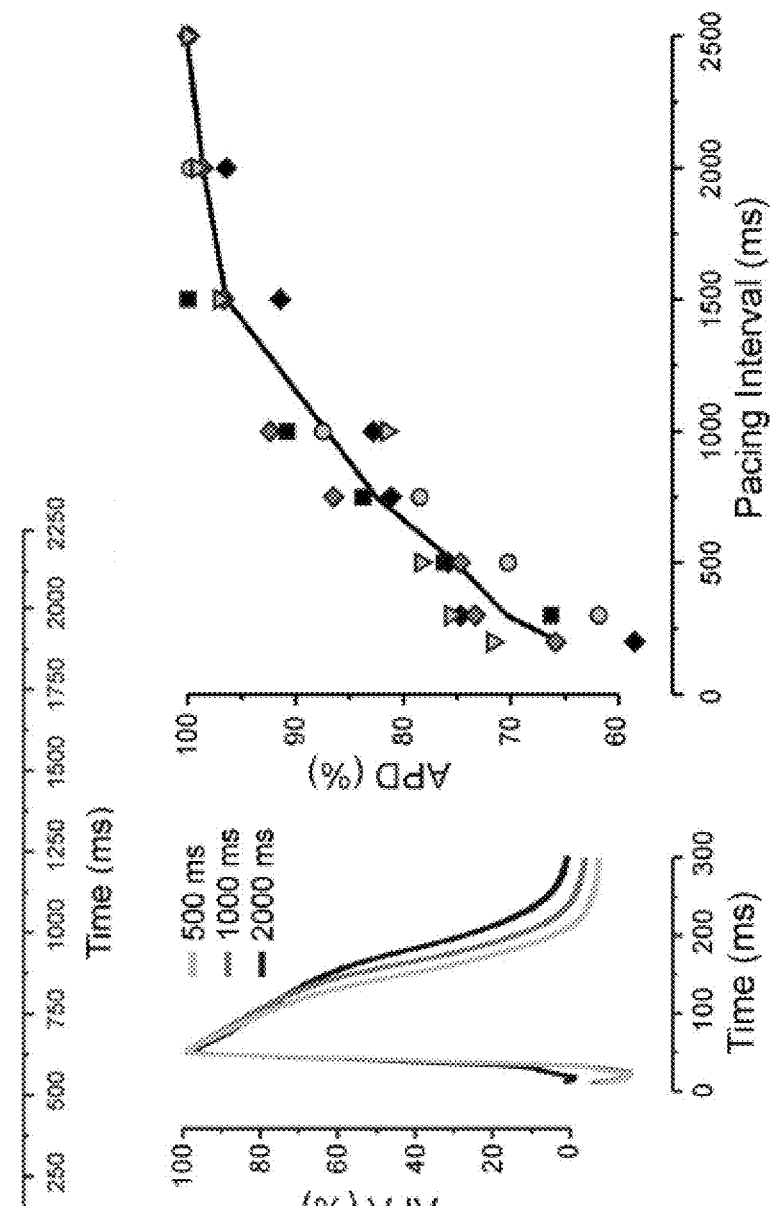
FIG. 23A
FIG. 23B
FIG. 23C

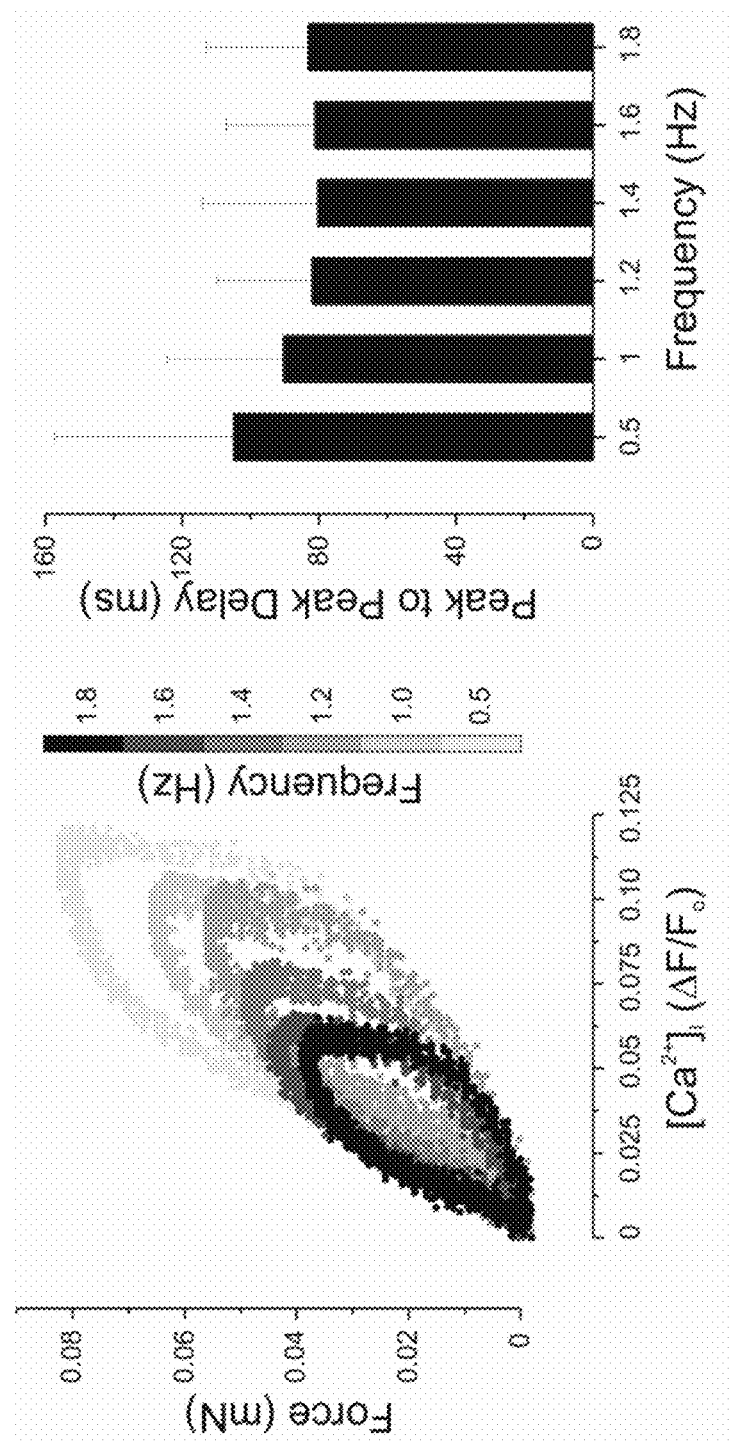

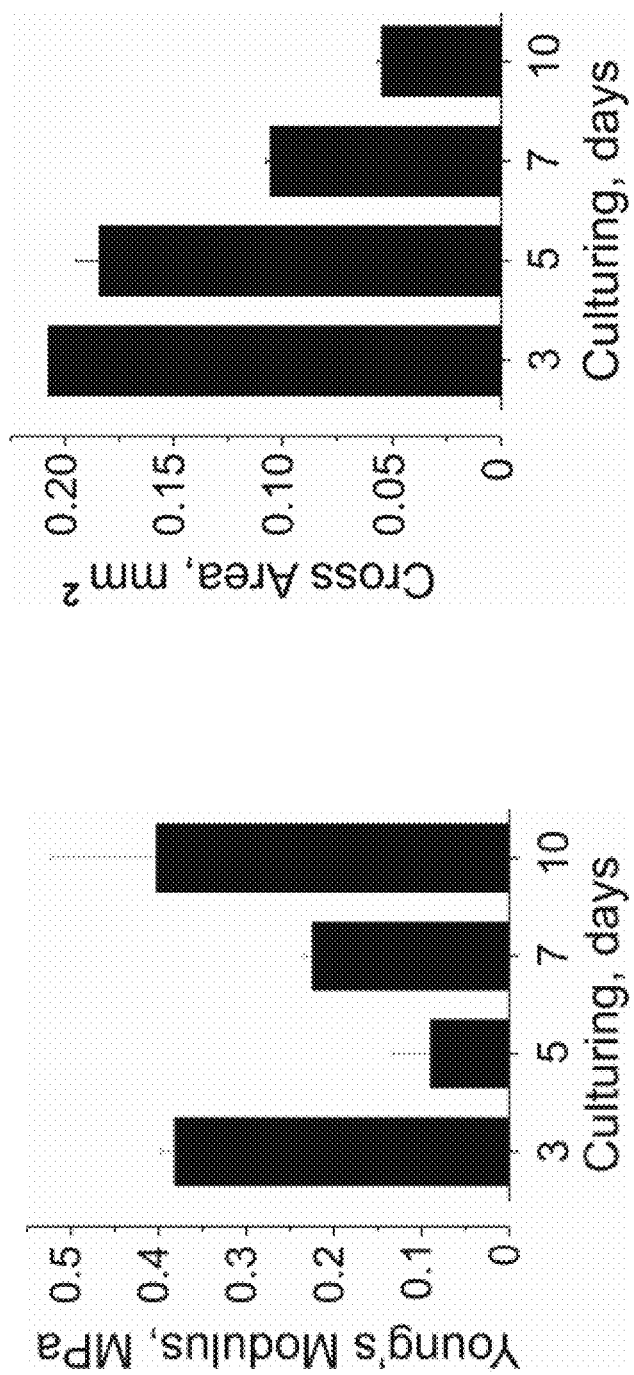

DEVICES AND METHODS FOR TENSION MEASUREMENTS AND APPLICATIONS OF SAME

CROSS-REFERENCE TO RELATED PATENT APPLICATIONS

This application is a divisional patent application of U.S. patent application Ser. No. 16/064,151, filed Jun. 20, 2018, now allowed, which is a U.S. national phase entry of PCT Patent Application Serial No. PCT/US2017/013816, filed Jan. 17, 2017, which claims priority to and the benefit of U.S. Provisional Patent Application Ser. No. 62/279,389, filed Jan. 15, 2016. Each of the above-identified application is incorporated herein by reference in its entirety.

Some references, which may include patents, patent applications, and various publications, are cited and discussed in the description of the present invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

STATEMENT AS TO RIGHTS UNDER FEDERALLY-SPONSORED RESEARCH

The present invention was made with government support under Contract Nos. 5R01 AG06528 and 1R01 AR056138 awarded by the National Institutes of Health, and Contract No. CBMXCEL-XL1-2-001 awarded by the Defense Threat Reduction Agency. The government has certain rights in the invention.

FIELD OF THE INVENTION

The present invention relates generally to the measurement of tension and tension response, and more particularly to devices and methods for the measurement of tension and tension response of bio-objects and deformable materials, and applications of the same.

BACKGROUND INFORMATION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

The growing interest in organs-on-chips, also known as tissue chips and in vitro organ constructs, is driven in part by the recognition that two-dimensional biology-on-plastic using immortal cell lines does not adequately recapitulate human physiology, particularly the details of the response of the cells to drugs and toxins. A large number of in vitro organ-on-chip models have been developed, ranging from planar co-culture models of cellular endothelial-epithelial interfaces to three dimensional (3D) tissue-equivalent models of the human brain neurovascular unit. However, it is a challenge to have a non-destructive system and method for efficiently and accurately measuring, in a longitudinal fashion, the tension force within a tissue construct and the response of the construct to the application of additional tension.

Therefore, a heretofore unaddressed need exists in the art to address the aforementioned deficiencies and inadequacies.

SUMMARY OF THE INVENTION

In one aspect, the present invention relates to a device for applying force to and measuring tension within a bio-object construct. In certain embodiments, the device includes: a microscope comprising a condenser, an objective and a stage positioned therebetween, where the stage is movable along a horizontal plane; a holding member for accommodating the bio-object construct, fixable on the stage; and a probe having a first end attached to the condenser, and a second end placed in the holding member. The stage operably moves such that the bio-object construct moves toward and contacts with the second end of the probe, thereby causing a displacement of the second end of the probe and a displacement of the bio-object construct. The displacement of the second end of the probe and the displacement of the bio-object are used to measure the tension of the bio-object construct. In certain embodiments, the microscope is an inverted microscope.

In certain embodiments, the bio-object construct has two ends fixed in the holding member. In certain embodiments, the bio-object construct comprises a connective tissue construct, a cardiac tissue construct, a bone construct, or a deformable material. In certain embodiments, the connective tissue construct includes a fibroblast construct. In one embodiment, the connective tissue construct includes a collagen construct.

In certain embodiments, the bio-object construct has a single end fixed in the holding structure and the probe contacts the free end of the construct. In certain embodiments, the free end of the construct is contained within a flexible hydrogel or other material that is deformed in a manner to bend the free end of the construct.

In certain embodiments, the device further includes a detector coupled to the microscope for determining the displacement of the second end of the probe and the displacement of the bio-object construct. In certain embodiments, the detector comprises one or more cameras or one or more CCD image sensors, for acquiring images of the probe and the bio-object construct.

In certain embodiments, the device further includes a controller coupled to the detector for processing the acquired images to determine the displacement of the second end of the probe and the displacement of the bio-object construct. In certain embodiments, the controller is further configured to determine a local deformation of the bio-object construct around a contact location between the probe and the bio-object construct. In certain embodiments, the controller is capable of sensing the deformation of the construct and then adjusting the position of the construct so as to maintain a desired position despite biological changes in the properties or activity of the construct.

In certain embodiments, the probe is substantially located in a center of a field of view of the detector. In certain embodiments, the probe is formed of a flexible material. In certain embodiments, the probe has a stiffness that substantially matches a stiffness of the bio-object construct. In certain embodiments, the probe is adjustable along a vertical direction toward or away from the objective. In certain embodiments, the second end of the probe is in a path along which a central portion of the bio-object construct moves.

In certain embodiments, the holding member includes a well-plate bioreactor. In certain embodiments, the stage is movable in a range of microns and has a read-out for a position of the stage.

In certain embodiments, the holding member at one end of the construct can be displaced to stretch the construct axially. In certain embodiments, the holding member at the stretched end of the construct is flexible, so that displacement of the holding member is accompanied by a bending of the holding member, which in turn provides a measurement of the tension in the construct and the change in that tension as the construct is stretched.

In certain embodiments, the device further includes a mounting member for fixing the probe to the condenser of the microscope, comprising: a supporting plate having a central hole and a slot disposed at one side of the supporting plate; a cantilever adjuster disposed on the supporting plate and crossing over the center hole; and two position-control magnets located at two ends of the cantilever adjuster for fixing and adjusting the cantilever adjuster to the supporting plate, wherein the force probe is positioned at a center of the cantilever adjuster and perpendicular to the cantilever adjuster.

In certain embodiments, the bio-object construct has a length of about 3-10 mm, a first width of about 1-5 mm at end portions, and a second width of about 0.1-0.5 mm at a central portion; the probe has a length of about 10-30 mm and a diameter of about 0.1-0.6 mm; and the stage has a movement range of about 0-3000 µm, and a maximum velocity of about 15-60 mm/sec.

In certain embodiments, the displacement of the probe is calibrated to a force before being in contact with the bio-object construct.

In another aspect, the present invention relates to a device for measuring a tension of a bio-object construct. In certain embodiments, the device includes: a probe; a moving mechanism configured to move at least one of the probe and the bio-object construct such that the probe is contactable with the bio-object construct; and a measuring mechanism configured to determine displacements of the probe and the bio-object construct when the probe is in contact with the bio-object construct to cause the displacement of the probe and the displacement of the bio-object construct, in order to measure the tension of the bio-object construct according to the determined displacements.

In certain embodiments, the displacement of the probe is calibrated to a force before being in contact with the bio-object construct. In certain embodiments, the probe has a stiffness that substantially matches a stiffness of the bio-object construct. In certain embodiments, the moving mechanism comprises a stage for accommodating the bio-object construct, being movable along a horizontal plane. In certain embodiments, the stage is a mechanical stage.

In certain embodiments, the device further includes means for monitoring a relative location of the probe and the bio-object construct. In certain embodiments, the monitoring means includes a microscope having a condenser, an objective and a stage positioned therebetween, and wherein the bio-object construct is operably disposed on the stage.

In certain embodiments, the stage is movable along a horizontal plane, and wherein the moving mechanism comprises the stage.

In certain embodiments, the device further includes a controller coupled to at least one of the moving mechanism, the measuring mechanism and the monitoring means for measuring the tension of the bio-object construct.

In certain embodiments, the measuring mechanism includes a detector for determining the displacement of the probe and the displacement of the bio-object construct. In certain embodiments, the detector comprises one or more cameras or one or more CCD image sensors, for acquiring images of the probe and the bio-object construct.

In certain embodiments, the measuring mechanism is further configured to determine a local deformation of the bio-object construct around a contact location between the probe and the bio-object construct.

In certain embodiments, the measurement is non-destructive to the bio-object construct.

In certain embodiments, the bio-object construct is disposed in a well of a well plate.

In certain embodiments, the device includes a plurality of the bio-object constructs disposed in an array of wells in a well plate, and a plurality of the probes for respectively contacting the bio-object constructs.

In certain embodiment, the device further includes a holding member for accommodating the bio-object. The holding member includes: a first holder portion for holding a first end of the bio-object, and comprising a first electrode for delivering a first electrical signal to the first end of the bio-object; and a second holder portion for holding a second end of the bio-object, and comprising a second electrode for delivering a second electrical signal to the second end of the bio-object.

In certain embodiments, the moving mechanism includes: a T-shaped bellcrank, comprising a lateral rod and a vertical rod substantially connected to a middle portion of the lateral rod, and the lateral rod is disposed on top of the vertical rod and is substantially perpendicular to the vertical rod; a fixing pin rotatably fixing the bellcrank at the middle portion, such that the bellcrank is rotatable around the fixing pin; and at least one weight, disposable on one end of the lateral rod to rotate the bellcrank around the fixing pin, such that the vertical rod is able to contact and cause displacement of the bio-object.

In certain embodiments, the moving mechanism includes: a horizontal lever arm having a front end, a rear end, and two sides, wherein the lever arm is supported by two pivots from the two sides; a vertical rod fixed to the front end of the lever arm; and at least one weight, disposable on the rear end of the lever arm to rotate the lever arm around the pivots, such that the vertical rod is able to contact and cause displacement of the bio-object.

In certain embodiments, the moving mechanism includes: a servo; an actuator arm connected with the servo; a support base connected with the actuator; and a probe support fixed to the support base. The actuator arm and the support base are disposed horizontally, the probe support is disposed vertically, and the probe is fixed to the probe support; and when the servo operates to apply a force to the actuator arm, the actuator arm, the support base and the probe support move laterally, so as to drive the probe to move laterally. In certain embodiments, the probe and the moving probe support are totally contained within a sterile cell-culture well In a further aspect, the present invention relates to a method for measuring a tension of a bio-object construct. In certain embodiments, the method includes: positioning a probe in relation to the bio-object construct such that the probe is contactable with the bio-object construct; moving at least one of the probe and the bio-object construct to make the probe in contact with the bio-object construct to cause a displacement of the probe and a displacement of the bio-object construct; and determining displacements of the probe and the bio-object construct, so as to measure the tension of the bio-object construct according to the determined displacements.

In certain embodiments, the method further includes calibrating the displacement of the probe to a force.

In certain embodiments, the method further includes monitoring a relative location of the probe and the bio-object construct.

In certain embodiments, the step of monitoring the relative location is performed with a microscope having a condenser, an objective and a stage positioned therebetween, and wherein the bio-object construct is disposed on the stage.

In certain embodiments, the probe includes a first end and a second end, and wherein the step of positioning the probe comprises fixing the first end of the probe to the condenser of the microscope, and placing the second end of the probe in a holding member of the bio-object construct, wherein the holding member is fixed to the stage of the microscope.

In certain embodiments, the step of moving the at least one of the probe and the bio-object construct comprises moving the stage of a microscope, thereby moving the bio-object construct in the holding member toward the probe.

In certain embodiments, the probe has a stiffness that matches a stiffness of the bio-object construct.

In certain embodiments, the step of determining the displacements of the probe and the bio-object construct comprises acquiring images of the probe and the bio-object construct.

In certain embodiments, the method further includes, before the step of moving the at least one of the probe and the bio-object construct: providing at least one rigid rod; and moving the at least one rigid rod toward the bio-object construct such that the at least one rigid rod is in contact with the bio-object construct and causes the bio-object construct to deform.

In certain embodiments, the method further includes, before the step of moving the at least one of the probe and the bio-object construct, providing at least one block having a shape of a plate; and moving the at least one block toward the bio-object construct such that the at least one rigid rod is in contact with the bio-object construct and causes the bio-object construct to deform.

In yet another aspect, the present invention relates to a system for measuring a tension of at least one bio-object construct. The system includes: a well plate comprising at least one construct well for fixedly accommodating the at least one bio-object construct and at least one motor well neighboring the at least one construct well; a mounting base covering the well plate, comprising a first cover portion covering the at least one construct well and a second cover portion covering the at least one motor well, wherein the first cover portion has a through hole exposing the at least one construct well; at least one movable plate disposed on the first cover portion of the mounting base corresponding to the at least one construct well and is movable on the mounting base; at least one probe attached to a bottom surface of the least one movable plate and extending downward through the through hole of the first cover portion of the mounting base into the at least one construct well; and at least one motor mounted on the second cover portion of the mounting base corresponding to the at least one motor well.

In certain embodiments, the at least one motor is configured to move the movable plate along a straight line, so as to move the at least one probe to be in contact with the at least one bio-object construct; and the tension of the at least one bio-object construct is measurable by determining displacements of both the at least one probe and the at least one bio-object construct upon contact of the at least one probe with the at least one bio-object construct.

In certain embodiments, the at least one motor includes a rotatable servo hub and an actuation wire, one end of the actuation wire is wound on the rotatable servo hub, and the other end of the actuation wire is fixed to a first end of the movable plate that is proximate to the at least one motor, such that the at least one motor is able to move the movable plate along the straight line.

In certain embodiments, the mounting base has a first layer and a second layer disposed on the first layer, wherein the first layer comprises the through hole, the second layer has a rectangular opening, the movable plate is disposed within the rectangular opening and covers the through hole, such that the movable plate is restrained in the rectangular opening, and moves within the rectangular opening along the straight line.

In certain embodiments, a spring is fixed to the well-plate and attached to a second end of the movable plate that is distal from the at least one motor, such that the movable plate is movable by the at least one motor and the spring.

In certain embodiments, the at least one motor includes a mechanism to translate the rotational motion of the motor to a translational motion of one end of the flexible probe. In certain embodiments, the at least one motor includes a mechanism to translate the rotational motion of the motor to a translational motion of a magnet beneath a well-plate that in turns moves a magnet-containing fixture within the well plate that in turn supports the flexible probe.

In certain embodiments, the system further includes a detector adapted for determining the displacement of the at least one probe and the at least one bio-object construct upon contact of the at least one probe with the at least one bio-object construct.

In certain embodiments, the detector comprises one or more cameras or one or more CCD image sensors, for acquiring images of the at least one probe and the at least one bio-object construct.

In certain embodiments, the system further includes a controller coupled to the detector for processing the acquired images to determine the displacements of the at least one probe and the at least one bio-object construct. In certain embodiments, the controller is further configured to control the at least one motor to move the movable plate along the straight line, so as to move the at least one probe to be in contact with the at least one bio-object construct.

In certain embodiments, the at least one probe is formed of a flexible material. In certain embodiments, the at least one probe has a stiffness that substantially matches a stiffness of the at least one bio-object construct. In certain embodiments, the system further includes means for monitoring a relative location of the at least one probe and the at least one bio-object construct.

In a further aspect, the present invention relates to a system for applying and measuring tensions of a plurality of bio-object constructs. In certain embodiments, the system includes a flexible body disposed on the base, wherein the flexible body defines a plurality of construct holes for accommodating the plurality of bio-object constructs, such that when the flexible body is bent, the bending of the flexible body causes tensions to be applied to the plurality of bio-object constructs, thereby causing displacements of the plurality of bio-object constructs.

In certain embodiments, the system further includes a measuring mechanism configured to determine the displacements of the plurality of bio-object constructs when the flexible body is bent, so as to measure the tensions of the plurality of bio-object constructs according to the determined displacements.

In certain embodiments, the system further includes a plurality of plates. The flexible body further defines a plurality of measuring slots for receiving the plurality of plates, wherein the plurality of construct holes and the plurality of measuring slots are alternatively positioned, such that when the plurality of plates moves, the movement of the plurality of plates causes the displacements of the plurality of bio-object constructs.

In certain embodiments, each of the construct holes has a depth greater than a depth of each of the measuring slots.

In certain embodiments, the flexible body is formed of a flexible gel, such as hydrogel, or biogel, or the like.

In one aspect, the present invention relates to a method for applying and measuring tensions of a plurality of bio-object constructs. In certain embodiments, the method includes providing a flexible body, wherein the flexible body defines a plurality of construct holes for accommodating the plurality of bio-object constructs, such that when the flexible body is bent, the bending of the flexible body causes tensions to be applied to the plurality of bio-object constructs; and applying tensions to the plurality of bio-object constructs, by bending the flexible body, thereby causing displacements of the plurality of bio-object constructs.

In certain embodiments, the method further includes determining the displacements of the plurality of bio-object constructs so as to measure the tensions of the plurality of bio-object constructs according to the determined displacements.

In certain embodiments, the flexible body further defines a plurality of measuring slots for receiving a plurality of plates, wherein the plurality of construct holes and the plurality of measuring slots are alternatively positioned, such that when the plurality of plates moves, the movement of the plurality of plates causes the displacements of the plurality of bio-object constructs.

In certain embodiments, each of the construct holes has a depth greater than a depth of each of the measuring slots.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

FIG. 3A schematically shows a first implementation of a system for measuring tension according to one embodiment of the present invention.

FIGS. 5A-5I illustrate the use of a tension measurement system according to one embodiment of the present invention to measure the force generating behavior of cardiac muscle tissue constructs when they are stimulated electrically.

FIGS. 7A-7F schematically show a second implementation of a system for measuring tension according to one embodiment of the present invention.

FIG. 14C schematically shows an actuating assembly according to one embodiment of the present invention.

FIGS. 14D-14F show a servo well plate configuration with the concept of FIGS. 14A-14C.

FIGS. 14G and 14H show how the concept of FIGS. 14A-14F can be applied to the application and measurement of either lateral or longitudinal forces to the construct.

FIGS. 17A-17F schematically shows a bendable bone construct according to one embodiment of the present invention.

FIGS. 20A-20C schematically shows an alternative method of distorting the hydrogel according to one embodiment of the present invention.

FIG. 20D schematically shows how a flexible probe can be used to distort a hydrogel that contains a tissue construct and thereby measure the stiffness of the combination of the hydrogel and the construct.

FIGS. 22A-22D show histological imaging of the ECTC after 15 days in culture. FIG. 22A shows H & E staining of a longitudinal section of the cardiac tissue construct. The insert is a cross-section. FIG. 22B shows uniform distribution of the cardiomyocytes immunostained for a heavy chain of myosin II. FIG. 22C shows immunostaining of the electrical coupling protein connexin-43 (green). FIG. 22D shows a higher magnification illustration of longitudinally aligned, elongated cardiomyocytes with well-developed sarcomeric structure and connexin-43 positive gap junctions. Nuclear staining was performed using DAPI (blue).

FIGS. 23A-23C show action potential duration (APD) restitution in the ECTC. FIG. 23A shows representative APs recorded with a floating glass micropipette during stimulation with a pacing interval (PI) of 500 ms. FIG. 23B shows superimposed filtered and normalized APs recorded at a PI of 500 ms, 1000 ms, and 2000 ms. FIG. 23C shows the relationship between APD and PI (N=5).

FIG. 24A shows representative, original, uncalibrated contractile force traces recorded (as pixels of deflection) at different applied transverse forces in one ECTC. The stimulation period is 2 s. The units of amplitude are pixels. FIG. 24B shows superimposed developed force traces as a function of applied tension. FIGS. 24C-24D shows mechanical restitution curve and traces recorded in one experiment. FIGS. 24E-24F show mechanical restitution and contraction velocity data (N=6).

FIG. 25A shows developed force during control and application of 1 µM of isoproterenol in a single experiment. The stimulation period is 2 s. The first 800 ms of contraction trace are shown. Effect of isoproterenol (1 µM) on: Frank-Starling force-tension relationship, values are means±SD (FIG. 25B); forces exerted in contraction (upper) and relaxation (lower) (FIG. 25C); contraction velocities (FIG. 25D). Control is black and isoproterenol is gray. *$P<0.05$, N=7.

FIG. 26A shows overlaid traces showing the change in stretch during a contraction cycle, recorded at different tensions in a single experiment. FIG. 26B shows the tension-dependence of stretch during contraction, relaxation, and under blebbistatin at 6 µM. *$P<0.05$ is for blebbistatin compared with relaxation, # $P<0.001$ is for relaxation compared with contraction, N=5. FIG. 26C shows the Young's modulus of the ECTC calculated in relaxation and under blebbistatin, N=5, *$P<0.05$.

FIG. 27A shows uncalibrated $[Ca^{2+}]_i$ and force time traces. FIG. 27B shows superimposed, averaged and normalized $[Ca^{22+}]_i$ and force traces.

FIGS. 28A-28D show the effect of stimulation rate on the $[Ca^{22+}]_i$-contraction force relationship in neonatal rat ECTC. FIG. 28A shows the change of fluo-4 fluorescence and FIG. 28B shows contraction traces, both as a function of stimulation rate. FIG. 28C are force-$[Ca^{22+}]_i$ phase plots at different pacing rates. FIG. 28D shows $[Ca^{22+}]_i$ force peak-to-peak delay as a function of stimulation rate.

FIG. 30A shows H & E staining. FIG. 30B shows immunostaining for vimentin (green) as a marker of cardiac fibroblasts shows uniform distribution of the cells. FIG. 30C shows immunostaining with anti-collagen I antibodies illustrates remodeling fibrin based extracellular matrix to deposit collagen I (red). FIG. 30D is a combined image including nuclear staining with DAPI.

FIGS. 31A-31D show the effect of duration of cardiac fibroblast construct culturing on elongation (FIG. 31A) and Young's modulus (FIG. 31B) as a function of applied force, and on change of cross sectional area (FIG. 31C) and elasticity (FIG. 31D).

DETAILED DESCRIPTION OF THE INVENTION

Figure 1A:
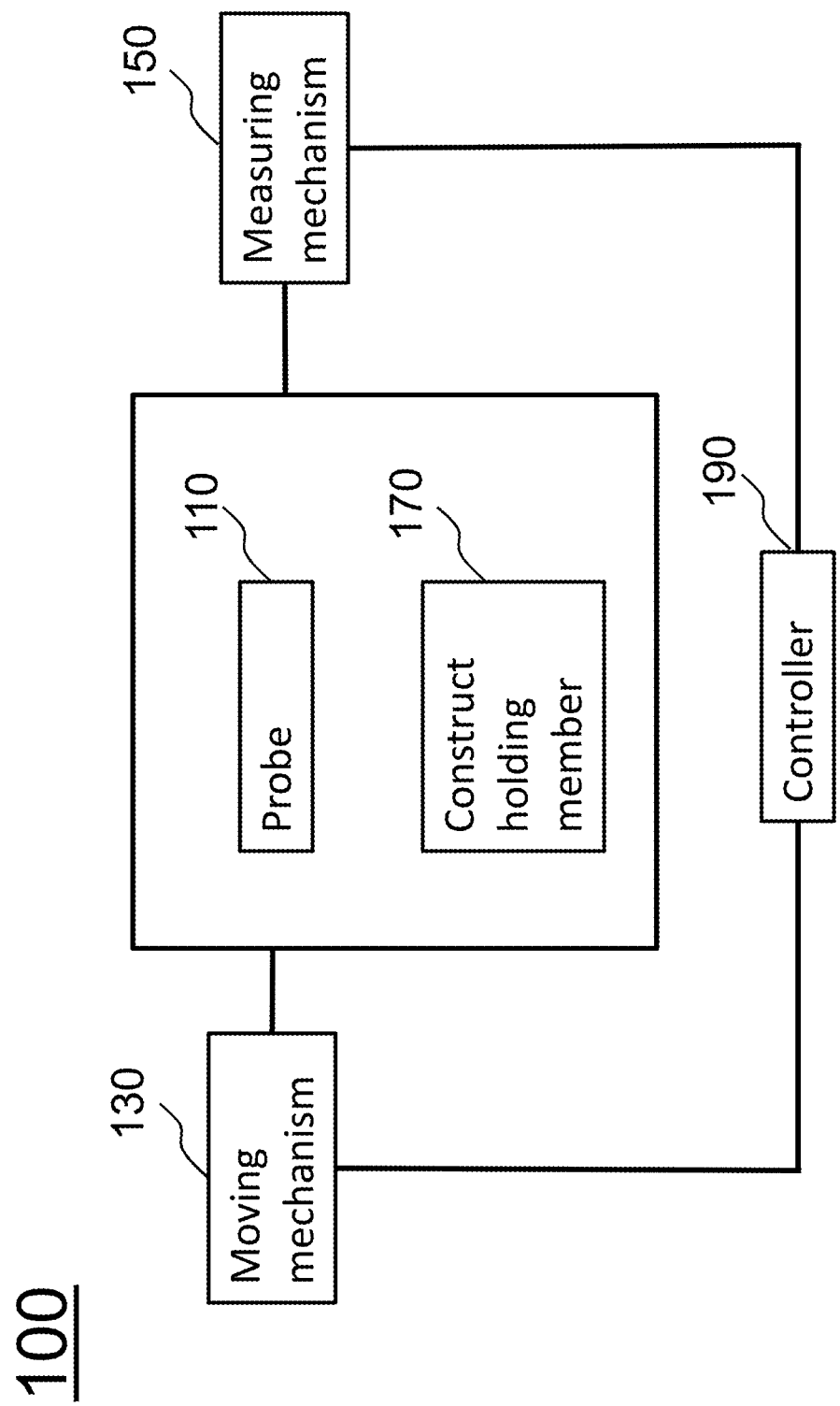
FIG. 1A schematically shows a system for measuring tension of a construct according to one embodiment of the present invention.

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present invention.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about," "substantially" or "approximately" shall generally mean within 20 percent, preferably within 10 percent, and more preferably within 5 percent of a given value or range. Numerical quantities given herein are approximate, meaning that the terms "around," "about," "substantially" or "approximately" can be inferred if not expressly stated.

As used herein, the terms "comprise" or "comprising," "include" or "including," "carry" or "carrying," "has/have" or "having," "contain" or "containing," "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the invention.

The description is now made as to the embodiments of the present invention in conjunction with the accompanying drawings. In accordance with the purposes of the present invention, as embodied and broadly described herein, the present invention relates to systems and methods for applying forces to and measuring tensions within an organ-on-chip or other type of deformable materials. The present invention will facilitate measurement of certain static and dynamic tension parameters associated with biological tissue constructs or other deformable materials. These measured parameters are of fundamental importance in understanding the behavior and properties of engineered biological tissue constructs. The repeated application of tension can affect the development and differentiation of the cells within the biological tissue construct, and can thereby alter cellular phenotype. In one embodiment of the present invention, a video microscope system equipped with a calibrated motorized mechanical stage can be used to control and measure the forces involved in deformations of a biological tissue or a deformable object. Additionally, for the case of electrically excitable tissues, such as muscle, this system can be utilized to measure the contraction force as a function of muscle extension as determined by the applied force. In the case of developing bone tissue, the device can measure the increase in stiffness as the bone develops, and the application of cyclic tension and the associated deformation can cause the bone construct to develop, at the point of flexure, into cellular phenotypes commonly associated with the formation of a joint. This measurements described in this present invention provide a capability that has important implications for the development of biological tissue constructs and will certainly have immediate utility in artificial tissue cardiovascular research areas. Certain embodiments of the basic design are described, and a number of variations that are economical to produce, or more suitable for high-content and high-throughput biological screening assays, are provided. The present invention facilitates a class of optical imaging and mechanical stress application systems and read-out measurements that are very relevant to microphysiological tissue analysis and that cannot be readily or conveniently measured by existing commercial instrumentation platforms.

In certain aspects, the present invention provides systems and methods for applying tension and measuring static and dynamic tension parameters associated with a bio-object construct such as a biological tissue construct, biological and biosynthetic materials or other deformable materials. For example, cardiac, vascular, cutaneous, and skeletal muscle tissue are expected to exhibit intrinsic, mechanical contractions, and thus the engineered construct of those tissues represents a special class of mechanically active biomaterials. In certain embodiments, the systems and methods of the present invention provide active intervention to control the timing and amplitude of applied forces and/or strain to identify both passive elastic properties and active contractile behavior of the above engineered construct or engineered tissues.

The present invention makes use of a precisely defined lateral displacement force that can be controlled and measured by the operator of the instrument. This lateral force is applied near the midsection of a bio-object construct, e.g., a tissue construct, which is anchored at both ends. In one embodiment, the lateral force is applied to the free end of a stiff biological construct that is anchored at the other end, noting that the construct has to be able to support itself as a cantilever, as would be the case for a bone construct. The applied lateral force, which is at right angles relative to the long axis of the anchored tissue construct, will have the effect of bending or deforming the tissue construct in the direction of the applied force. In one embodiment, the force applied to the tissue construct can be delivered via a flexible member, such as a plastic rod probe with known spring characteristics. The spring characteristics of the plastic rod probe can be calibrated so that simple optical measurement of the amount of probe beam bending can be used as a measurement of the force involved in deforming the tissue construct. Thus by optical measurement of both the beam probe bending and the lateral displacement of the tissue construct it is possible to compute the tension in the tissue construct by taking appropriate consideration of the geometry of the probe placement and the length of the anchored tissue construct. In one embodiment, the force can be applied axially at the end of a construct that is anchored at the other end. In certain embodiments, a basic implementation of a combined force measurement and force generation component can utilize an inverted optical microscope equipped with a digital camera system to accomplish the force read-out functionality. Also, the applied force can be precisely controlled by a calibrated mechanical apparatus, such as a motorized microscope stage or other electromechanical device, that delivers known force to the biological structure under test via a spring-like mechanism in contact with the biological structure. The precise amount of force delivered can be deduced by optical measurement of the spring displacement.

According to embodiments of the present invention, three parameters can be precisely measured: the force applied by the operator-controlled probe, the resulting tissue construct displacement, and the local deformation of the construct in the vicinity of the probe. From these measured parameters detailed information about the biological tissue mechanical stress strain and local viscoelastic deformation characteristics can be obtained. For the important class of muscle contractile tissue it is possible to use the present invention to measure electrically stimulated dynamic contractile force as a function of experimentally imposed static pre-tensioning of the muscle construct. This capability provides a very versatile tool for understanding the dynamics of muscle contraction to research groups studying cardiovascular dynamic activity as a function of drug and environmental conditions.

In addition, the present invention can also be used to provide important information concerning the visco-elastic properties of the biological tissue construct being tested. To accomplish this quantitative evaluation the velocity profile of the motion of the probe relative to the location of the biological tissue construct must be controlled. The present invention can accomplish this via computer control of the servo motor-actuated probe or via controlling the velocity profile of the microscope stage movement for those implementations of the present invention which utilize stage movement to move the construct relative to the probe location. Viscous flow is force rate dependent. For a stepwise application or removal of force, a video recording at an appropriate frame rate will also provide additional information regarding the viscoelastic properties of the construct, in that the tissue may take minutes to hours to respond fully to a change in applied force. In certain embodiments, the controller is capable of sensing the deformation of the construct and then adjusting the position of the construct so as to maintain a desired position despite biological changes in the properties or activity of the construct.

Among other things, one of the key features of the present invention is that it is amenable to high-content well-plate screening, as is used in drug discovery, development, toxicology, and drug safety, as well as for basic research in cell biology and tissue engineering. The intrinsic capability of the instrument to record microscopic images of the tissue construct before, during, and after tension testing procedures provides an extra dimension of high-content data for analysis and correlation with the basic measured dynamic strain tension and muscle actuation forces.

It is well recognized that the periodic, regular application of forces to biological constructs can affect the cellular phenotype and the nature of cell-cell junctions in the biological tissue construct. In the case of cardiac muscle, the periodic application of force will lead to the expression of connexins such as Cx43 and other proteins that form the connections between cardiomyocytes as are required for the mechanical strength and contractile properties of cardiac tissue. The periodic application of force will change the expression levels of a large number of genes, and cause the cellular phenotype to mature, for example from fetal or neonatal to adult. Cells will also modify the mechanical properties of their extracellular matrix as a result of altered tension. The periodic application of a bending force within the developing embryo it is believed to lead to the differentiation of cells that will form the joints versus the bones. By providing a compact and low-cost means of applying periodic forces to cellular tissue constructs while they are being cultured in vitro and measuring the associated mechanical responses, the present invention will enable the study and control of such developmental processes.

It is important to note that in many other force-displacement measurements, a force measurement transducer is stiff, in that there is negligible displacement as the force is varied, and a displacement transducer is soft, in that it does not apply a restoring force when it is displaced. However, according to this invention, the probe is intentionally selected such that its stiffness is approximately matched to that of the object under test, so that control of a single variable, sample displacement, and measurement of distortion of both the sample and the probe provides the requisite force-displacement data. While this approach may limit the dynamic range of the sensor, for the purposes of the study of engineered tissue constructs, a large dynamic range is not needed as long as that range is matched to the limited dynamic range of the construct, and the design of this invention enables a low-cost, small-volume instrument that can be mounted in multiple copies on a cell culture well plate. Further, the present invention could prove very useful in the context of evaluating the structural and functional characteristics of tissue constructs used in drug discovery, development, toxicology, and drug safety, as well as for basic research in cell biology and tissue engineering.

Figure 2B:
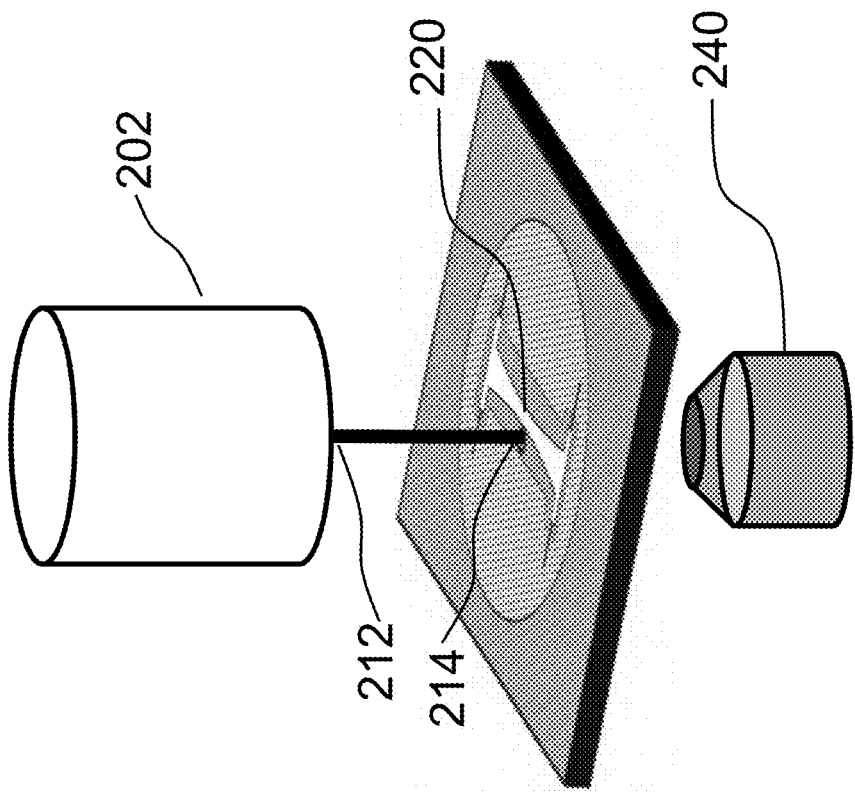
FIG. 2B is a schematic three-dimensional view of FIG. 2A.
Figure 2A:
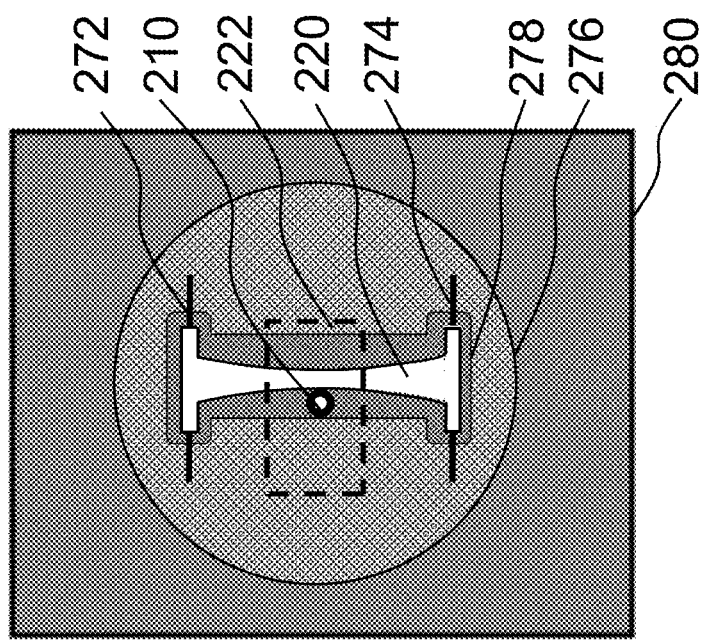
FIG. 2A schematically shows a probe and a bio-object construct supported in a well within a well-plate and as seen in a field of view of a camera according to one embodiment of the present invention.

Referring to FIG. 1A, according to certain embodiments, the present invention provides a system 100 for measuring a tension of a bio-object construct 220 (shown in FIG. 2A). The system 100 includes a probe 110, a moving mechanism 130, and a measuring mechanism 150. The moving mechanism 130 is configured to move the probe 110 toward the bio-object construct 220 or move the bio-object construct 220 toward the probe 110 such that the two are contactable to each other. The measuring mechanism 150 is configured to determine displacements of the probe 110 and the bio-object construct 220 when the probe 110 is in contact with the bio-object construct 220, so as to measure the tension of the bio-object construct 220 according to the determined displacements.

The probe 110 is a simple calibrated flexible probe that bends when force is applied to it. In certain embodiments, the probe 110 has a shape of a cylindrical bar. The bar-shaped probe 100 may have a length in a range of about 5 millimeters (mm)-100 mm. In certain embodiments, the length of the probe 110 is in a range of about 10-40 mm. In one embodiment, the length of the probe 110 is about 23 mm. The bar-shaped probe 110 may have a diameter in a range of about 0.8-1.5 mm. In certain embodiments, the diameter of the probe 110 is in a range of about 0.2-0.8 mm. In one embodiment, the diameter of the probe 110 is about 0.36 mm. The probe 110 is made of a flexible material, and the probe 110 may have a stiffness that substantially matches that of the bio-object construct 220. For example, the probe 110 may be made of a polyether ether ketone (PEEK) plastic. The length and the diameter of the probe 110 may be determined based on the characteristics of the bio-object construct 220 that is to be measured, the material used for the probe 110, and other components of the system 100. For example, one probe 110 may be made of PEEK, with a length of about 23 mm and a diameter of about 0.36 mm. In certain embodiments, the probe 110 may be used with an inverted microscope. The probe 110 has a first end and a second end. The first end of the probe 110 may be fixed to the condenser of the inverted microscope, and the second end of the probe 110 extends along a vertical direction downward. The probe 110 is adjustable along the vertical direction, such that the second end of the probe 110 is located in a path in the horizontal direction along which a central portion of the bio-object construct 220 moves. In certain embodiments, the probe 110 is a tube.

In certain embodiments, the probe 110 is calibrated before measuring the tension of the bio-object construct 220. The probe 110, when being bent, has a curvature which is a function of the force that it applies to the bio-object construct 220 when the bio-object construct 220 is moved laterally.

The moving mechanism 130 is configured to move at least one of the probe 110 and the bio-object construct 220 such that the probe 110 is contactable with the bio-object construct 220. In certain embodiments, the moving mechanism 130 may be a movable stage of an inverted microscope. The movable stage 130 may be movable in the horizontal plane and have an X coordinate and Y coordinate. The X and Y coordinates can be used to determine the location of the movable stage accurately. The bio-object construct 220 may be located in a construct holding member 170, and fixed to the stage via the construct holding member 170. In certain embodiments, the probe 110 is stationary and the bio-object construct 220 is movable, and the movable stage moves the bio-object construct 220 in the horizontal plane such that the bio-object construct is contactable to the second end of the probe 110. The movements of the bio-object construct 220 or the movable stage 130 need to be adjusted and controlled precisely for the purpose of accurate measurement. In certain embodiments, the movable stage has a displacement in a range of about 1-3000 μm and a maximum velocity of about 15-60 mm/sec. In one example, the movable stage has a displacement in a range of about 1-1500 μm and a maximum velocity of about 30 mm/sec. The movable stage 130 may have a read-out for outputting the XY location of the movable stage. In certain embodiments, the moving mechanism 130 is not limited to the movable stage of the inverted microscope, as long as the moving mechanism 130 is able to drive the at least one of the probe 110 and the bio-object construct 220 toward each other for contacting. For example, the moving mechanism 130 may be a small servo motor that is fixable to a well plate for measuring the bio-object construct 220 that is fixed in at least one well of the well plate, or the moving mechanism 130 could be a frame that is in turn moved laterally or axially by a servo motor or other mechanical actuator.

The measuring mechanism 150 is configured to determine displacements of the probe 110 and the bio-object construct 220 when the probe 110 is in contact with the bio-object construct 220, so as to measure the tension of the bio-object construct 220 according to the determined displacements. In certain embodiments, the measuring mechanism 150 includes a detector coupled to the microscope for determining the displacement of the second end of the probe 110 and the displacement of the bio-object construct 220. In certain embodiments, the measuring mechanism 150 includes one or more cameras, or one or more CCD image sensors, for acquiring images of the probe and the bio-object construct. In one example, the measuring mechanism 150 is a camera attached to a microscope, such as an inverted microscope. The second end of the probe 110 is located substantially in the center of a field of view of the camera 150, such that the camera 150 is able to acquire images of the probe 110 and the bio-object construct 220 before and after their contact. The displacements of the probe 110 and the bio-object construct 220 are determined based on the acquired images. In certain embodiments, the camera 150 has a high definition or a large number of pixels, such that the displacements of the probe 110 and the bio-object construct 220 can be determined accurately. The measuring mechanism 150 may also be other types of detectors such as a CCD detector. In one example, a standard laboratory inverted microscope imaging measurement system can act as the measuring mechanism 150 to detect the small deflections of the probe 110 when the probe 110 is brought into contact with the test object, typically an artificial tissue construct, although the device could also be used to measure other materials. In certain embodiments, the measuring mechanism 150 is a self-contained CCD camera with built in illumination, as is typically used for inspection systems use for quality control of small parts, that is placed beneath the construct holding chamber 170.

In certain embodiments, either a standard laboratory inverted microscope or a similar device that can image small structures can be utilized to practice the present invention. In certain embodiments, the microscope has a mechanical stage that allows the test sample to be moved in a precise and calibrated fashion and also an electronic camera for documenting the acquired images. In this case, the mechanical stage acts as the moving mechanism 130 and the electronic camera acts as the measuring mechanism 150.

In certain embodiments, the system 100 further includes a construct holding member 170 to hold the bio-object construct 220 in place. The construct holding member 170 may be disposed in a well of a well plate, and may fix one or both ends of the bio-object construct 220.

In certain embodiments, the system 100 further includes a controller 190 in communication with at least one of the measuring mechanism 150 and the moving mechanism 130. In certain embodiments, the controller 190 may be a computing device having one or more image processing processors. In certain embodiments, the controller 190 is in communication with the measuring mechanism 150 and is configured to process the images acquired by the measuring mechanism 150 to obtain the displacements of the probe 110 and the bio-object construct 220. In certain embodiments, the controller 190 may be further configured to determine a local deformation of the bio-object construct 220 around a contact location between the probe 110 and the bio-object construct 220. In one example, a computer device of the camera of the microscope acts as the controller 190. In certain embodiments, the controller 190 may be in communication with the moving mechanism 130 to control the movement of the moving mechanism 130. The moving mechanism 130 may be controlled by another controller that is different from the controller 190. In certain embodiments, the controller 190 can be used for long-term observation of a bio-object construct 220 that is undergoing growth and/or development, with a concomitant change in the mechanical properties of the construct 220, such that the controller 220 can be used to adjust the moving mechanism 130 to maintain a desired location, sensitivity, or deflection of the probe 110.

Figure 1B:
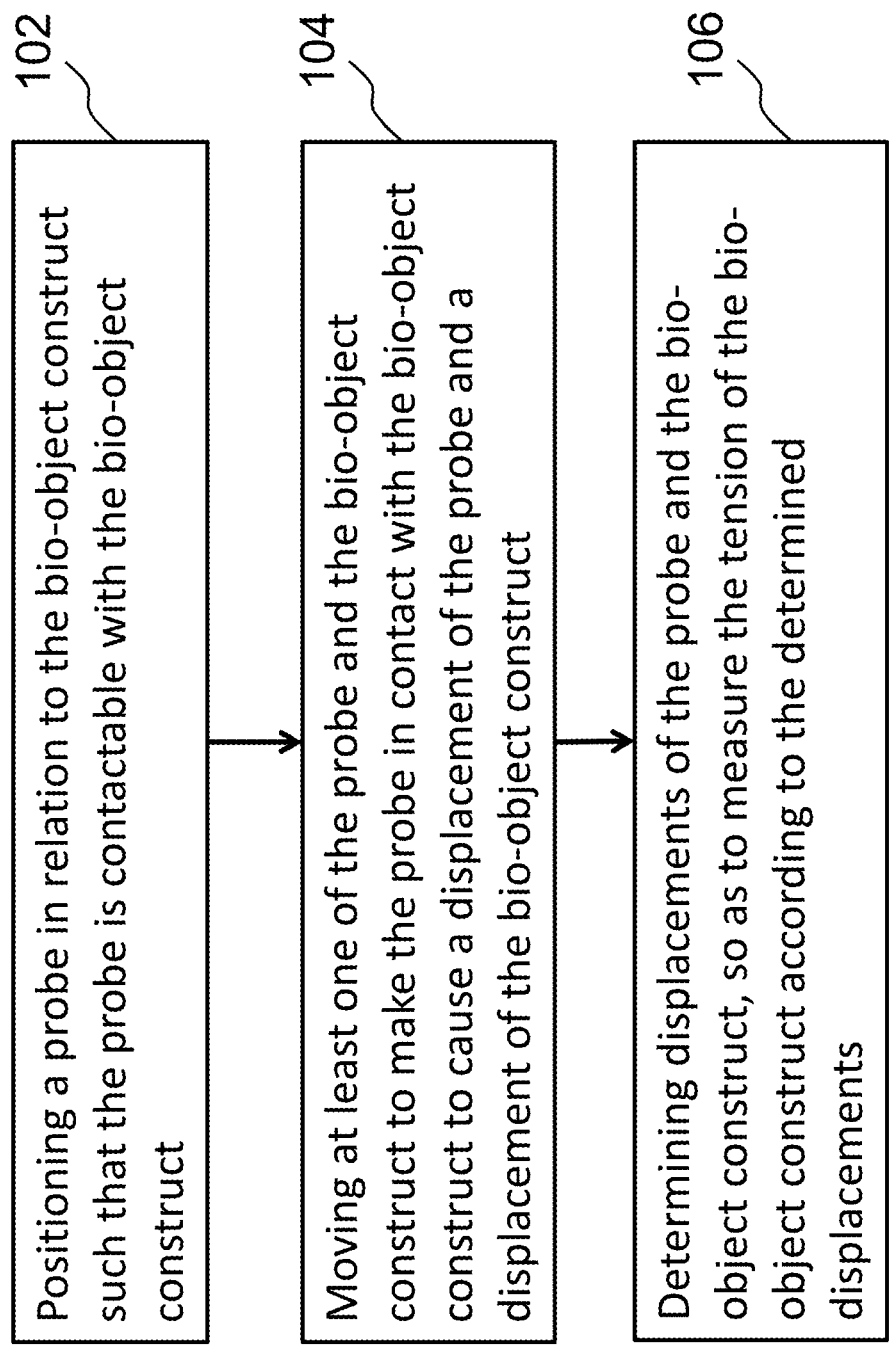
FIG. 1B schematically shows a method for measuring tension of a construct according to certain embodiments of the present invention.

FIG. 1B shows a method for measuring tensions according to certain embodiments of the present invention. In certain embodiments, the method can be performed using the system or device described above or described in the following implementations and examples. Referring to FIG. 1B, a method for measuring tensions of a construct includes operations of 102, 104 and 106. At operation 102, a probe 110 is positioned in relation to the bio-object construct 220 such that the probe 110 is contactable with the bio-object construct 220. At operation 104, at least one of the probe 110 and the bio-object construct 220 is moved toward the other to make the probe 110 in contact with the bio-object construct 220. At operation 106, when the probe 110 is in contact with the bio-object construct 220, displacements of the probe 110 and the bio-object construct 220 are determined so as to both measure the tension of the construct according to the determined displacements, and to apply an increased tension as desired. In certain embodiments, this increased tension can either be gradual or pulsatile, or both. Gradual tension could lead to a change in the mechanical and biological properties of the bio-object construct 220, for example to stimulate growth, to stimulate the modification of the extracellular matrix, or to simulate the pathological changes of cardiac hypertrophy associated with chronic high blood pressure. Pulsatile tension could lead to a change in the expression levels of various genes in the bio-object construct, for example those associated with the maturation of cardiomyocytes from fetal to adult phenotypes. Cyclic tension could lead to flexing of a construct in a manner to simulate the physiological processes active in an embryo that are associated with the differentiation of cells into phenotypes appropriate for either bones or joints between bones.

In certain embodiments, the method further includes calibrating the displacement of the probe 110 to a force before the measurement of the tension of the bio-object construct 220. In certain embodiments, the method further includes monitoring a relative location of the probe 110 and the bio-object construct 220. In certain embodiments, the step of monitoring the relative location is performed with a microscope having a condenser, an objective and a stage positioned therebetween, where the bio-object construct 220 is disposed on the stage. In certain embodiments, the calibration of the probe 110 involves the measurement of the deflection of the probe 110 at differing applied forces, either by the application of known weights to the end of a horizontal probe 110 and measurement of the resulting deflection, or by moving the end of the probe 110 a known distance while a force transducer, such as an analytical balance, measures the resulting force.

In certain embodiments, the probe 110 includes a first end and a second end, and the step 102 of positioning the probe includes fixing the first end of the probe 110 to the condenser of the microscope, and placing the second end of the probe 110 in a holding member of the bio-object construct 220, where the holding member is fixed to the stage of the microscope.

In certain embodiments, the step 104 of moving the at least one of the probe 110 and the bio-object construct 220 includes moving the stage of a microscope, thereby moving the bio-object construct 220 in the holding member toward the probe 110. In certain embodiments, the probe 110 has a stiffness that matches a stiffness of the bio-object construct 220.

In certain embodiments, the step 106 of determining the displacements of the probe 110 and the bio-object construct 220 includes acquiring images of the probe 110 and the bio-object construct 220.

Figure 6:
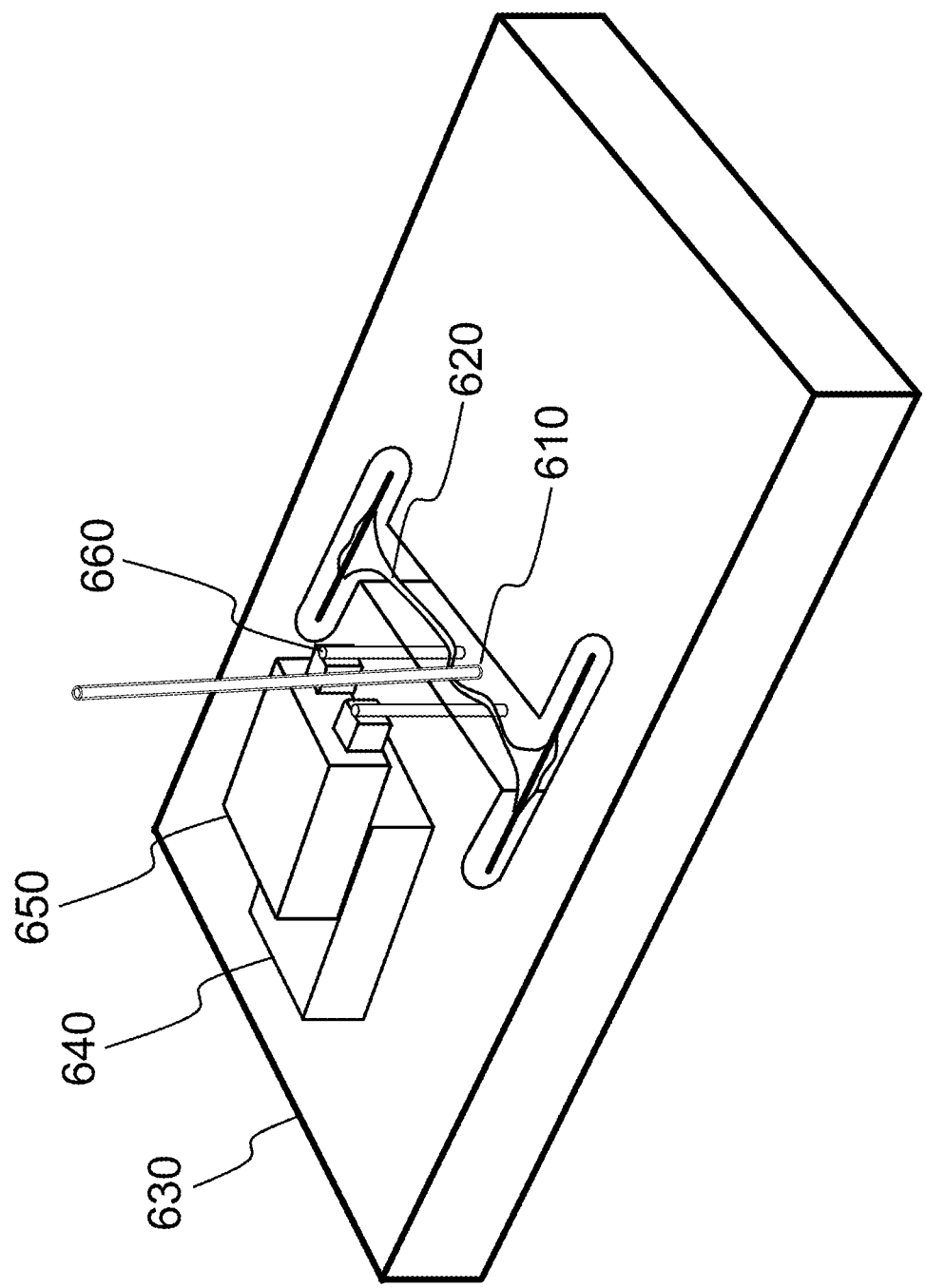
FIG. 6 schematically shows a device for providing a baseline tension to a tissue construct, both during tissue construct growth and measuring of construct elasticity.

In certain embodiments, the method further includes, before the step 104 of moving the at least one of the probe and the bio-object construct: providing at least one rigid rod; and moving the at least one rigid rod toward the bio-object construct such that the at least one rigid rod is in contact with the bio-object construct and causes the bio-object construct to deform. In one example, as shown in FIG. 6, the two rigid rods 660 cause a pre-tension of the bio-object construct 620 from the left side of the bio-object construct 620, before the measuring of the tension using the probe 610 from the right side of the bio-object construct 620.

As detailed below and for example shown in FIGS. 2A-2C, in operation, a user positions the flexible probe 210 to be in lateral contact with the biological structure 220 to be tested. The biological structure 220 must be rigidly attached to some structure, typically a special purpose well-plate bioreactor, at one or two well-defined locations. The well plate must be securely attached to the movable microscope stage. The other portions of the biological structure 220 must be "floating," that is to say, not rigidly attached. When the user moves the microscope stage, the stationary probe 210 (located more or less directly above the objective lens) will push against the biological construct 220. As the stage and the biological structure 220 move, the flexible probe 210 experiences a force that causes it to bend. In the initial location, before the stage was moved, the probe 210 extended straight downward towards the objective of the inverted microscope. The microscope can focus on the tip of the probe 210, and the microscope camera can record its exact XY position. When the stage moves, and the probe 210 bends, then there will be apparent motion in the camera's frame of reference. The amount that the probe tip bends can be measured by noting the change in XY position relative to the initial starting location. For small XY displacements the amount of movement is directly proportional to the force exerted on the probe. This force vs. deflection relationship can be calibrated for each individual type of probe rod. Thus, if a calibrated flexible probe is used, then probe deflection is a good measure of force.

Specifically, FIGS. 2A-2D schematically show the operation of the measuring device 100. As shown in FIGS. 2A and 2B, a probe 210 and a bio-object construct 220 are in a field of view 222 of a camera operating through the objective 240 according to one embodiment of the present invention, where the probe 210 is immediately adjacent to but not in contact with the bio-object construct 220. The probe 210 has a first end 212 and a second end or tip 214. The first end 212 is fixed on, for example, a condenser 202 of the camera of a microscope. The second end 214 extends away from the condenser 202, and is located in the moving path of the bio-object construct 220. The construct holding member includes a first fixing portion 272 and a second fixing portion 274. In some embodiments, the fixing portion is a wire, for example made from titanium, or a set of twisted titanium wires. In one embodiment, the fixing portion is a hollow tube with a side penetration as required for vascular perfusion of the center of the bio-object tissue construct. The two ends of the bio-object construct 220 are respectively fixed by the first fixing portion 272 and the second fixing portion 274. In certain embodiments, the bio-object construct 220 may also be fixed in only one end. In this example, the bio-object construct 220 is disposed in a horizontal plane, and the probe 210 is disposed vertically and perpendicular to the horizontal plane. Further, the second end 214 of the probe 210 is basically disposed within the horizontal plane where the bio-object construct 220 locates, and disposed in a normal direction of the central portion of the bio-object construct 220.

In certain embodiments, the fixing portions or objects 272 and 274 are held by a disk 276 that has a cavity 278 within it to support the matrix-cell mixture during culture during, for example, the initial growth phases where the interactions between the cells and the collagen matrix leads to a condensation of the construct from the shape of the molding cavity 278 to the final shape of the construct 274. In certain embodiments, the disk 276 is supported by a well plate 280 into whose wells the disks 276 fit.

Figure 2D:
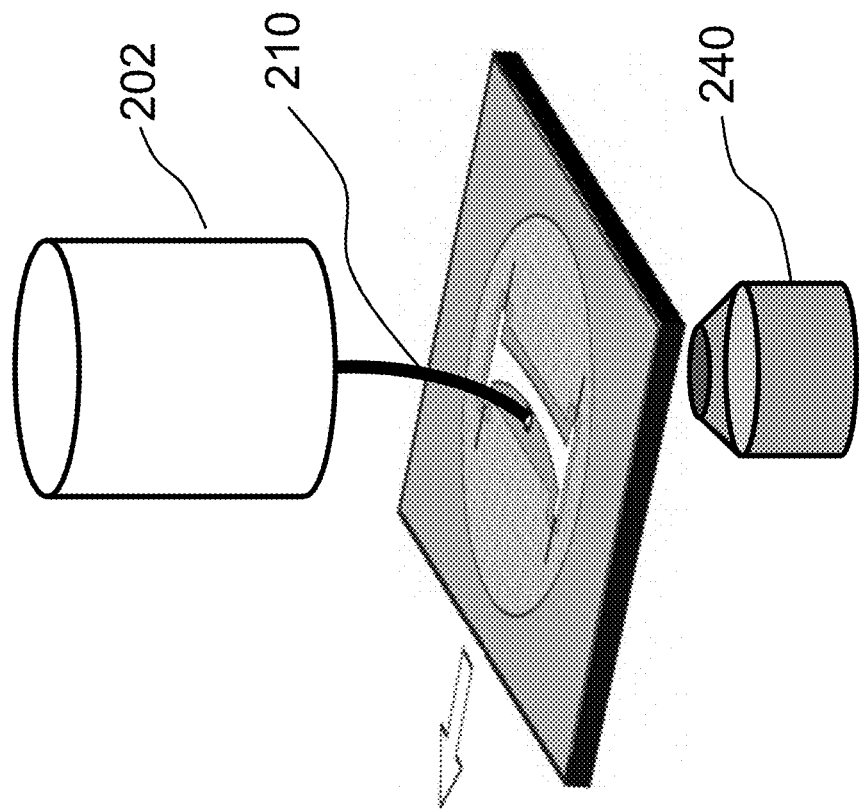
FIG. 2D is a schematic three-dimensional view of FIG. 2C.
Figure 2C:
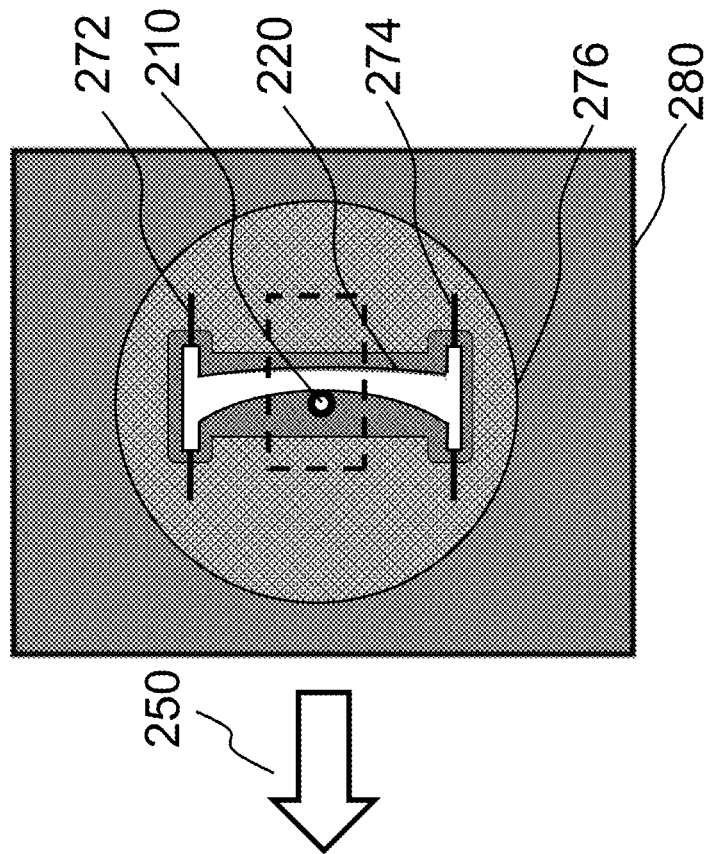
FIG. 2C schematically shows a probe and a bio-object construct having moved with the a field of view of a stationary camera according to one embodiment of the present invention, where the probe is in contact with the bio-object construct.

During measurement of the tension of the bio-object construct 220, as shown in FIG. 2C and FIG. 2D, the well-plate 280, the disk 276 that it contains, the fixing portions 272 and 274, and bio-object construct 220 that they support moves 250 toward the probe 210, and is in contact with the probe 210. The movement of the bio-object construct 220 may be realized by using, for example, a movable stage of the microscope. By the accurate control of the movable stage, the bio-object construct 220 pushes the second end 214 of the probe 210 such that the probe 210 bends, as shown in FIG. 2D. The bending probe 210 applies a force against the bio-object construct 220. As a result, the bio-object construct 220 deforms from the center portion while exerting a counter force against the probe 210. It is noted that, to avoid release of the second end 214 of the probe 210 from the center portion of the bio-object construct 220 due to the bending of the probe 210, the second end 214 may have a small section passing through the horizontal plane where the bio-construct 220 resides.

Figure 4A:
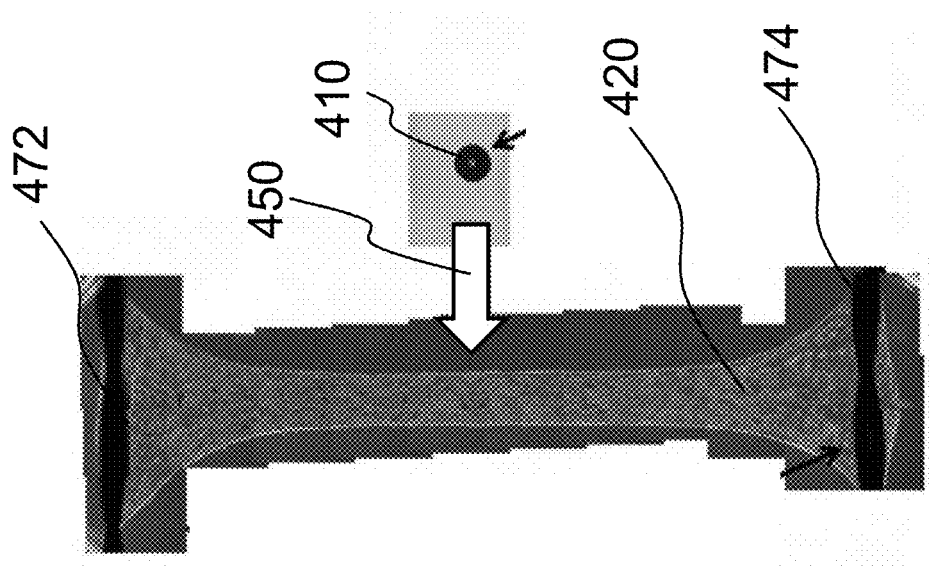
FIG. 4A schematically shows an experimental setup of FIG. 3D.
Figure 4B:
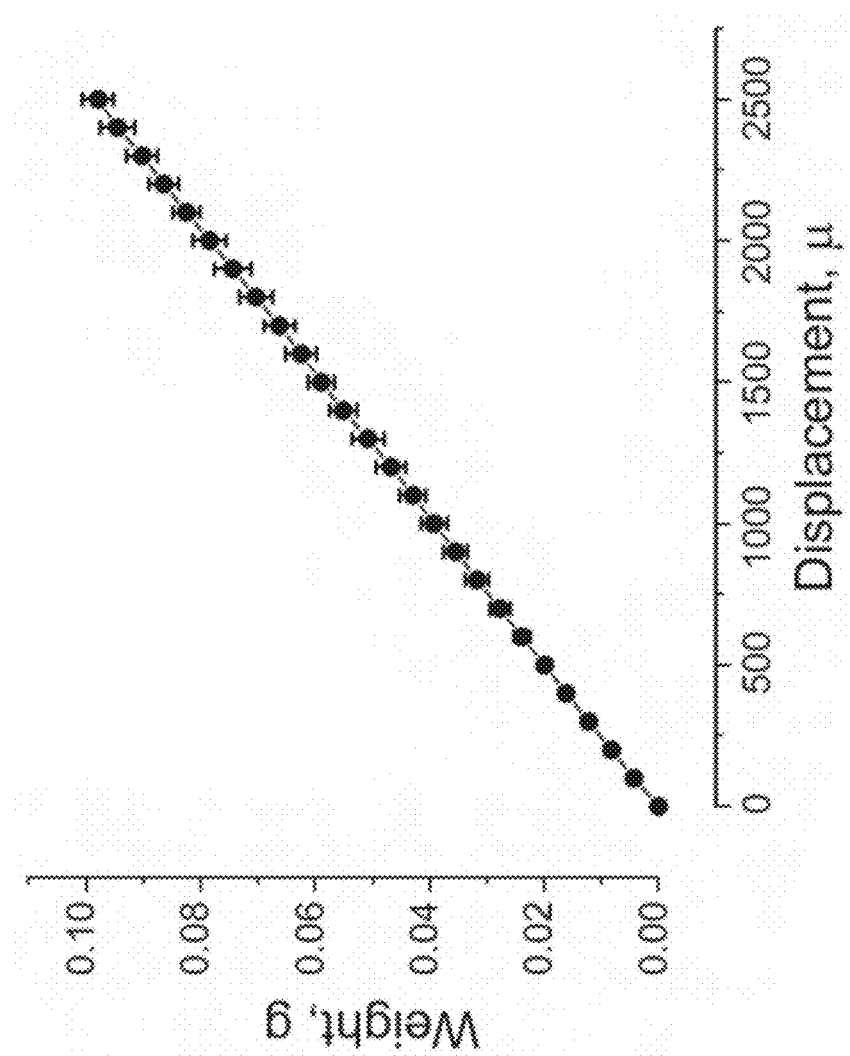
FIG. 4B is a calibration of a probe according to one embodiment of the present invention.
Figure 4C:
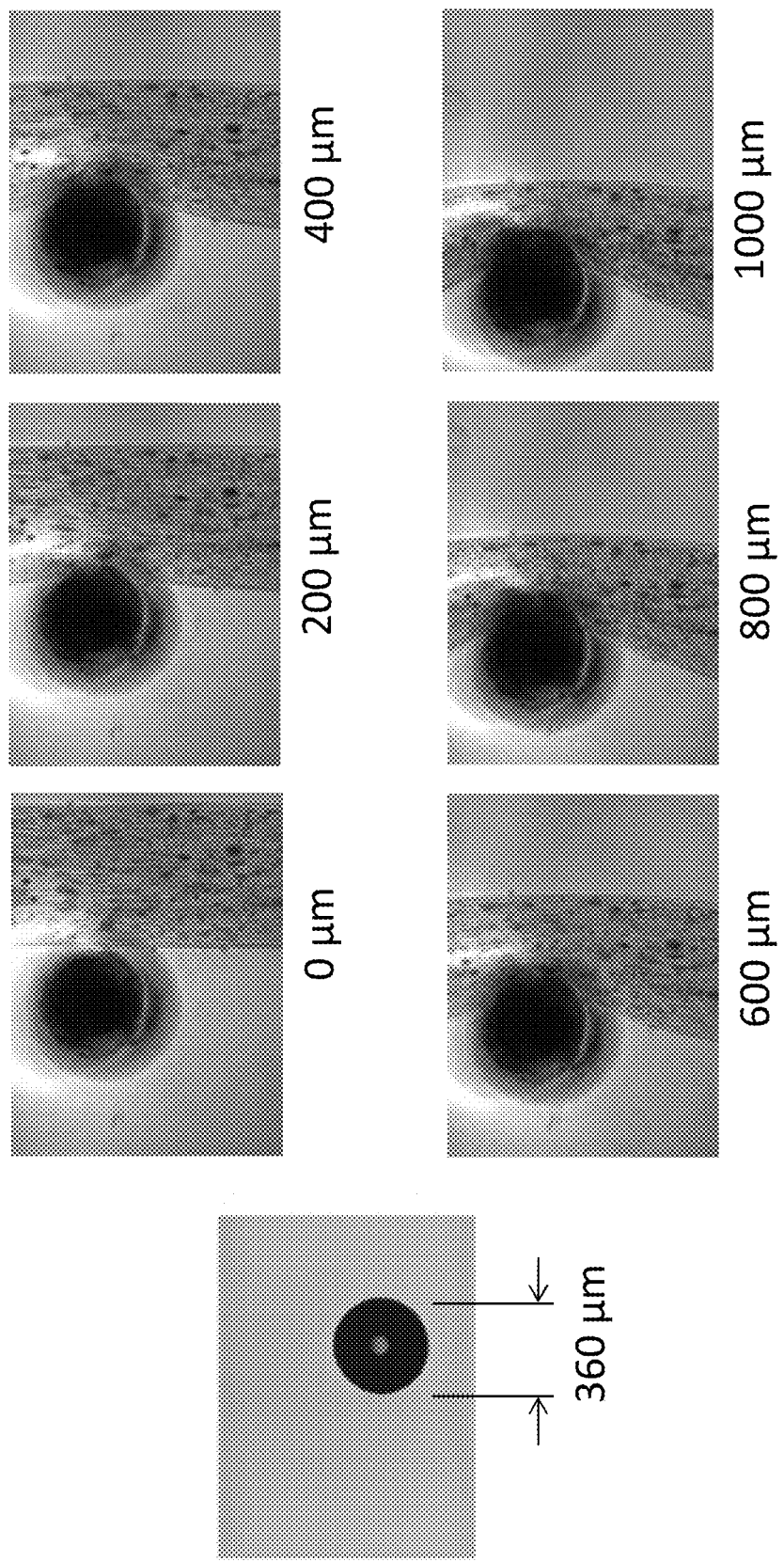
FIG. 4C shows acquired images of a bending probe that is being displaced to the left while the force is stretching a bio-object construct according to one embodiment of the present invention.
Figure 4D:
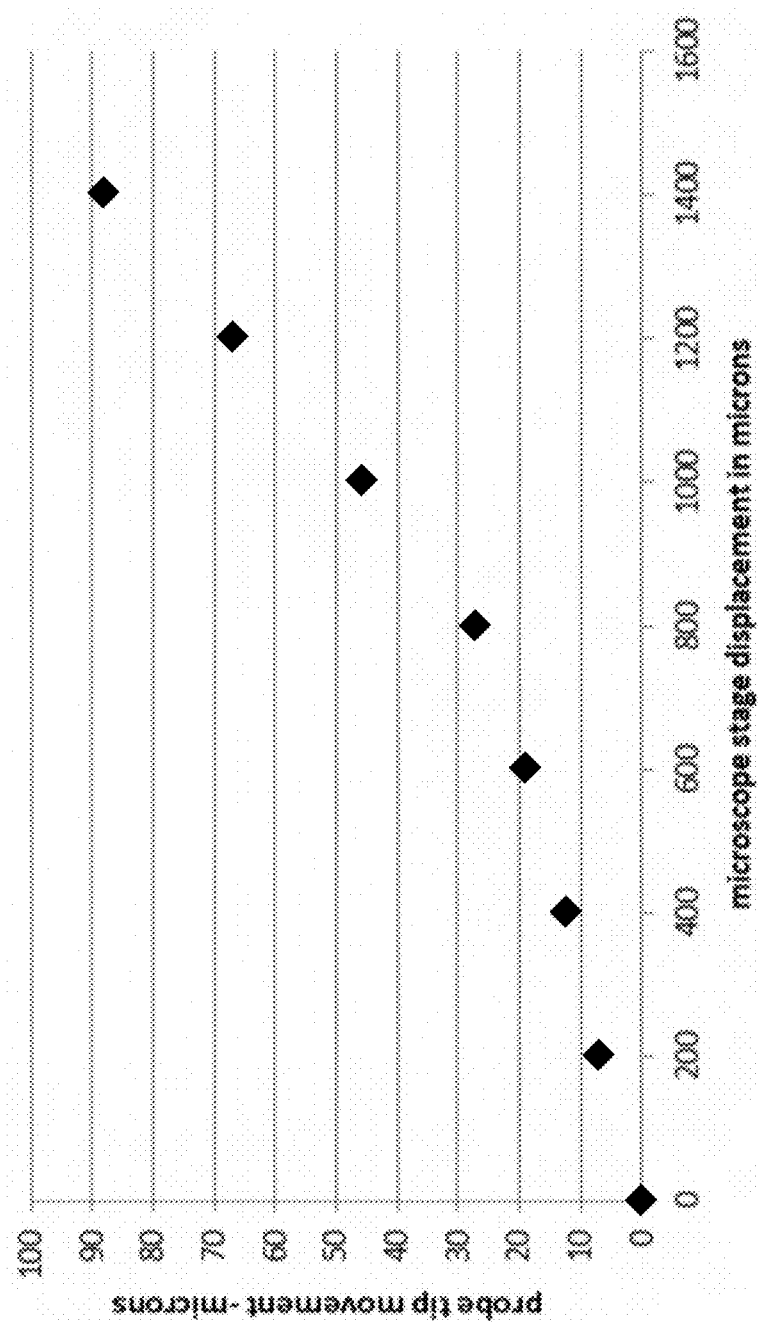
FIG. 4D shows analytical data of a tension measurement according to one embodiment of the present invention.

Images are continuously acquired or acquired in a predetermined frequency by the camera. FIG. 4A shows how multiple high-resolution images of a cardiac tissue construct can be stitched together to create a larger montage of the entire construct. In this case prior to the lateral displacement 450 that will bring the probe 410 into contact with the construct 420. In some applications of this invention, the passive properties of the bio-object construct are determined by a series of measurements at different stage displacements 250 to determine the stress-strain properties of the bio-object construct. In others, the changes in these stress-strain properties are of interest during and as a result of electrical stimulation of the construct. In this case, a time series of images are recorded for each of several stage displacements 250. In each image, the displacement of the second end of the probe 210 and the corresponding displacement and deformation of the bio-object construct 220 can be determined. Based on those displacements, length-tension characters of the bio-object construct 220 can be calculated. FIGS. 4B-4D show the data collection and analysis according to certain embodiments of the present invention. Referring to FIG. 4B, the probe 210 or 410 is calibrated using either application of weights to a horizontal probe, or displacement of a probe as it is pushed against an electronic force transducer or analytical balance, or some other means, thereby relating its bending to a force applied. Referring to FIG. 4C, with different stage displacements 450, images are collected so that the displacements of the probe 210 and the bio-object construct 220, and possible deformation or bending of the bio-object construct 220, can be determined by analyzing those high-definition images. The tension of the bio-object construct 220 under different forces thus can be calculated based on those displacement and deformation data. FIG. 4D demonstrates how the measurement of probe displacement as a function of microscope stage displacement can reveal that the tissue construct exhibits a non-linear stress-strain relationship.

Figure 2E:
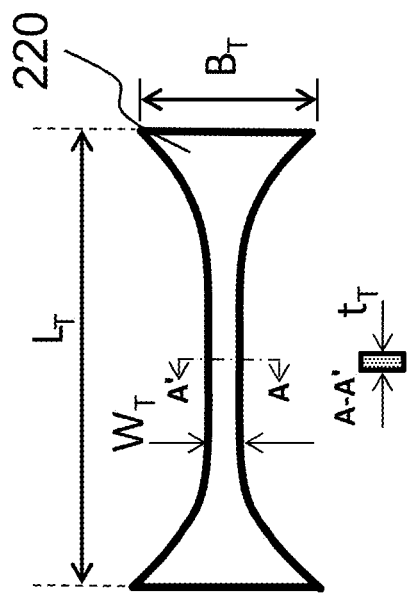
FIG. 2E schematically shows characters of a bio-object construct according to one embodiment of the present invention.
Figure 2F:
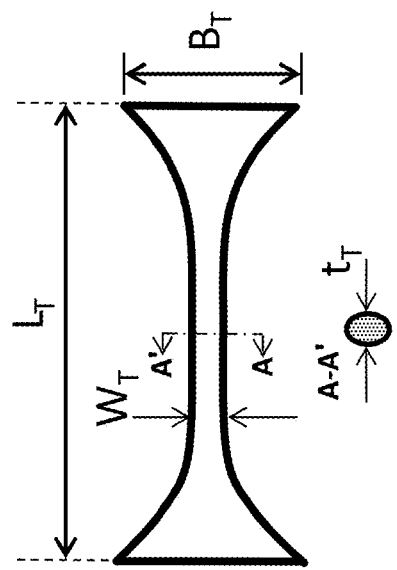
FIG. 2F schematically shows characters of a bio-object construct according to one embodiment of the present invention.
Figure 2G:
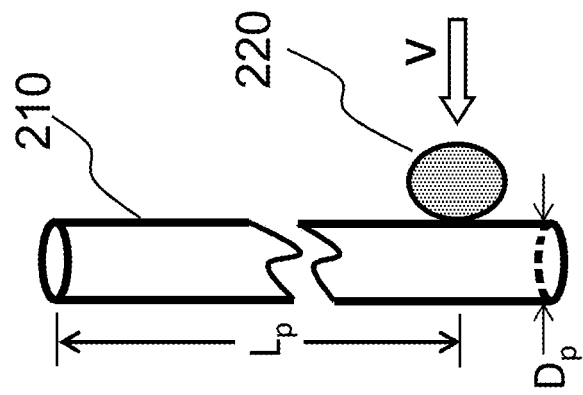
FIG. 2G schematically shows characters of a probe according to one embodiment of the present invention.

Referring back to FIGS. 2E, 2F and 2G, the characteristics of a probe 210 and a bio-object construct 220 according to one embodiment of the present invention, which are usable in the experimental setup shown in FIGS. 2A-2D, are provided. In FIG. 2G, the probe 210 is basically shown in a side view, while the bio-object construct 220 is basically shown in a top view. As shown in FIG. 2F, the probe 210 may be a bar that has a circular cross-section. The probe 210 has a length $L_p$ and a diameter $D_p$. In one example, the length Lp is about 23 mm and the diameter $D_p$ is about 0.36 mm. As shown in FIGS. 2E and 2F, the bio-object construct 220 has length $L_t$. Each of two ends of the bio-object construct 220 has a larger width $B_t$. The width of the bio-object construct 220 decreases from the two ends toward the center portion from $B_t$ to $W_t$. The bio-object construct 220 in FIG. 2E has a rectangular cross-section with thickness Tt along the vertical direction, while that in FIG. 2F has an ovoid cross-section of dimensions $W_T$ and $t_T$. In one example, the bio-object construct 220 has a length $L_T$ of about 6.7 mm, a width $B_T$ of about 3 mm, a width $W_T$ of about 0.3 mm, and a thickness of about 0.3 mm. In certain embodiments, the probe 210 is made of a PEEK plastic, and the bio-object construct 220 is a soft tissue, and the stiffness of the probe 210 substantially matches the stiffness of the bio-object 220. In certain embodiments, the bio-object construct 220 is moved by the stage of a microscope, and the displacement range of the stage is about 0-1500 μm, and the maximum moving velocity of the stage is about 30 mm/sec.

These and other aspects of the present invention are further described in the following section. Without intending to limit the scope of the invention, further exemplary implementations of the present invention according to the embodiments of the present invention are given below. Note that titles or subtitles may be used in the examples for the convenience of a reader, which in no way should limit the scope of the invention. Moreover, certain theories are proposed and disclosed herein; however, in no way should they, whether they are right or wrong, limit the scope of the invention so long as the invention is practiced according to the invention without regard for any particular theory or scheme of action.

Example 1

A Microscope Stage Force Actuation with Microscope Camera Optical Read-Out

In this example, the present invention provides a microscope stage force actuation with microscope camera optical read-out. FIG. 3A schematically shows a setup of the system according to one embodiment of the present invention. In this embodiment, the system is configured with an inverted microscope. Referring to FIG. 3A, the inverted microscope includes a condenser 302, an objective 340, and a movable stage 330 located between the condenser 302 and the objective 340. The probe 310 is attached to the condenser 302 and extends to the construct holding member 370. The bio-object construct 320 is fixed to the bottom of the construct holding member 370. In certain embodiments, the bio-object construct 320 is immersed in a growth medium 375, so that the measurement can be performed during different growth stages of the bio-object construct 320. In certain embodiments, the measurement process is non-destructive to the bio-object construct 320.

Figure 3B:
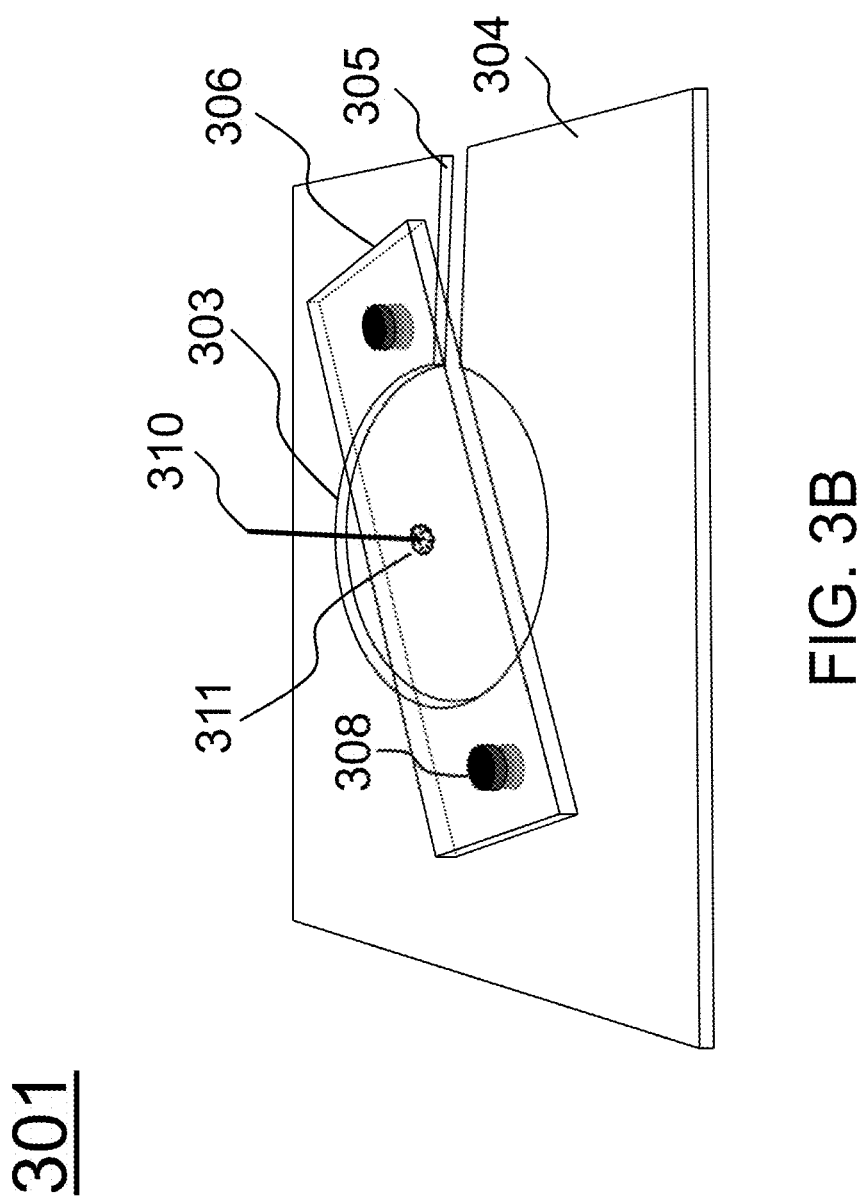
FIG. 3B schematically shows an assembly for mounting a probe according to one embodiment of the present invention.

The probe 310 is attached to the condenser 302 through an assembly 301. As shown in FIG. 3B, the assembly 301 includes a support plate 304, an adjuster 306, and positioning members 308. The support plate 304 attaches to the condenser 302, and has a through hole 303 basically formed in the center part of the support plate 304, such that the support plate 304 can be sleeved around the condenser 302. The support plate 304 further includes a slot 305 that extends from the edge of the through hole 303 toward and all the way through one side of the support plate 304. The slot 305 is used for clamping the support plate with the condenser 302. The adjuster 306 is disposed on the support plate 304 and is adjustable relative to the support plate 304 through the positioning members 308. In this embodiment, each positioning member 308 includes two pairs of magnets. Two magnets of each pair are respectively disposed on outer sides of the support plate 304 and the adjuster 306, and hold the support plate 304 and the adjuster 306 together. The probe 310 is substantially located in the center portion of the adjuster 306, is held in place by being inserted in a through-hole in 306 and adhesive 310 so that it is perpendicular to the plate surface of the adjuster 306. The probe 310 is located corresponding to the center of the through hole 303 of the support plate 304, and extends away from the through hole 303. After installing the assembly 301 to the bottom portion of the condenser 302, the probe 310 basically extends downward toward the stage 330 and the objective 340.

Figure 3C:
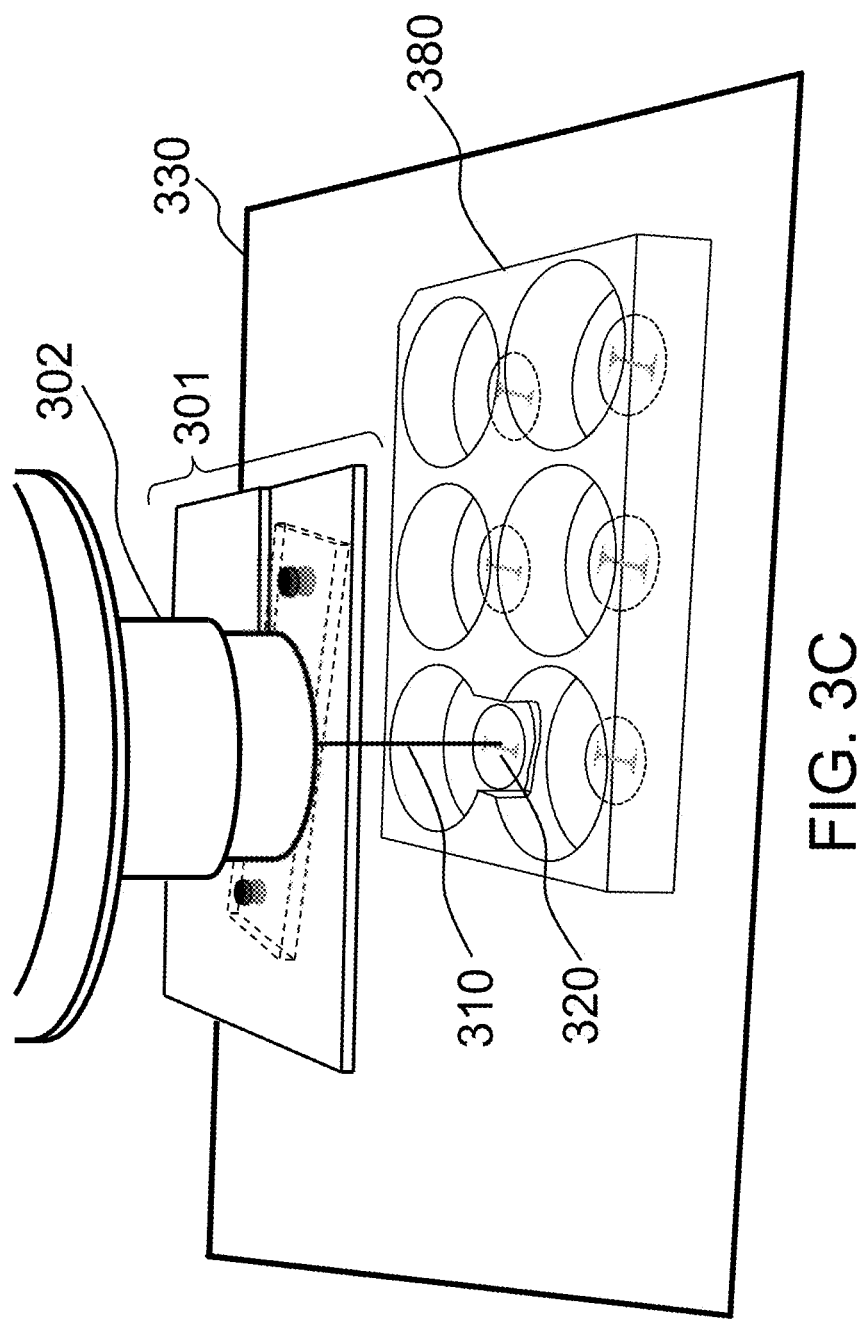
FIG. 3C schematically shows mounting of the assembly in FIG. 3B to an inverted microscope.
Figure 3D:
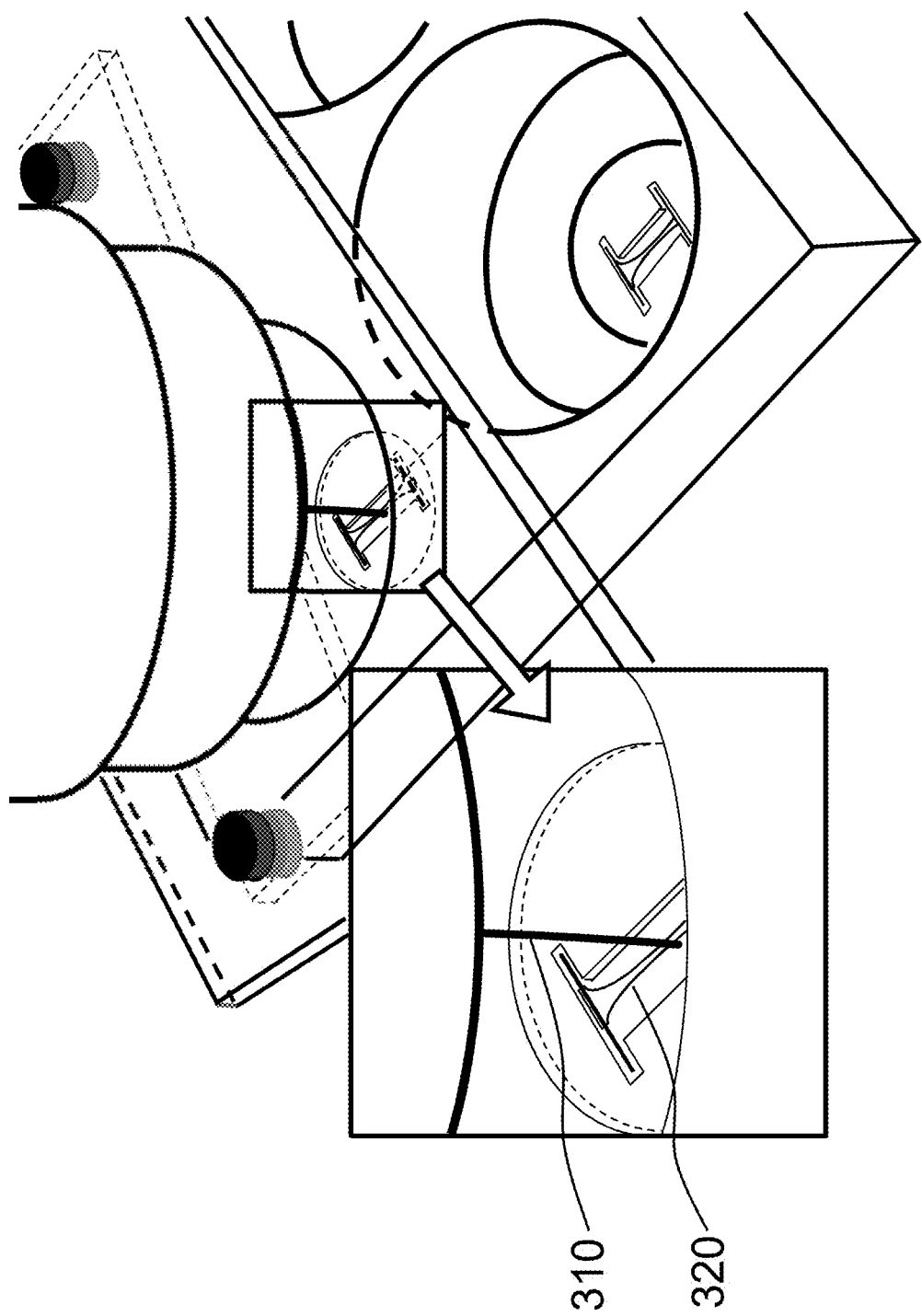
FIG. 3D schematically shows positioning the probe in FIG. 3C next to the tissue-equivalent construct that contains cells embedded in collagen or some other matrix.

FIG. 3C schematically shows mounting of the assembly in FIG. 3B to an inverted microscope. As shown in FIG. 3C, the assembly 301 is mounted to the condenser 302 of the inverted microscope. The adjuster 306 is held in place on the lower side of the support plate 304 by two pairs of magnets 308. The bio-object construct 320, which is a cell/collagen construct in this example, is fixed in a well of a well plate 380. The cell/collagen construct 320 is positioned in the optical field, or in other words aligned with the objective 340. Once the cell/collagen construct 320 is positioned in the optical field, the probe 310 is moved to or adjusted to the desired position adjacent to the cell/collagen construct 320 by means of the microscope stage 330. FIG. 3D schematically shows that the probe 310 is positioned next to the cell/collagen construct 320, and is ready for measurement.

FIG. 4A schematically shows the experimental setup of FIG. 3D. A shown in FIG. 4A, the cell/collagen construct 420 is fixed at both ends by the first fixing portion 472 and the second fixing portion 474. In this example, the first fixing portion 472 and the second fixing portion 474 are twisted-wire rigid anchors. A mixture of collagen and fibroblasts organizes itself into a flexible oriented construct, i.e., the cell/collagen construct 420. The cell/collagen construct 420 spans the 7 mm distance between the 2 pairs of rigid support wires. The probe 410 is calibrated before the measurement. During measurement, the probe 410 is forced against the cell/collagen construct by stage displacement 450 to cause an observable deflection of both the probe 410 and the cell/collagen construct 420.

FIG. 4B shows a typical force vs. probe deflection calibration graph, which illustrates the linear relationship between small deflections of a specific probe of the specific length used in the device illustrated in FIG. 3A. Specifically, FIG. 4B shows a calibration graph of the probe 410 that resulted from 3 flexible probes, with 2 measurements for each probe at each plotted point. The X axis is the displacement of the second end or the free end of the probe 410 in the lateral direction, and the Y axis is the force applied to the probe 410. This graph illustrates that probe bending can provide an accurate measure of force.

FIG. 4C shows a series of acquired images using the above experimental setup. A tip or the free end of a 360 μm diameter probe 410 is shown in the first image using a 10× objective and differential interference contrast (DIC) microscopy. The other images sequentially show stage displacement of 0, 200 μm, 400 μm, 600 μm, 800 μm, and 1000 μm, respectively. The results are analyzed and certain analytical data are shown in FIG. 4D. In the figure, the X axis is the displacement of the microscope stage in microns, and the Y axis is the probe tip movement in microns. It can be seen that the tissue construct has a non-linear stress strain relationship under the experimental conditions described above. The construct used in this experiment is a C57 cell structure evaluated 36 days after initial loading of collagen with cells. The initial width of the cell/collagen construct is about 3 mm. The contracted width of the collagen is approximately 400 μm. The deformation is measured at the midpoint of the 7.2 mm length of the construct. The microscope visualizes the deformation vs. the known movement of the microscope stage.

Figure 4E:
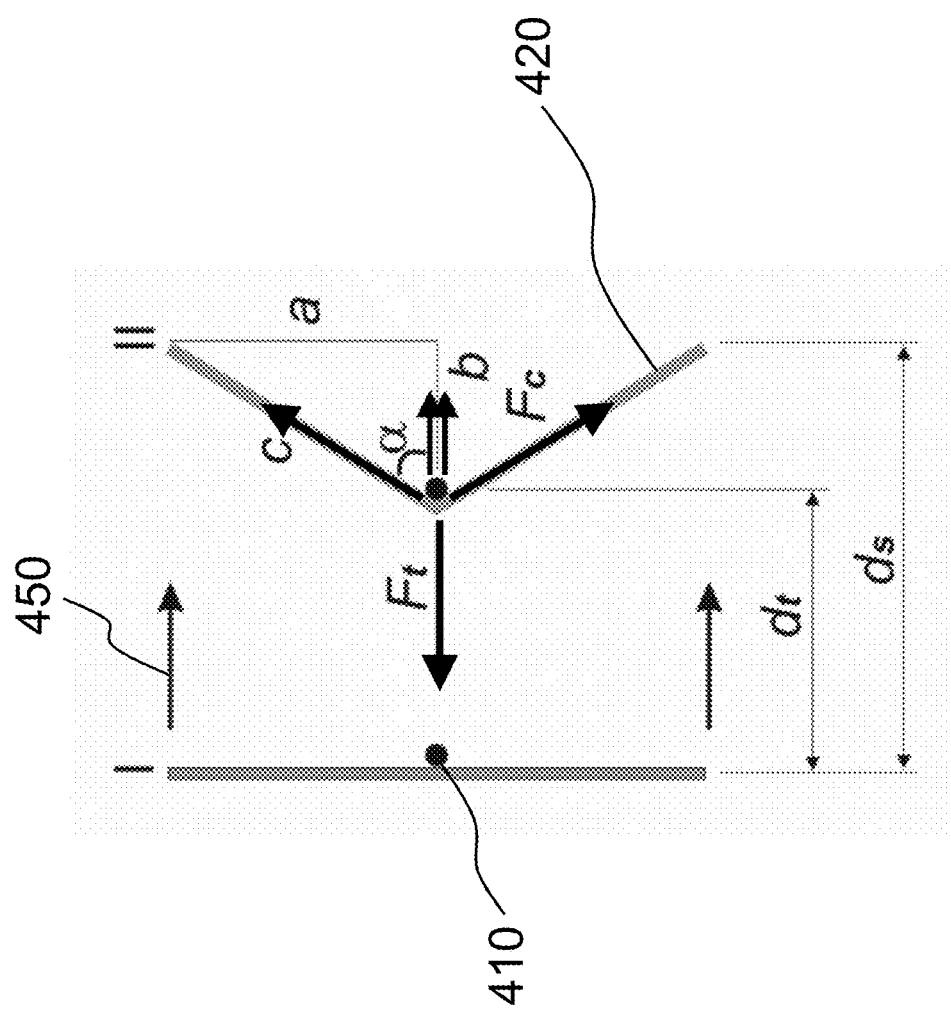
FIG. 4E shows the force vectors and geometry used to convert a measurement of a displacement of the probe to the determination of the elastic modulus of the construct.

FIG. 4E shows a diagram of the geometry of the bio-object construct 420 during an experiment designed to determine the elasticity of the construct, which is represented by a thick gray line. The black spot 410 at the middle of the construct marks the location of the tip of the flexible probe 410. The black arrows 450 indicate the amplitude and direction of the shift of the motorized stage supporting the construct from the first (I) to the second (II) position for distance $d_s$. When the stage moves, the flexible probe 410 bends, the tip position relocates, and the force $F_t$ is applied to the ECTC. This force is balanced by the pair of forces ($F_c$) collinear with the upper and lower halves of the ECTC. The horizontal projections of the two $F_c$ forces are the two parallel vectors shown by the two short black arrows. For a better illustration, the stretch of the ECTC is exaggerated. Commonly it was around 3.5% (FIG. 4C), and α is close to a right angle (about 75°). Note that the diameter of the construct 420 is small relative to both its length and the lateral displacement, and hence it can be treated, for this analysis, as a one-dimensional cable.

The elastic modulus was computed as a stress/strain ratio[1] according to $$E = \frac{L_o F}{A_o \Delta L},$$

where F is the force exerted on the construct, $L_o$ is the construct length, $A_o$ is the cross-sectional area, and $\Delta L$ is the change of the construct length. To calculate the construct elongation and the force $F_c$ within the fiber, we consider one of the right triangles in FIG. 4E, wherein a is a constant, which is half of the original length of the construct, and b is a value obtained from the recordings, such that $$F_c = \frac{F_t}{2\cos\alpha} = \frac{F_t c}{2b}.$$

Hence the elastic modulus is given by $$E = \frac{L_o F_t c}{2 A_o \Delta L b}.$$

The approximation of the cross-sectional area as a circle with a diameter d gives $$E = \frac{L_o F_t 2c}{\pi D^2 \Delta L b}.$$

From FIG. 4E, we see that b is the difference $(d_s - d_t)$ and c is the square root of the sum of squares ($\sqrt{(d_s - d_t)^2 + a^2}$), so that we have the final equation for the elastic modulus $$E = \frac{2 L_o F_t \sqrt{(d_s - d_t)^2 + a^2}}{\pi D^2 \Delta L (d_s - d_t)}.$$

In summary of the example result shown in FIGS. 4B-4E, firstly, the force applied is proportional to probe bending. This proportional relationship is valid if deflection vs. length is small. For example, the probe length is about 30,000 microns, and the deflection is smaller than 100 microns. The probe bending is measured through the observed probe tip movement. Secondly, the force is applied perpendicular to the length of the tissue construct. Specifically, known stage movement and observed probe tip displacement allow one to compute tissue length changes via the geometric relationship of the stage to the tissue anchors; lateral displacement of the probe tip indicates what force was applied to the construct; and the tension along the length of the construct caused by this force can be computed. Finally, the observed lateral displacement can be used to calculate tissue construct stress strain curves.

Figure 5B:
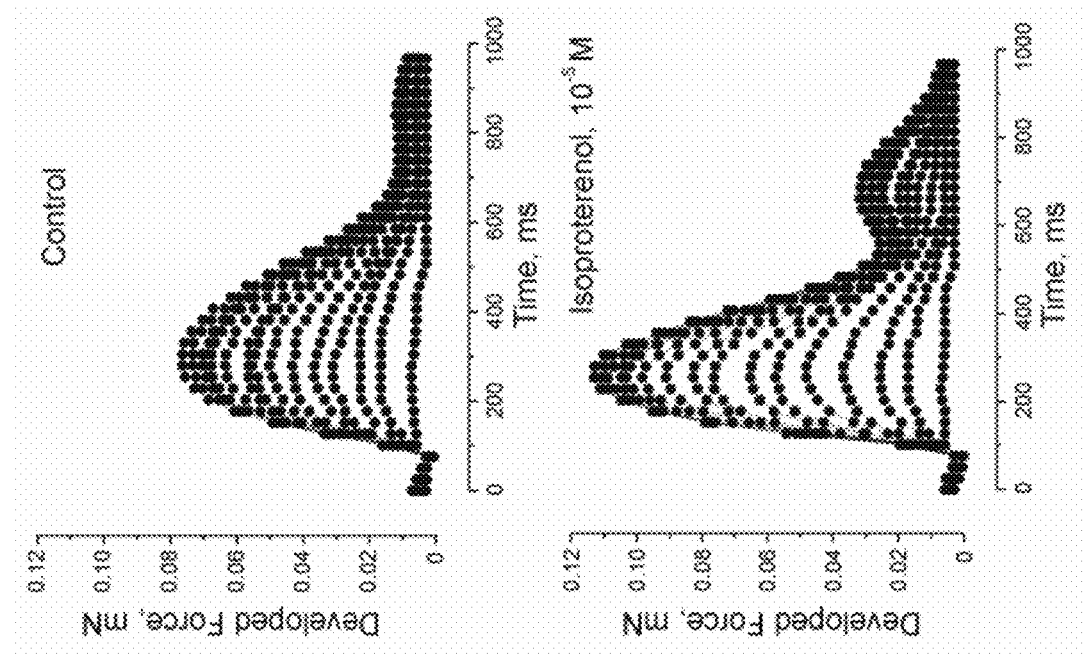
Figure 5A:
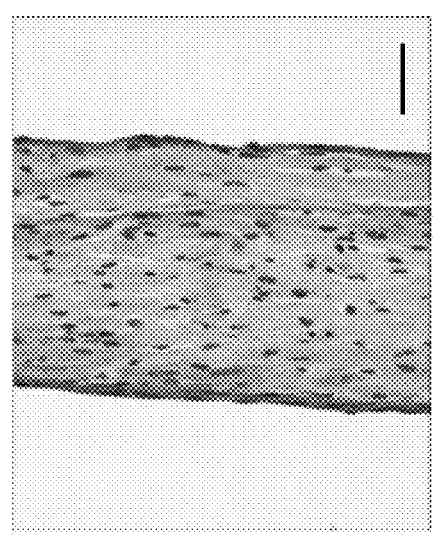
Figures 5E, 5F:
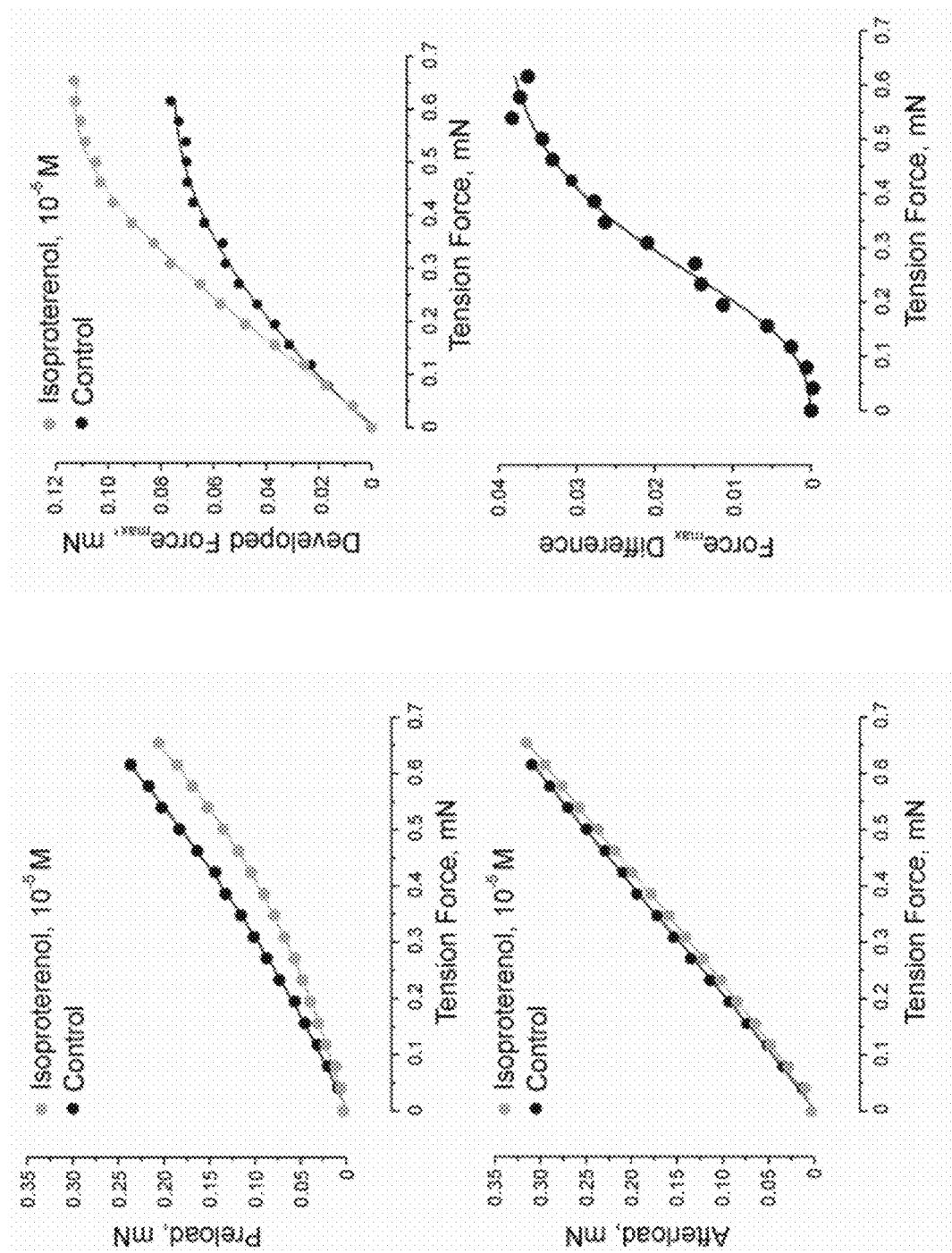
Figures 5G, 5H, 5I:
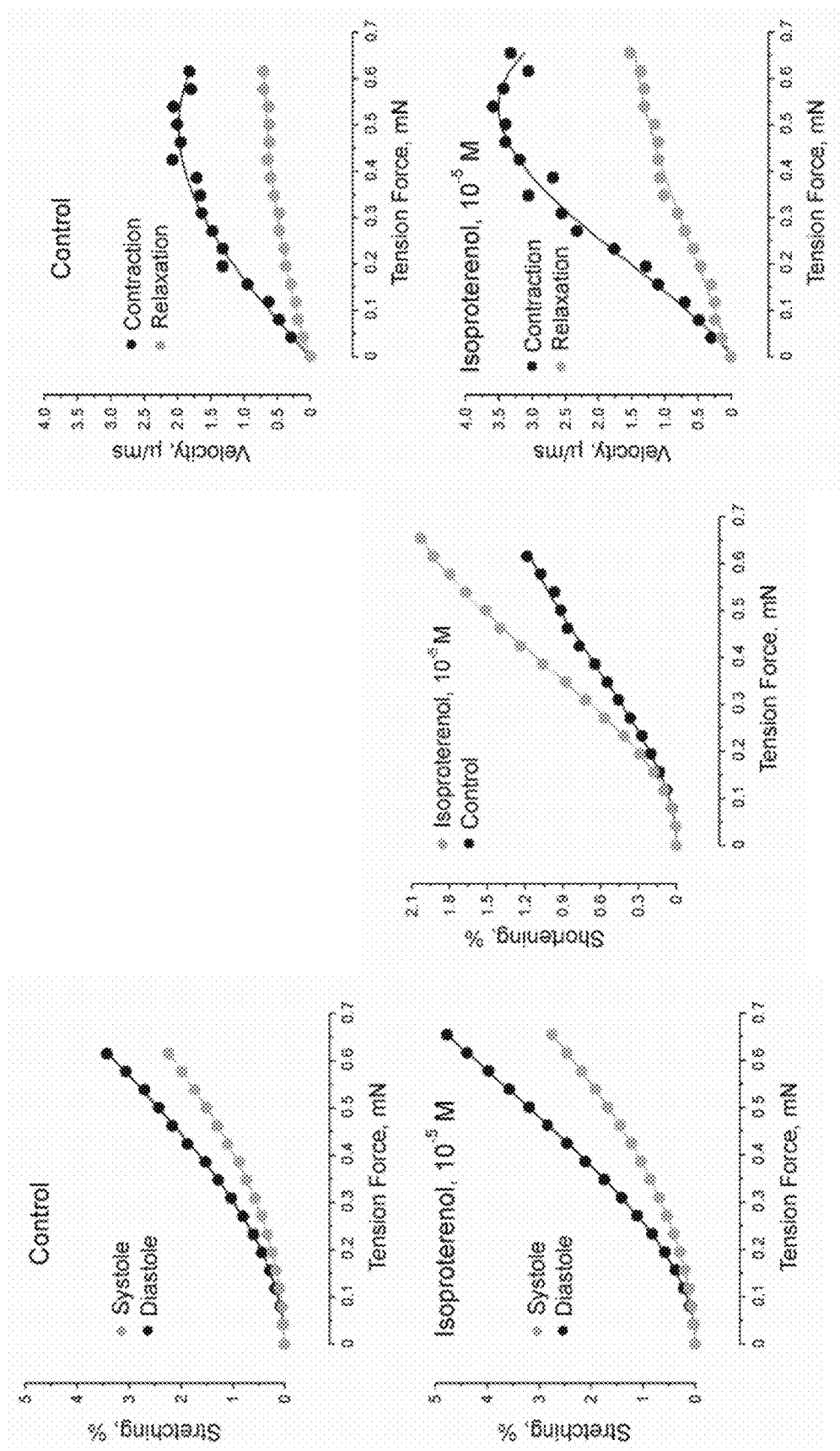

FIG. 5A shows an image of a cardiac tissue construct created according to this invention. FIGS. 5B-5G illustrate the use of the present invention to measure the force generating behavior of cardiac muscle tissue constructs such as that shown in the H&E stained construct of FIG. 5A. The measurements of force as a function of cardiac drug treatment shown in FIGS. 5B and 5E through 5I were all accomplished by using the microscope biotension system disclosed above and by applying the probe calibration measurements shown in the graph of FIG. 4B.

FIG. 5C represents a diagram of force vectors acting on the construct when the tissue construct is in a relaxed state, while FIG. 5D shows the same vectors when the construct is in a contracted state as a result of electrical or chemical stimulation, with no change in the stage displacement 450. FIGS. 5C and 5D clearly illustrate the auxotonic character of contraction in this embodiment of the invention. The lateral tensional force ($F_t$) applied to the construct 520 by the probe 510 is balanced symmetrically by the two contractile force vectors ($F_c$) that are collinear with each half of the construct. The geometric sum of the $F_c$ force vectors is $F_s$, which is equal and opposite to $F_t$. As a result, the lateral force developed by the construct ($F_d$) in going from relaxed to contracted state is the change in the tensional force between the two states $$F_d = F_{t2} - F_{t1}.$$

The force value is computed based on the force sensor calibration graph presented in FIG. 4B as $$F = mg,$$

where g is the acceleration of gravity and m is the mass associated with that force for a particular displacement during the calibration process.

FIGS. 5E-5I show the response of the cardiac construct to the drug isoproterenol in both the resting (diastolic) and contracted (systolic) states. These data can be used to fit a viscoelastic model, such as the classical Hill model with series elastic, parallel elastic, contractile force, and damping, so as to provide a quantitative characterization of the passive and dynamic properties of the tissue construct.

It is evident from the quality and reproducibility of the data obtained by utilizing the present invention that the system can provide valuable insight into quantitative aspects of the interaction of drugs with cardiac tissue muscle constructs. A key feature of the disclosed invented system is that the cardiac tissue can be maintained in a healthy state within the confines of an incubator resident well plate assembly, for many days, and that periodic non-destructive measurements of the same tissue construct can be performed to gather information about the long-term time evolution of drug response. This is in stark contrast with the measurements made in conventional uniaxial or biaxial testing machines, which are sufficiently large and expensive that the samples can only be brought to the test instrument for measurements, typically at the end of an experiment. Often such tests with uniaxial or biaxial testing machines result in damage to the samples by the clamps, jaws, or needles used to apply forces to the tissue sample.

FIG. 6 shows a device for providing baseline tension provided to a tissue construct both during tissue construct growth and measuring of construct elasticity. As shown in FIG. 6, in addition to the probe 610, the construct 620, and a base 630, the system includes a device for providing baseline tension. The device includes a fixed plate 640, a sliding plate 650 and two rigid rods 660. The fixed plate 640 is fixed to the base 630, and the slide plate 650 is slidably disposed on the fixed plate 640 in a manner where a specified displacement can be obtained, for example with a calibrated stepping motor. The two rigid rods 660 are fixed to the front end of the sliding plate 650, and extend vertically. The two rigid rods 660 are substantially perpendicular to the base. The vertical plane formed by the two rigid rods 660 is substantially parallel with the construct 620. In operation, the slide plate 650 moves toward the direction of the construct 620, and the two rigid rods 660 subsequently move leftward to contact the construct 620. The contact positions of the two rigid rods are basically located at two sides of the center point of the construct 620 or off-center if desired. The lateral displacement of the rigid rods 660 after contact with the construct 620 is adjusted according to a predetermined force. During measurement, a probe 610 is positioned midway between the two fixed rods 660, and moves from right toward left. As shown in FIG. 6D, the probe 610 causes displacement of the construct 620 around the center point of the construct 620 and between the two rigid rods. At the same time, the probe 610 bends due to the counter force generated from the construct 620. After acquiring images having the probe 610, the construct 620, and the rigid rods 660, displacements of those components can be determined. The tension of the construct 620 by the probe 610, under the pretension by the rigid rods 660, can then be calculated based on those displacements or other bending parameters information obtained from the images. As discussed above, the pre-tension can be provided to the construct 620 during the growth of the construct 620 and through the measurement, after the growth of the construct 620 and right before the measurement, or simultaneously with the measurement. In certain embodiments, the pre-tension can also be provided with devices and systems other than this implementation, such as the second implementation and the examples described below.

In this first implementation, technical details are further discussed and emphasized as follows:
1) The sensor geometry includes a flexible probe rigidly attached to an inverted microscope or other imaging system and located directly above the imaging objective.
   a. Note that, in the frame of reference of the microscope camera, this probe will always be centered in the field of view, even if the microscope stage is moved (assuming that nothing causes the probe to bend).
   b. If, however, something pushes against the probe, then the probe will bend and the camera will record movement in the camera image frame of reference. Because of the physics associated with small deflections of flexible rods or probes, the amount of probe movement will be proportional by Hooke's Law to the force applied by the probe to whatever it is pushing against.
   c. If the microscope stage is moved when a three-dimensional biological sample is attached to the microscope stage, then the recorded camera image of the biological sample will appear to move in the camera's frame of reference. The probe will not appear to move, unless it comes into contact with the biological material. If the biological material resists the pressure exerted by the probe, then the probe will bend, thus providing an indication of the applied force.
   d. By accounting for both the tissue displacement and the probe deflection, it is possible to compute the deflections of both the probe and the tissue in the well plate frame of reference. This, and the geometrical arrangement of tissue anchor points, allows computation of stress strain relationships in the biological tissue.
2) A flexible probe that can be calibrated to the force required to slightly bend it.
   a. Bending beam engineering analysis of homogenous materials is established.
   b. If composite materials or a tapered probe design is desired, the probe may have to be empirically calibrated by an apparatus that applies a known force to the probe tip while recording the probe tip deflection.
  c. The probe can be calibrated in several ways, including using a controlled displacement to press it against a load cell or weighing balance, or by measuring the deflection of a horizontal probe when a small weight is added to the tip of the probe.
3) An inverted microscope or equivalent optical setup that has provision for rigidly mounting the probe in an XY position, more or less directly above the microscope objective, so that the probe tip can be imaged by a microscope camera and its resting location recorded. The rigid mounting of the probe in the XY plane must also have a feature of adjustable Z height relative to the microscope stage height. This is so that the probe tip can be brought into the correct Z height to contact the biological material to be tested and so that both the probe tip and the tissue sample are in focus in the camera's field of view.
  a. Different objectives can be used to achieve different force sensitivities (force/pixel displacement).
  b. A convenient method of attaching the probe to commercial laboratory inverted microscopes is to attach the probe to the microscope's adjustable condenser assembly. In one implementation, this can be done by mounting the probe to a thin sheet of transparent plastic or glass that is attached beneath the condenser's lowermost lens.
4) A calibrated XY microscope stage that can provide known repeatable lateral stage movements with a precision in the range of microns.
  a. Computer-controlled motorized microscope stages are ideal for this purpose. It is important that the stage movement is not just joystick-controlled. There must be a read-out of exact XY position. Computer control that can move the stage to precise specified XY locations is ideal.
  b. The movement of the stage to a series of locations allows the measurement of the range of deflections as the load varies.
5) A high-quality microscope-mounted imaging camera.
  a. The probe bending is quantized in pixels, so higher pixels per image are better.
  b. For use with dynamic events, such as the contraction and relaxation of stimulated muscle tissue constructs, the microscope camera should have the capability of rapidly capturing images so that contraction velocity can be accurately measured.
6) Note that for biological tissue constructs the details of how the tissue is attached to anchor points are important.
  a. Purpose-specific well plate format bioreactor jigs provide a uniform experiment platform for comparative studies.
  b. The invention will have highest utility/sensitivity for constructs which have modulus of elasticity coefficients similar to that of the flexible probe. Different probe geometries or materials can provide this versatility.
  c. The tissue construct must be anchored in at least one location, so that stage movement can be used as a parameter in measuring the force applied to the material. For many applications, two-point anchoring is preferred, since then probe delivery of force to the biological material at the midpoint between anchor points simplifies the analysis of stress strain characteristics of the major axis of the biological construct.
7) An interesting feature of biological material being deformed by mechanical probe force is that the biological material may exhibit both viscous and elastic properties. The viscous characteristic can be measured if the experimenter has good timing control over the rate of force applied to the biological construct and the ability to record images as a function of time. A computer-controlled microscope stage and appropriate control software could address this need.
8) The data from such measurements can be used to determine the parameters of a viscoelastic model, such as the Hill model, to quantify the properties of the construct and its response to drugs.
9) An interesting extension of the capability of this mechanical probe measurement system is that the system could be used in conjunction with electrically stimulated biomaterials such as contracting muscle fibers. The microscopic force generated by such tissues could be measured by noting the probe beam deflection. In such applications it is important to consider the inertial mass of the probe if local accelerations are significant. It is also possible to use this mechanical probe system to measure the forces generated by spontaneously contracting tissue constructs, such as engineered heart tissue.
10) An interesting extension of the basic probe tissue tension measurement protocol can be provided by a simple, additional well-plate resident structure. A small adjustable device can be constructed that provides a chronic pushing force against the side of the tissue construct as shown in FIG. 6. This chronic static pushing force can be delivered by a miniature two-tined fork-like structure that has an open aperture into which the measuring probe will fit. The force applied by the fork-like structure will provide a chronic tension along the length of the tissue construct. This adjustable tensioning device can be used to condition the tissue construct, and the flexible probe can be used to measure the deflection force necessary to cause the tissue construct to move under conditions when the tissue construct has been pre-tensioned. This feature may prove invaluable for investigating certain types of muscular and electro-responsive tissues.

Example 2

A Servo System Force Actuation with Inverted Microscope Camera Optical Read-Out

Figure 7A:
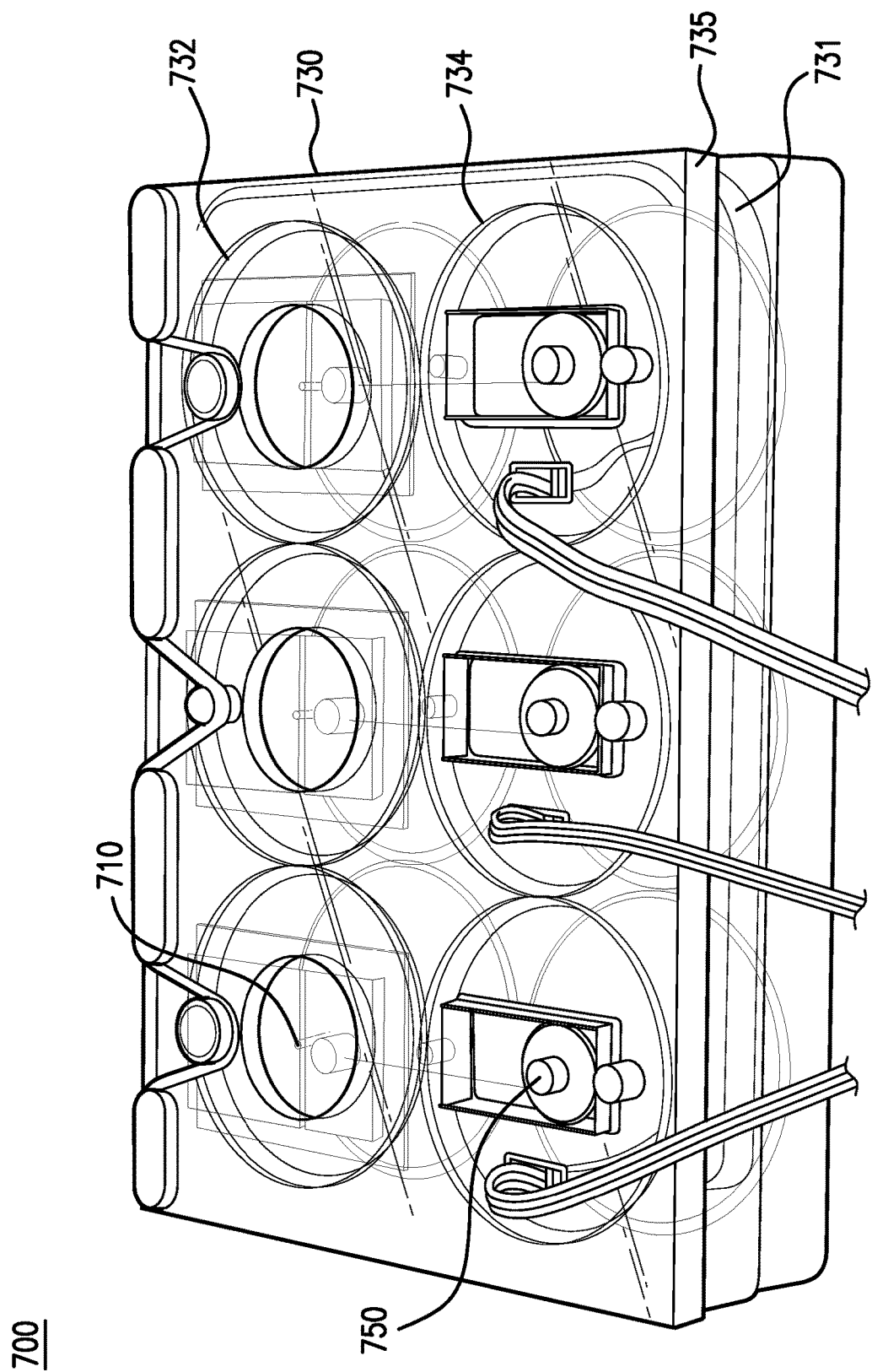
Figure 7B:
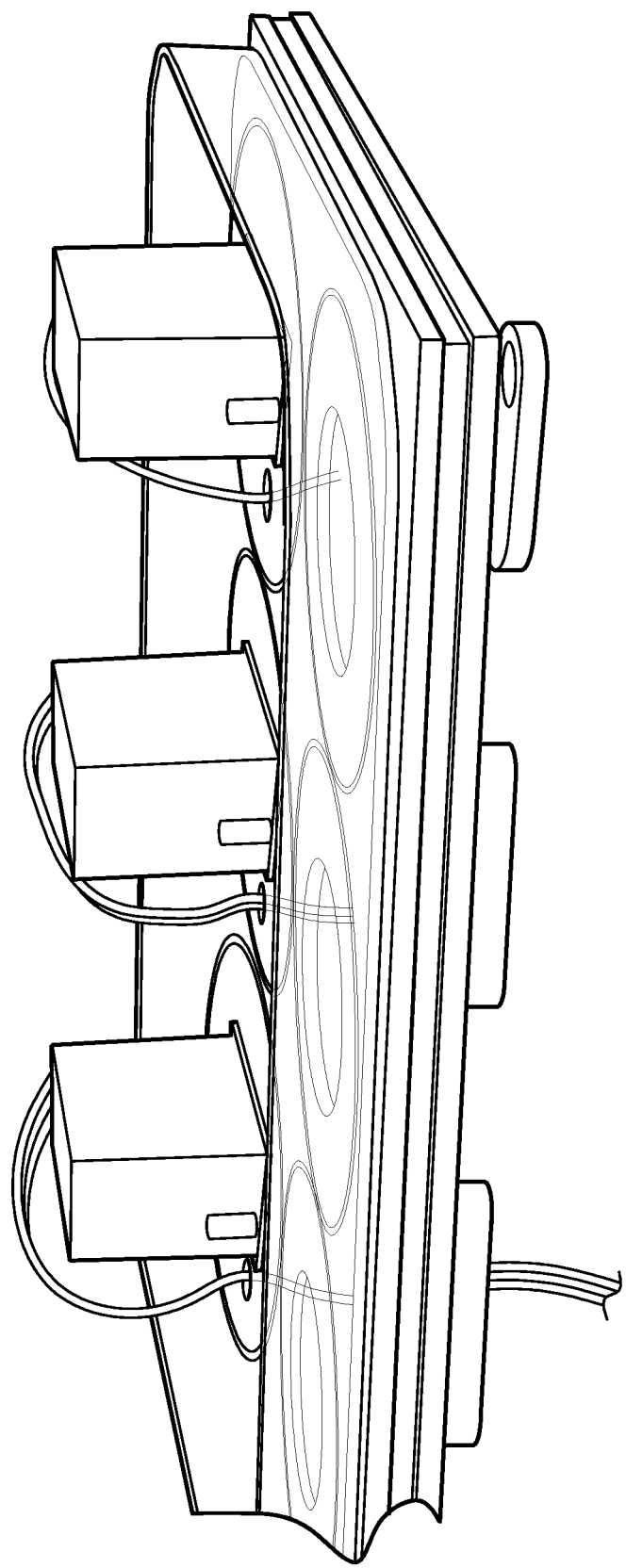

As shown in FIGS. 7A-7F, in the second implementation, small servo motors are used to move the probes. As shown in FIG. 7A, the device 700 includes a plate 730, the plate 730 includes a top row of wells 732 and a bottom row of wells 734. A plate lid 731 covers the well plate 730, and a fixing plate 735 is fixed on the plate lid 731. The plate lid 733 and the fixing plate 735 may have the structure shown in FIG. 7D. As shown in FIG. 7E, a movable plate 736 is movably disposed on the fixing plate 735 corresponding to each well. A probe 710 is fixed to a center portion of the corresponding one of the movable plates 736, and perpendicular to the movable plate 736. As shown in FIG. 7C, a servo motor 750 is fixed to a portion of the fixing plate 735 that corresponds to one of the wells 734. Referring to FIG. 7C, the servo motor 750 includes a servo hub 752 and an actuation wire 754. One end of the actuation wire 754 is wound around the servo hub 752. As described above, the reusable servo probe actuation assembly 750 is located in the custom removable lid 731 that fits over the well plate. Three of the six wells are left empty in order to make room for the servo motor housing. In a typical experimental setup the removable servo probe assembly 750 will be used to periodically measure each of numerous tissue construct assemblies that spend most of their time in incubators with standard simple well plate lids. In addition, this system could be used to apply over long periods of time a steady, and oscillating, or a steadily increasing force to the construct to affect cell differentiation and the expression of particular force-sensitive proteins.

Referring to FIG. 7C, it can be seen that the rotary output hub 752 of the servo motor 750 has a thin wire 754 wound around the hub circumference. This wire 754 is attached to the movable plate 736 which is constrained to move only in a straight line by the channel within which it resides. Each movable, laterally constrained plate 736 serves to anchor a corresponding one flexible probe 710, which is mounted normal to the plate's surface so that it extends straight downward into the corresponding well of the well plate assembly when the servo lid is attached to the well plate. Each movable plate 736 is also attached to an elastomeric spring 738 which serves to place tension on the servo axle wire. Thus, when the servo hub 752 rotates anti-clockwise, the wire 754 winds onto the hub 752 and the movable plate 736 and probe 710 move toward the servo hub 752. When the servo hub 752 rotates clockwise, the elastomeric spring 738 takes up the slack of the unwinding wire and causes the movable plate 736 and probe 710 to move away from the servo hub 752. In certain embodiments, the actual tension of the elastomeric spring 738 is irrelevant, since the servo motor 750 is providing a known displacement of the upper end of the probe 710. In the configuration shown in FIG. 7C, the left-hand outer circumference boundary is aligned with the center line of the movable plate 736. This arrangement establishes a simple linear relationship between the angular rotation of the servo system and the linear displacement of the movable probe 710.

FIG. 7D shows a first plate lid 731 for covering the well plate, and the fixing plate 735 for covering the first plate lid 731 and supporting the servo motors 752. The first plate lid 732 has a top row of three through holes corresponding to the top row of wells, and a second row of rectangular openings corresponding to the server motors. The fixing plate 735 has a top row of three rectangular openings corresponding to the top row of through holes of the first plate lid 732, and a second row of rectangular openings corresponding to the server motors. During assembly, the first plate lid 731 is placed on the well plate, with the top row of three through holes disposed above the top row of wells, and the bottom row of three rectangular openings disposed above the bottom row of wells. Then the fixing plate 735 is disposed on the first plate lid 731, with the top row of three rectangular openings disposed above the through holes of the first plate lid 731, and the bottom row of three rectangular openings disposed above the three rectangular openings of the first plate lid 731. The movable plate 736 is then positioned within the top row of rectangular opening of the second plate lid 734, and supported by the edges of the top row of through holes of the first plate lid 732. The movable plate 736 covers the opening hole, and is movable under the restraint of the top rectangular openings of the fixing plate 735. This type of structure can be implemented in a well plate with an array of wells, which is suitable for screening with certain throughput.

As shown in FIGS. 7A-7F, this system is implemented in a device that has the footprint of a standard microscope-compatible well plate. This makes the system compatible with a wide variety of commercial microscopes and with industry standard robotic plate handlers. In this configuration the present invention can be made compatible with high-throughput, high-content screening assays such as those typically used in drug discovery, development, toxicology, and drug safety.

Figure 8B:
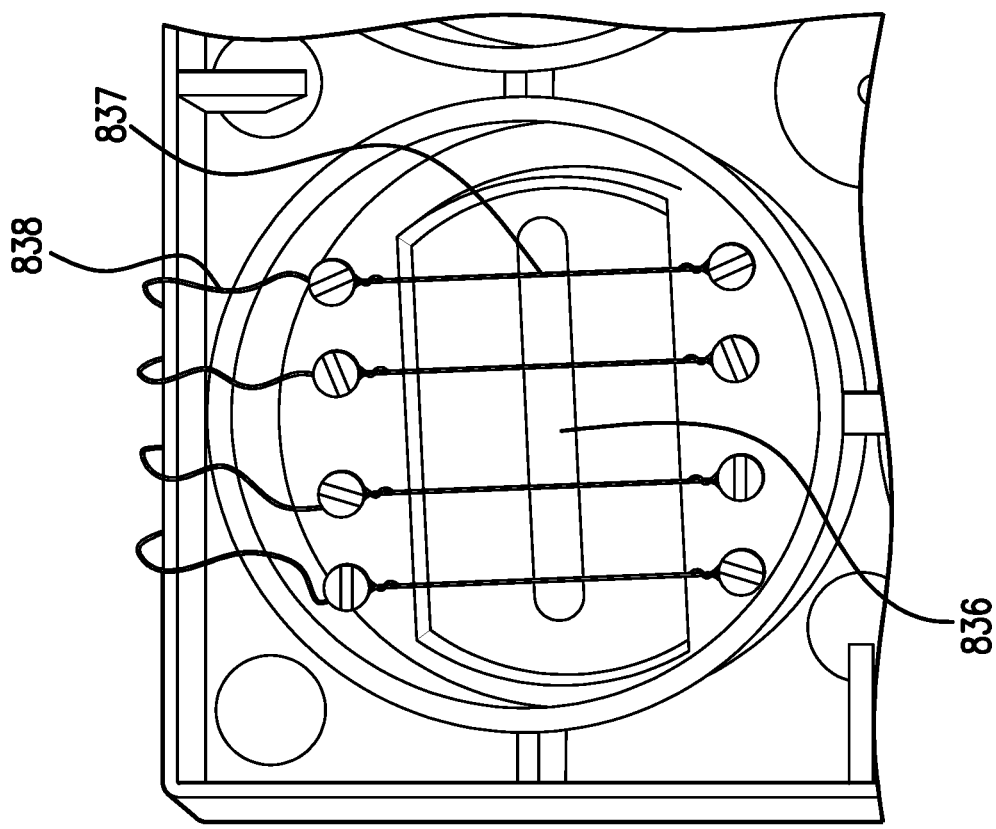
FIGS. 8A-8B schematically show different tissue construct holders.
Figure 8A:
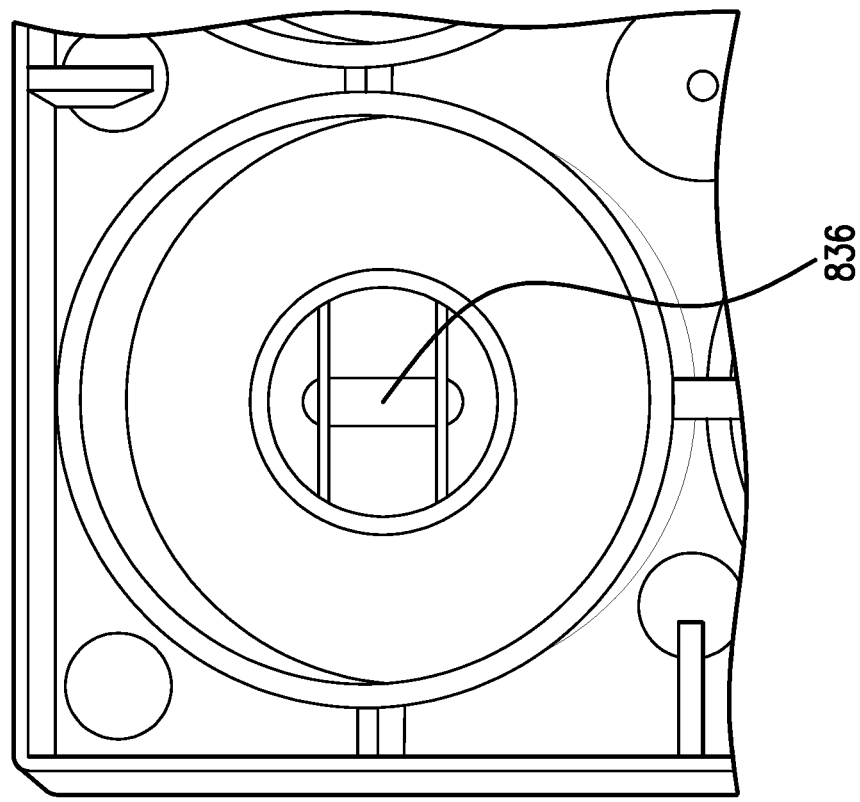

In operation, this particular device relies on careful placement of the organ construct containment structures within the confines of three of the wells of a standard 6-well tissue culture well plate. A typical placement of tissue construct holders is shown in the photograph images of FIGS. 8A and 8B, which illustrate two different tissue construct holders. FIG. 8A shows a holder used with the system described in FIG. 3A, and FIG. 8B illustrates a tissue construct holder designed to work with electrically excitable tissues that might be used in the servo well plate implementation of the present invention documented in FIGS. 7A-7F. Each of these structures has a tissue construct culture chamber 836.

The wire electrodes 837 that span the tissue culture chamber 836 not only provide attachment structures to the bio-object tissue construct. The electrical connections 838 to each wire electrode 837 at the ends of FIG. 8B can be used in several different ways. (1) A known steady or alternating current can be applied across the outer two and the voltage drop across the inner two measured to determine the conductivity. (2) An above-threshold electrical stimulus can be applied to one pair to initiate locally a propagating action potential that would be detected by an amplifier connected across the other two. (3) A stronger electrical stimulus can be applied across the length of the sample using one or two electrodes at each end to simultaneously activate the entire construct, consistent with the term "field stimulation." (4) A fifth electrode or additional electrodes can be positioned in the saline medium surrounding the construct to provide additional flexibility in stimulation schemes.

As a result of the standardized placement of the tissue construct assemblies within the well plate, the removable lid and servo probe assembly will always have a movement profile at right angles to the long axis of the tissue construct, and the intersection point will be near mid-span of the tissue construct. The defined geometry of this arrangement is important in the analytical computation of stress-strain relationships.

Figure 9A:
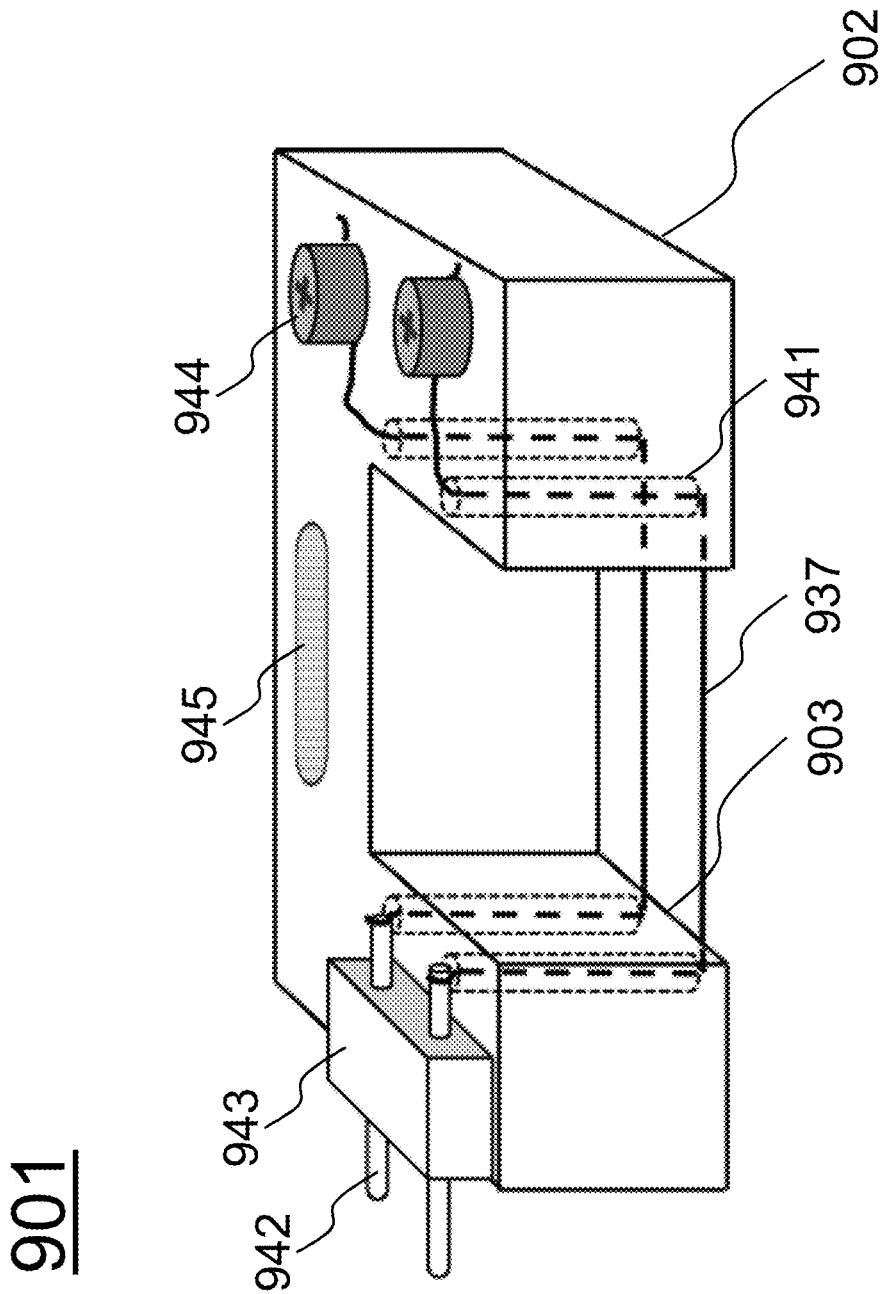
FIGS. 9A-9B schematically show alternative designs for tissue construct holders that would be suitable for investigating electrically stimulated tissue constructs according to certain embodiments of the present invention.
Figure 9B:
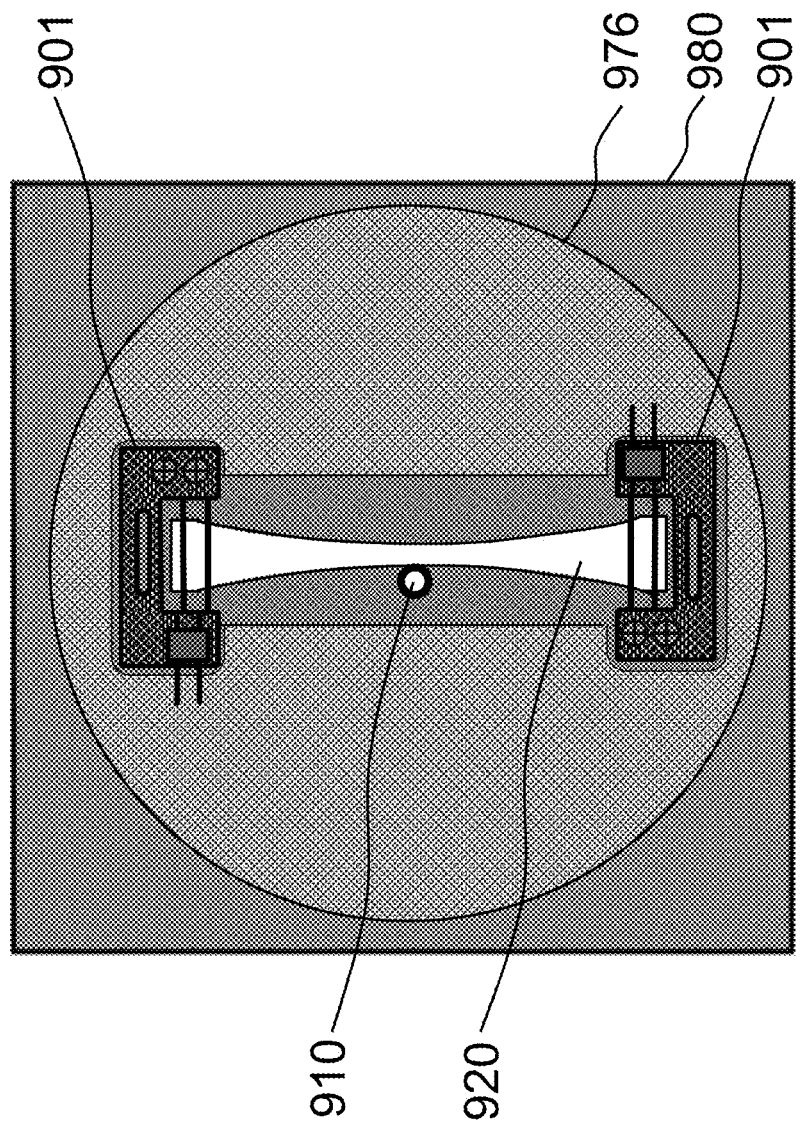

FIGS. 9A-9B illustrate an alternative design for a tissue construct holder that would be suitable for investigating electrically stimulated tissue constructs such as muscle. The assembly 901 comprises a connector block and electrodes. The end-connector block 902 with recess 903 supports two wire electrodes 937 that are threaded through holes 941 in 901. One end of each wire electrode is soldered or otherwise attached to a pin 942 in a pin block 943 while the other end is fastened down with a fastener 944 that allows the wires to be pulled tight before fixing in place. The slot 945 allows the application of a tensioning force to the block. FIG. 9B shows two of the connector blocks 901 in a disk 976 that fits into one well of a well plate 980. The bio-object construct 920 will be electrically stimulated and recorded by the electrodes in 901 in accordance with FIG. 8B. The probe 910 applies a force to the construct and measures the resulting response. The thickness of the end-connector block 902 can be chosen to keep the electrical connections well above the level of the culture media in the well. The slots 945 in the connector blocks 901 can also be used to insert or remove the pair of connector blocks from the disk 976.

These designs address the capability of the present invention to provide removable and translatable cell construct holders that could utilize axial pre-tensioning of constructs, or dynamic axial force measurements or axial stretch conditioning techniques for characterizing and influencing the development trajectory of biological tissue constructs.

Example 3

A Gravity Force Tension Actuation with Camera Optical Read-Out

Figure 10A:
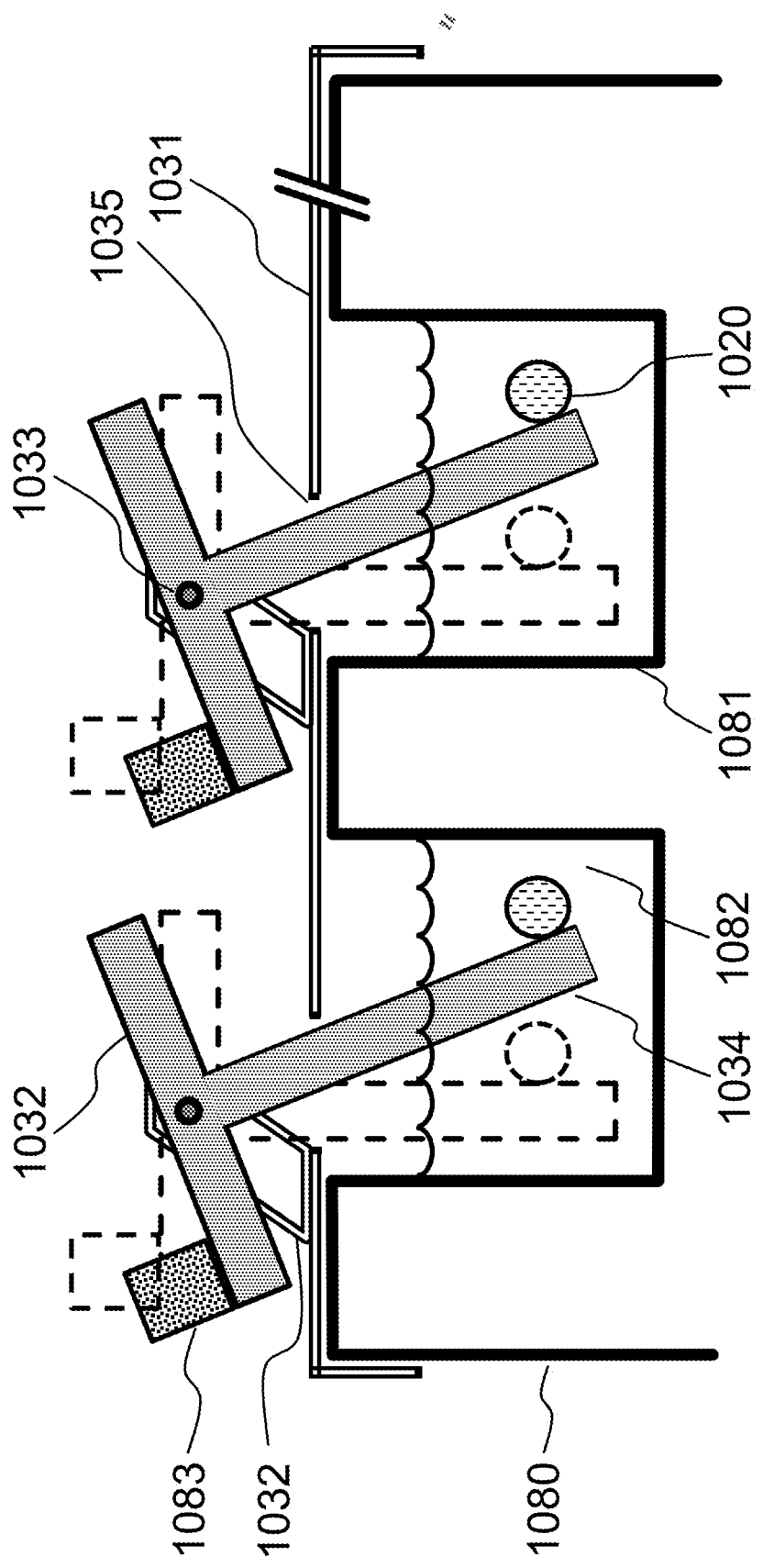
FIGS. 10A-10G schematically show a T-shaped bellcrank and various other designs which translate an attached weight into lateral motion of a flexible probe in contact with the tissue construct according to certain embodiments of the present invention.
Figure 10B:
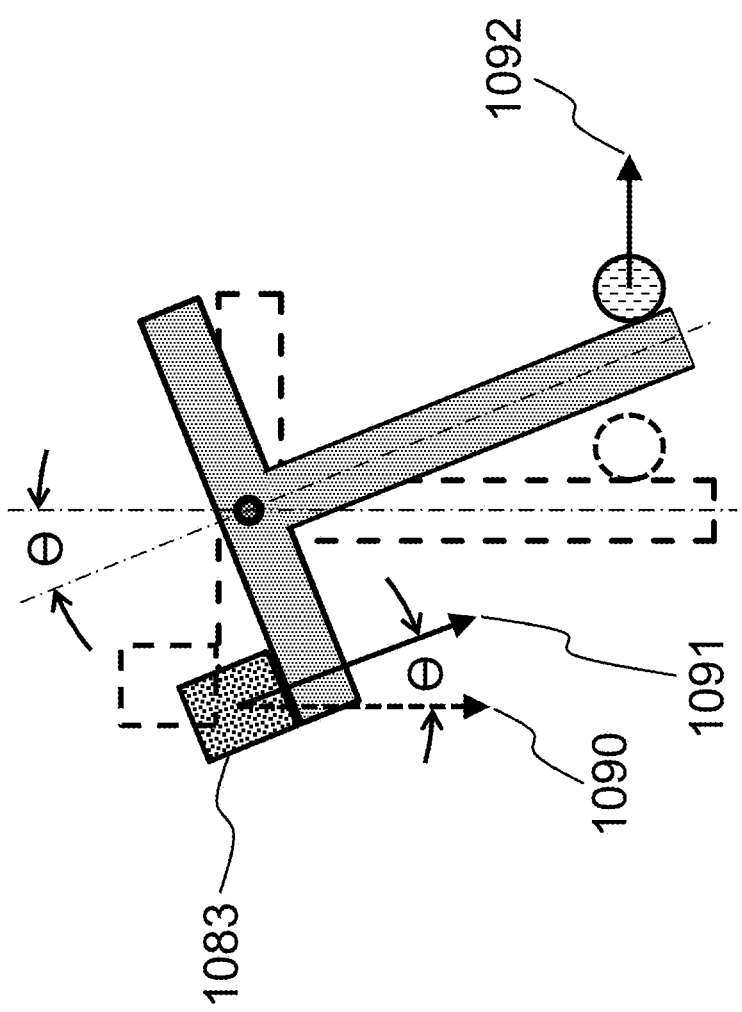

The present invention can also be implemented in a simplified format by utilizing a mechanical lever assembly to provide a calibrated static lateral force which will induce tension on the anchored tissue construct. This implementation of the present invention has the advantage of simplicity and low intrinsic cost once initial mass production tooling has been developed. Refer to FIGS. 10A-10E for details of actuator geometry variations. Referring to FIG. 10A, one implementation of the present invention relies on the use of calibrated small weights 1080 that provide a downward force, which is translated by a T-shaped bellcrank assembly 1032 (FIGS. 10A and 10B), in order for the actuator rod 1034 of the bellcrank 1032 to provide a lateral force 1092 against the side of the tissue construct 1020. The tissue construct 1021 is supported as discussed above in a well 1081 that is part of a well plate 1083, with each well containing cell culture media 1082. The bellcrank 1032 is supported by a bracket 1032 attached to the lid 1031 so that the bellcrank 1032 can pass through a hole 1035 in the lid 1031. When the invention is implemented in gravity force-based configurations, precise placement and alignment of the tissue construct become very important, and the initial position of the bellcrank assembly when the bellcrank-containing lid 1031 is placed on the well plate must be controlled to provide proper placement of the probe relative to the tissue construct. One constraint on such T-shaped device designs is the necessity to carefully consider bellcrank bearing 1033 resistances and, for the case of rapid periodic spontaneous tissue contractions, the inertial loading of the gravity-driven tensioning system. The lateral force 1092 is determined by the torque 1091 applied to the bellcrank by the weight 1083 and its force from gravity 1090, i.e., mg, where m is the mass of the weight 1083 and g is the acceleration of gravity.

Figure 10C:
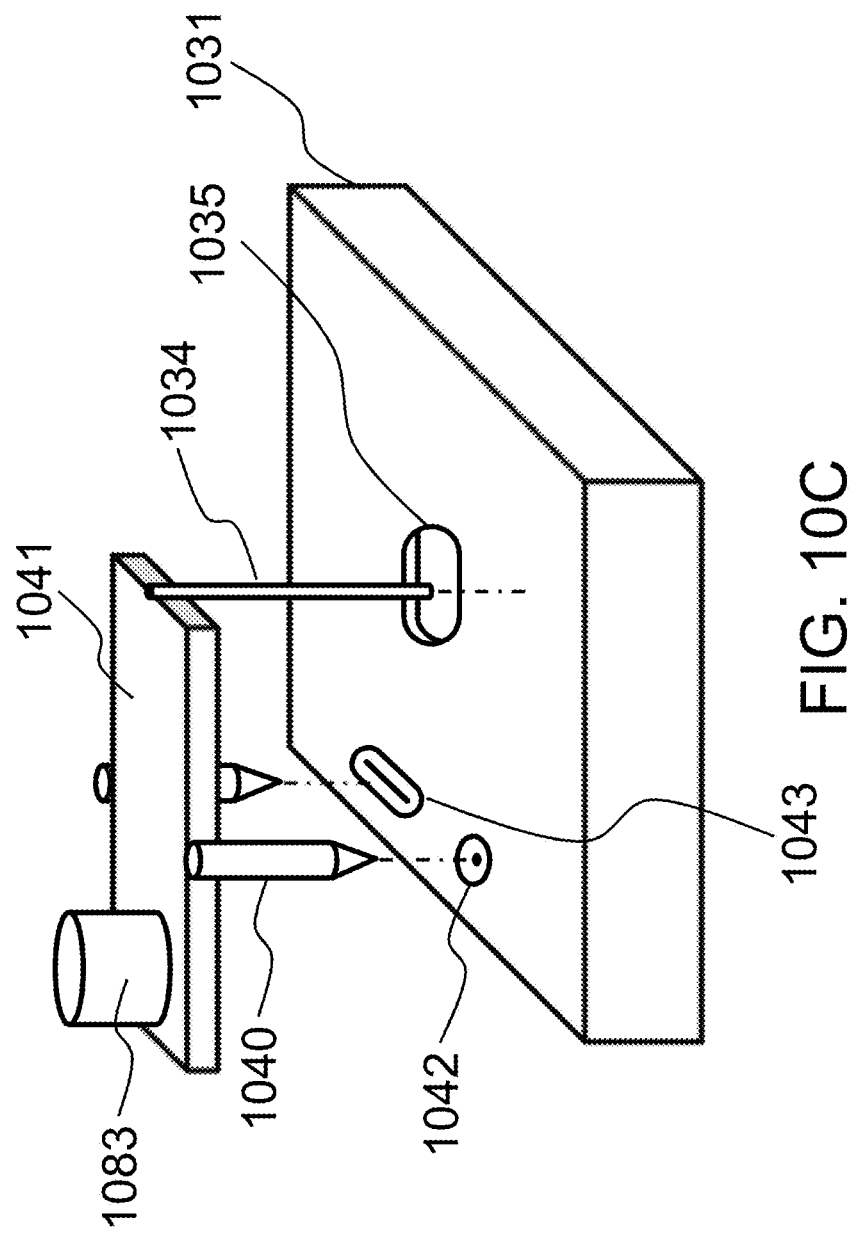

FIG. 10C illustrates another gravity source tensioning system, which relies on a low friction dual, kinematic fulcrum assembly to provide the pivot point and directional stability for the movement of the lever arm 1041 in contact with the tissue construct by means of the actuator rod 1034. The lever arm 1041 is supported by two pivots 1040 that fit into a conical socket 1042 and a vee-shaped groove 1043 in the lid 1031, which has a hole 1035 to provide the rod 1034 with access to the tissue construct. The force applied to the construct is determined by the weight 1083.

Figure 10D:
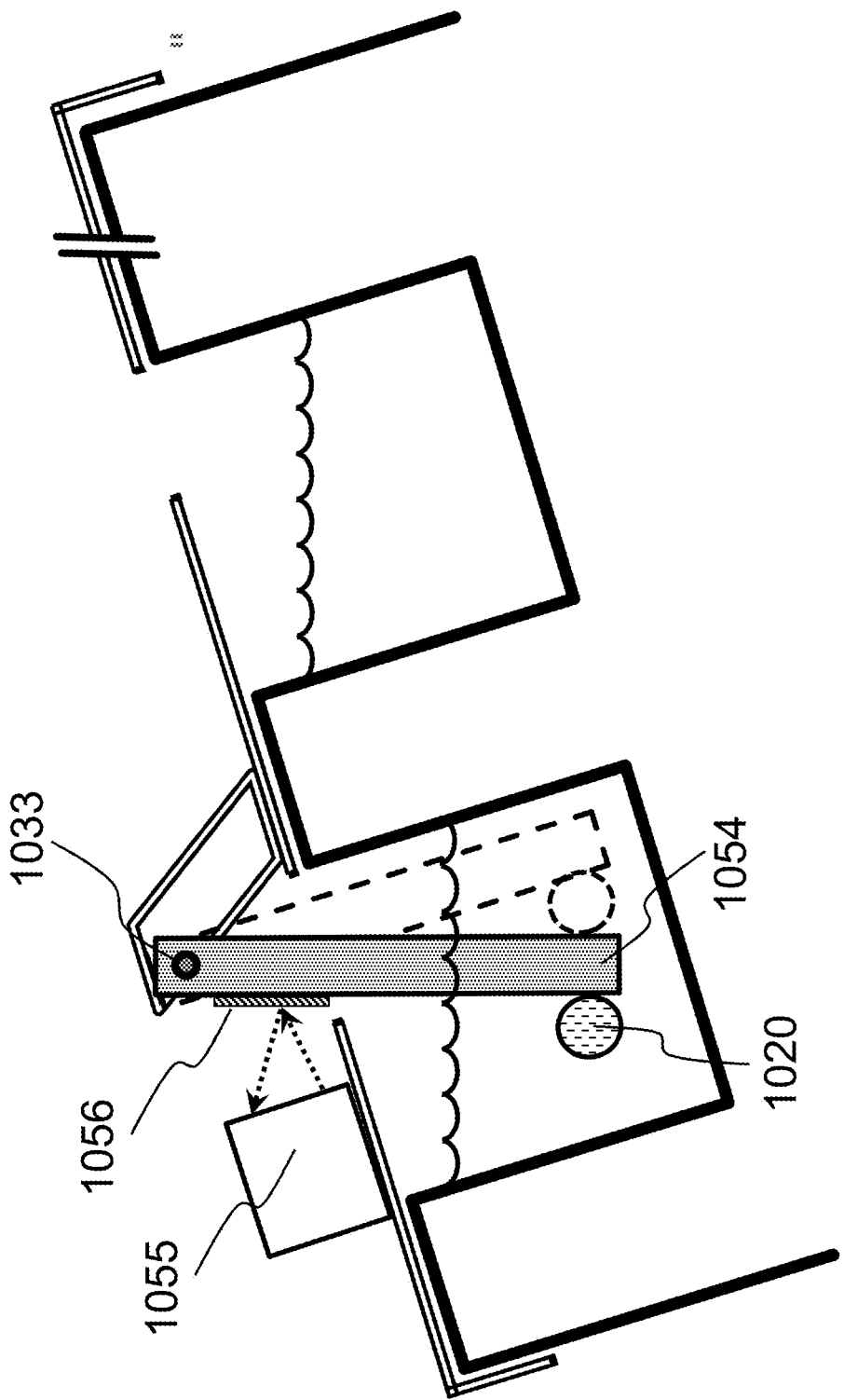
Figure 10E:
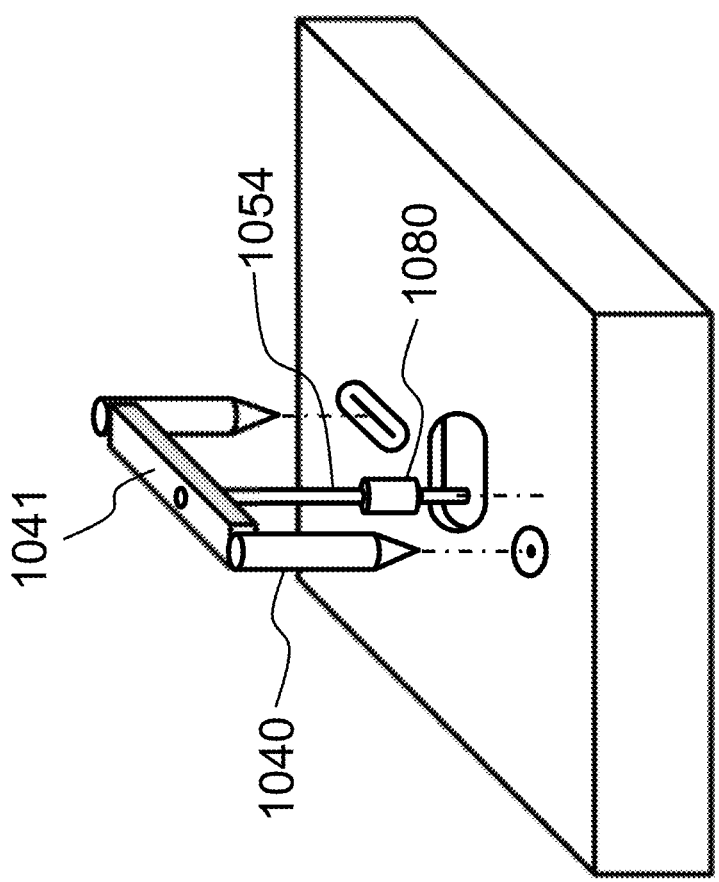

FIG. 10D illustrates the behavior of gravity-based pendulum lever assemblies 1054 as the well plate is tilted. This effect can be used to advantage during initial placement of lever assemblies so that they are positioned on a defined side of the tissue construct 1020 as the lid is attached to the well plate. Another aspect of the tilting behavior of the gravity-based lateral probe measurement system is that if the probe is rigid, as opposed to flexible, then there is intrinsic angular encoding of the counteracting force which the tissue construct is applying to the probe assembly. This means that read-out of the effective tissue construct lateral restoring force could be achieved by any technique that can measure the tilt of the gravity-based tension actuator. This could be accomplished at high resolution by using a laser beam system 1055 that bounces light off of mirrors 1056 attached to the actuator rod 1054 shown in FIG. 10D. The bearing 1033 could be replaced with a point-fulcrum shown in FIG. 10E, with the recognition that the center of gravity of the assembly would have to be below the pivot points, possibly accomplished by placement of the weight 1083 on the actuator rod 1054.

Figure 10F:
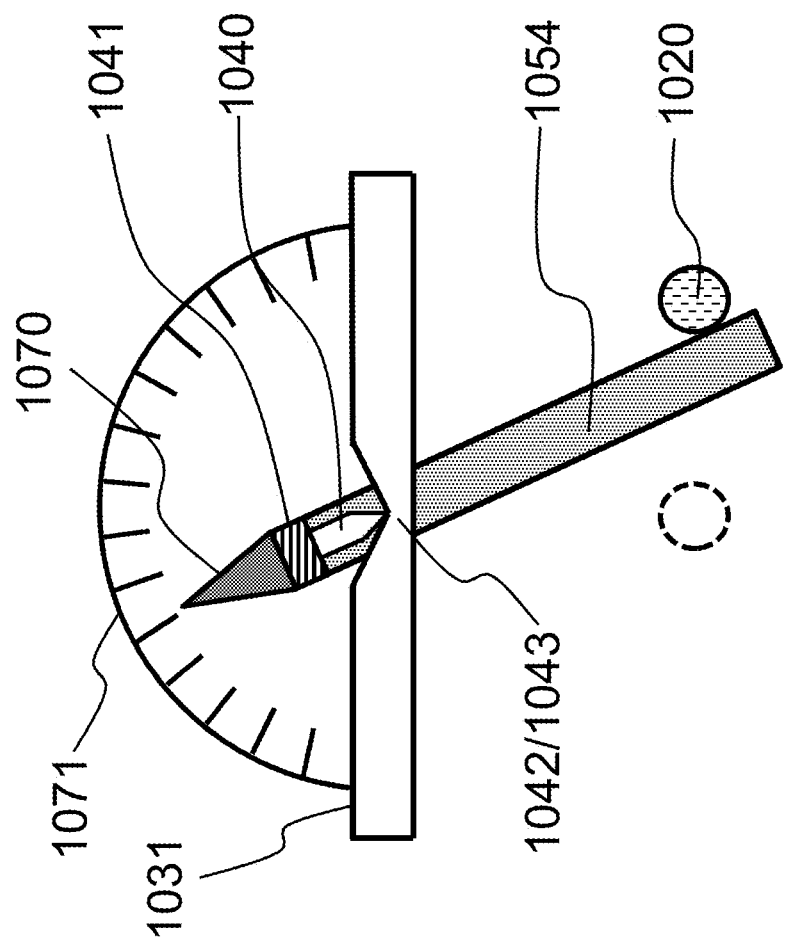
Figure 10G:
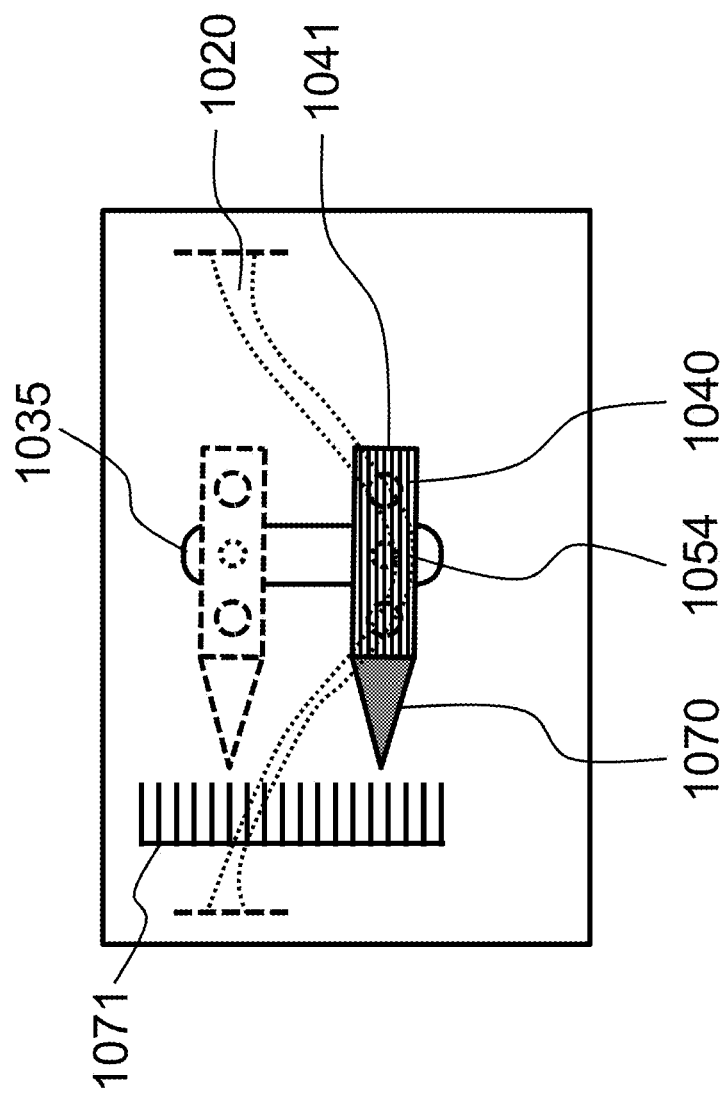

Alternatively, the read-out could be accomplished by using a side view (FIG. 10F) or top view camera (FIG. 10G) of the gravity actuator pendulum assemblies. In FIG. 10F, the angular position of the actuator arm 1054, as it pivots on points 1040 that are seated in socket 1042 and groove 1043 in the lid 1031, is measured by using a camera to visualize the relative position of the pointer 1070 and the scale 1071. In FIG. 10G, a similar arrangement as in FIG. 10F allows visualization of the displacement of the actuator 1054 from above using a top-view camera.

In each of these gravity-based systems, it is important to realize that transient lateral accelerations, as might occur during transport of a well plate to a microscope, could result in the application of transient lateral forces to the construct. These effects can be minimized by choosing the direction of lateral accelerations relative to the axis of the bellcrank.

In common with other implementations of the present invention, optical read-out of probe position and tissue displacement can be easily accomplished on camera-equipped inverted microscope assemblies. A key advantage of this gravity lever implementation of the present invention is its applicability to low-cost, mass-produced well plate lids. Depending on the desired size of the tissue constructs, and with appropriate manufacturing techniques, this gravity lever tensioning technology could be applied to 12-, 24-, or 96-well devices, thus facilitating high-throughput assays.

Other Measurements

Figure 11:
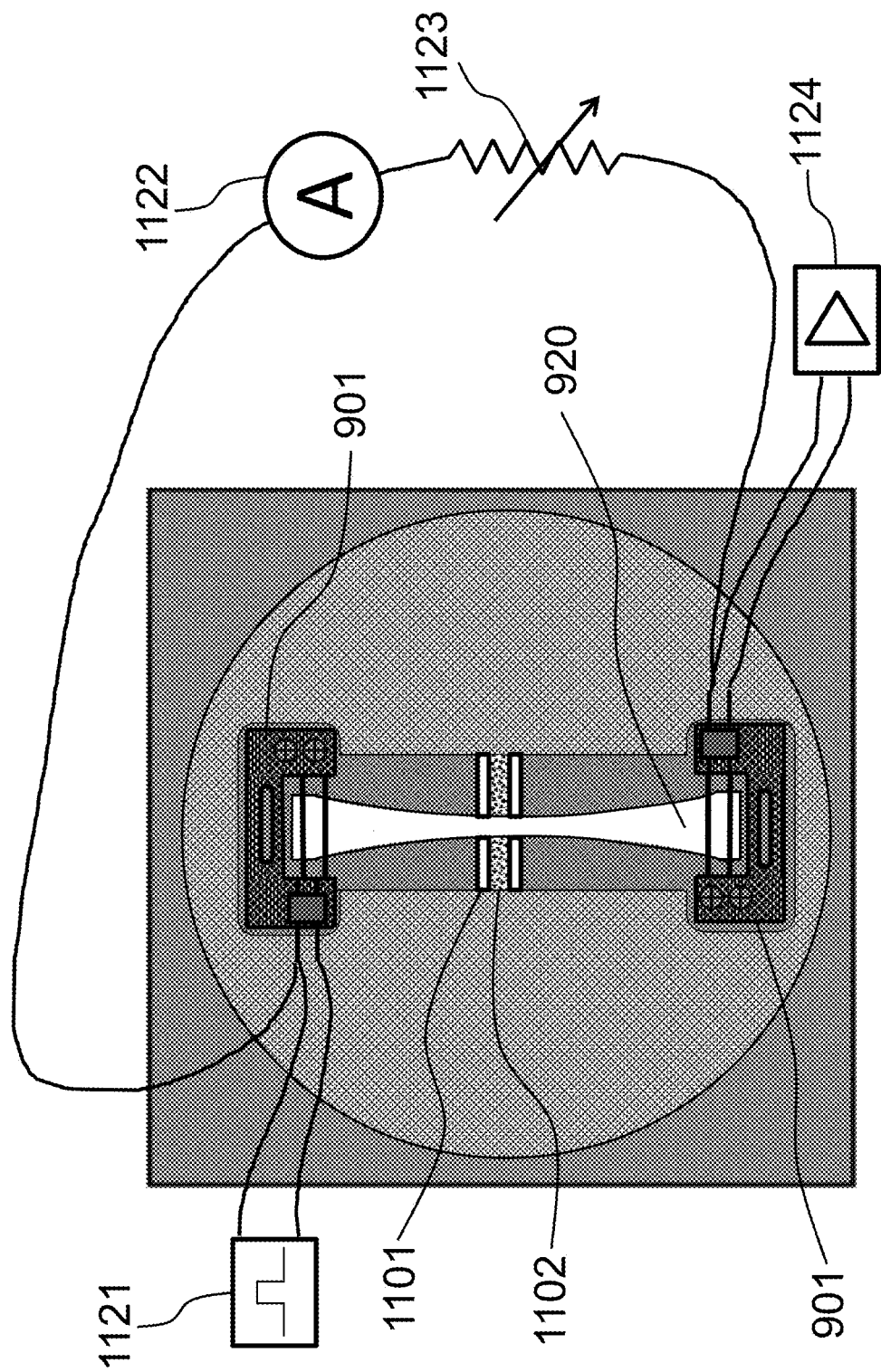
FIG. 11 schematically shows a variation of a tissue construct holder which could allow a class of measurements involving electrical propagation of signals from one end of a tissue construct to another according to certain embodiments of the present invention.

The general approach of creating casting chambers to support tissue constructs can be extended to make other measurements of construct properties. FIG. 11 shows a modification of the embodiment shown in FIG. 9B wherein a double barrier 1101 that encircles the construct 1120 contains non-conducting oil or sucrose to eliminate the local return current associated with the propagating action potential that would be generated by applying an electrical stimulus 1121 across the pair of electrodes in either connector block 901. This approach, known as an oil gap or a sucrose gap, also allows control of this return current by connecting one electrode in each connector block 901 with a variable resistor 1123 and ammeter 1123 wired in series. When this variable resistor 1123 has a low resistance, the action potential will propagate across the gap and can be detected as it propagates across the other pair of electrodes and is recorded by an amplifier 1124. As the resistance is increased, conduction will be blocked unless the return currents in the extracellular space of the construct are sufficient to support the propagation of conduction.

Figure 12:
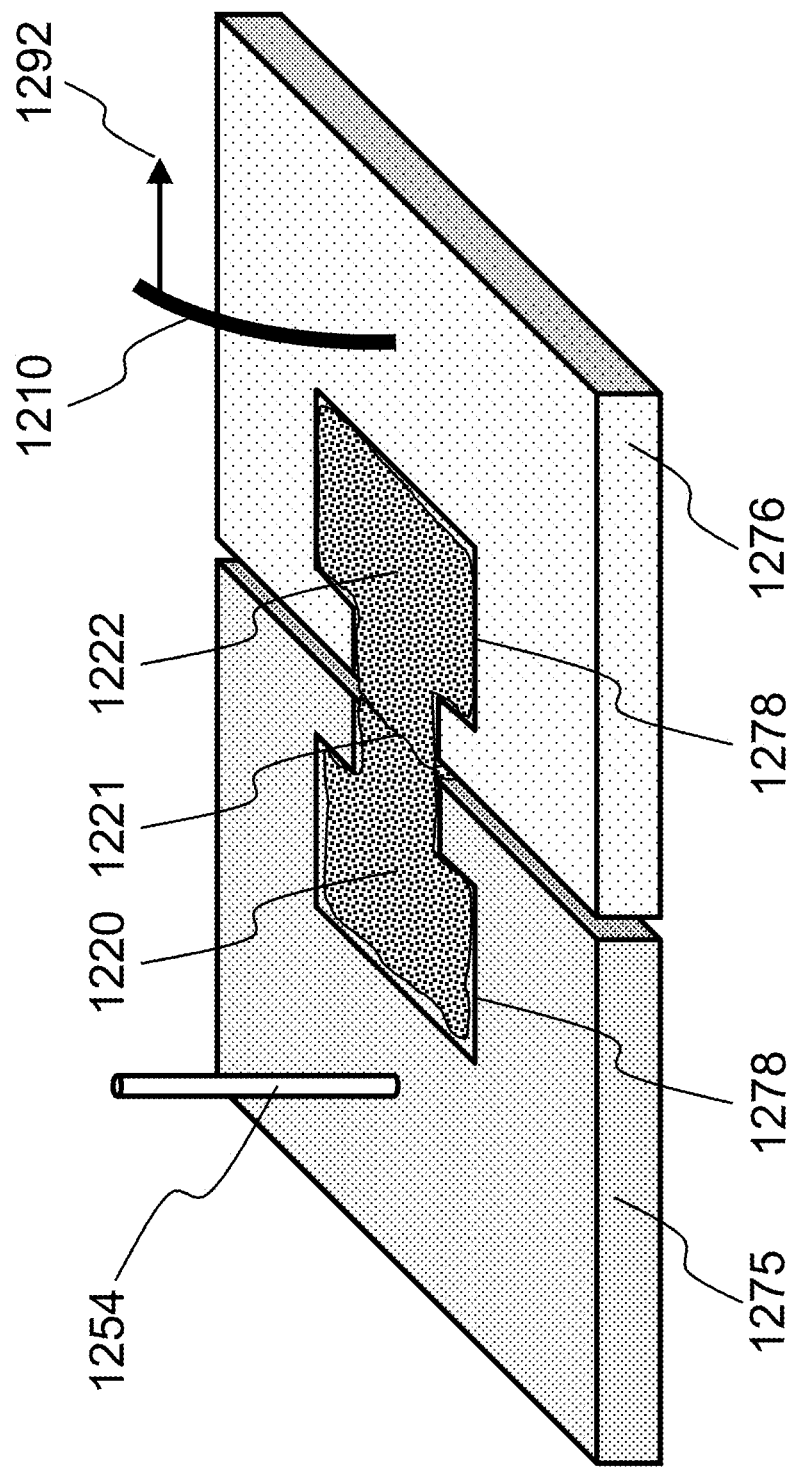
FIG. 12 schematically shows how the basic flexible bending probe technology associated with the disclosed invention could be used to measure the forces which bind two similar, or dissimilar, tissue constructs together according to certain embodiments of the present invention.

FIG. 12 presents an embodiment where the flexible force-delivering and force-measuring probe 1210 is pulled by an external force 1292 to determine the strength of the connection 1221 between two constructs 1220 and 1222, each of which is cast in a chamber 1278 formed in a block 1275 and 1276 of PDMS or another biocompatible material. The rigid bar 1254 is used to balance the applied force 1292.

Example 4

A Servo System Force Actuation with Electrical Force Sensor Read-Out

Figure 13A:
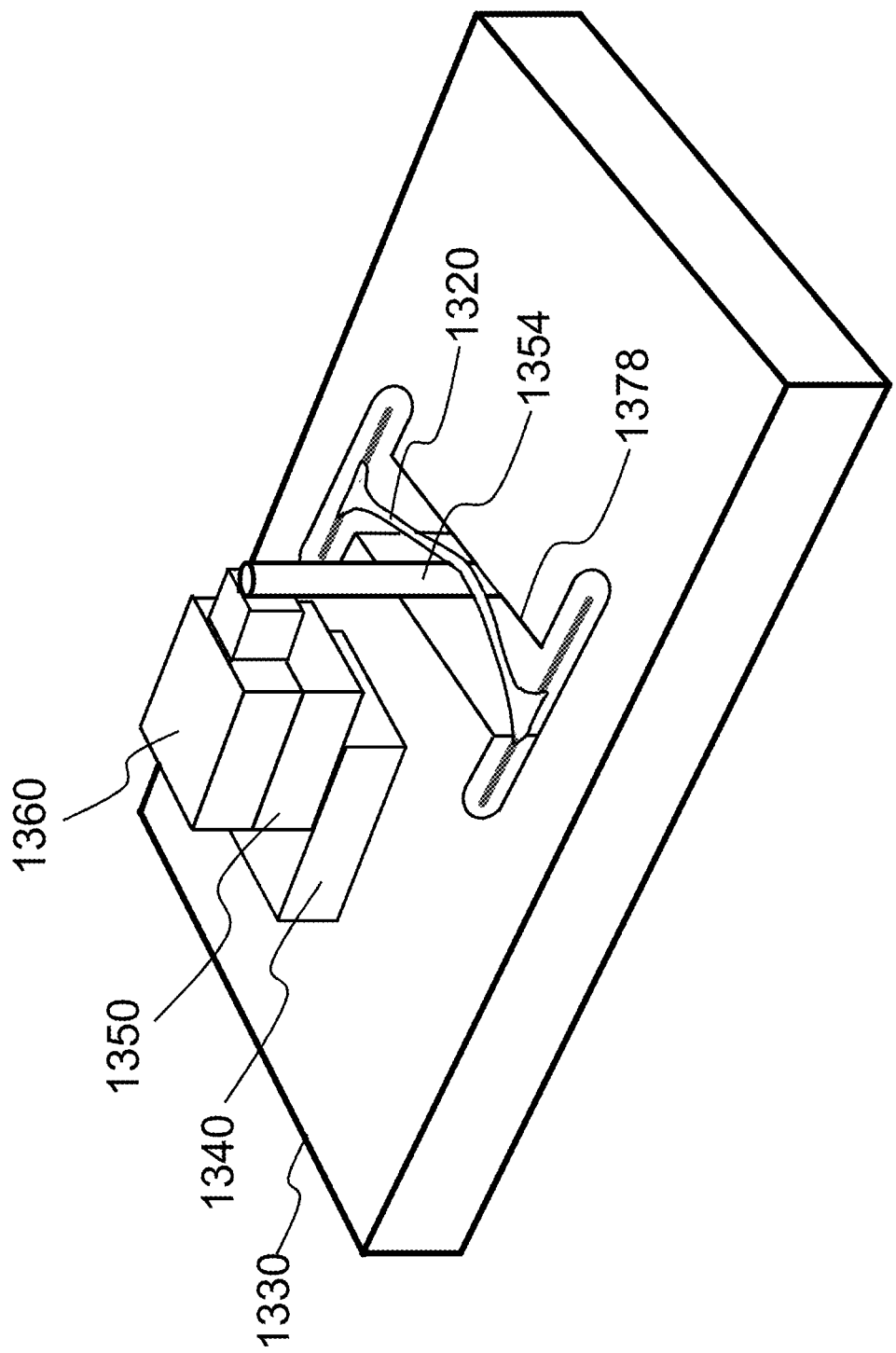
FIGS. 13A-13D schematically shows how an on-chip lateral displacement mechanism and a stiff load cell can be used to measure tissue tension according to certain embodiments of the present invention.
Figure 13B:
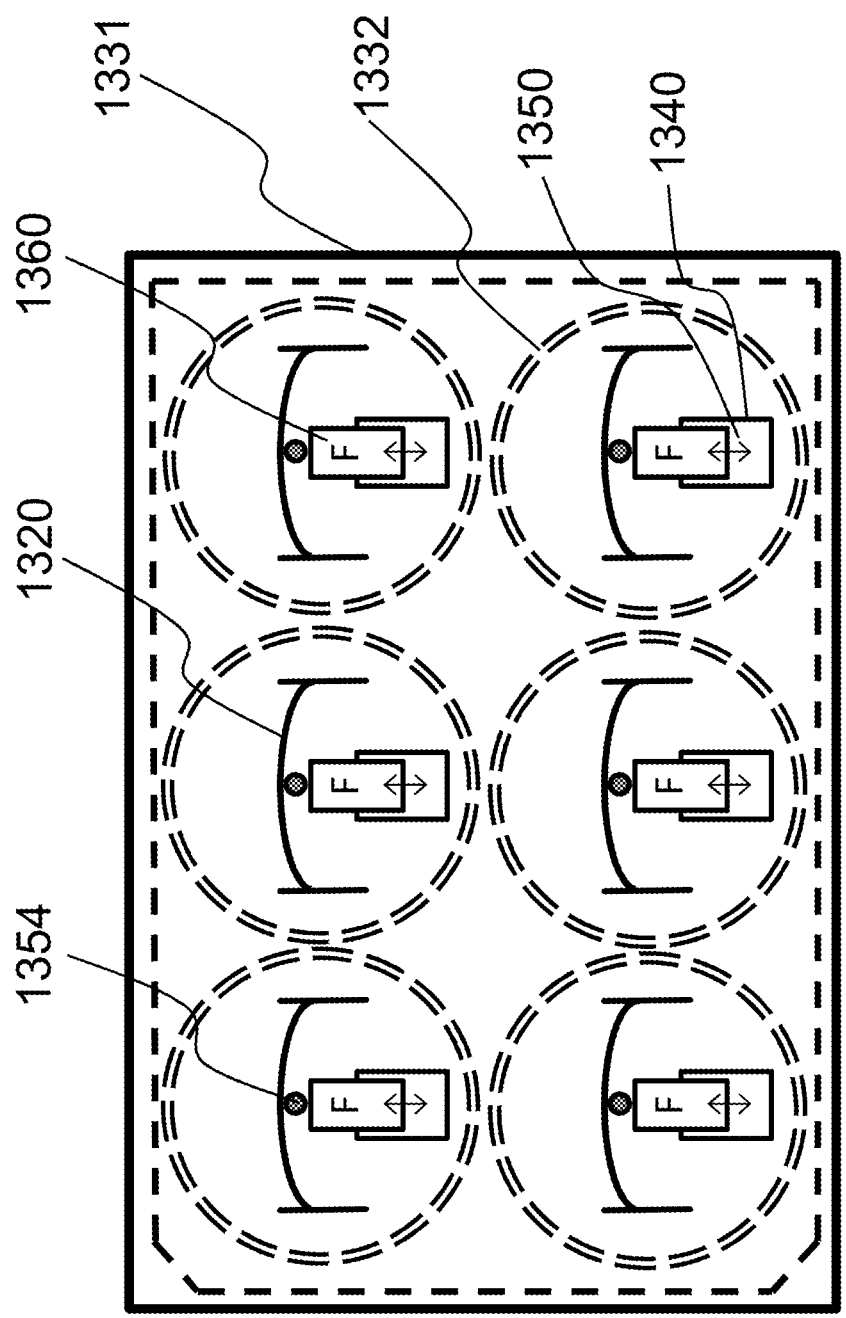
Figure 13C:
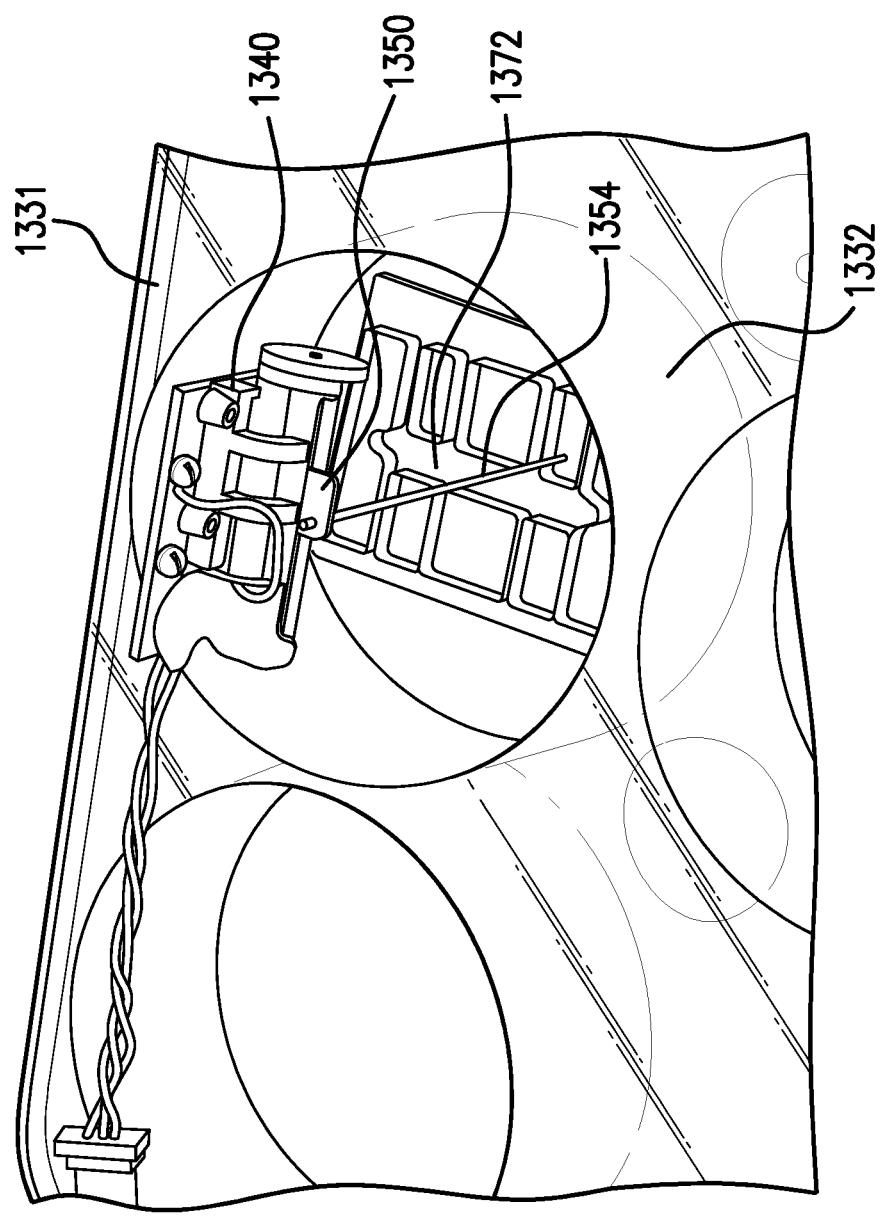
Figure 13D:
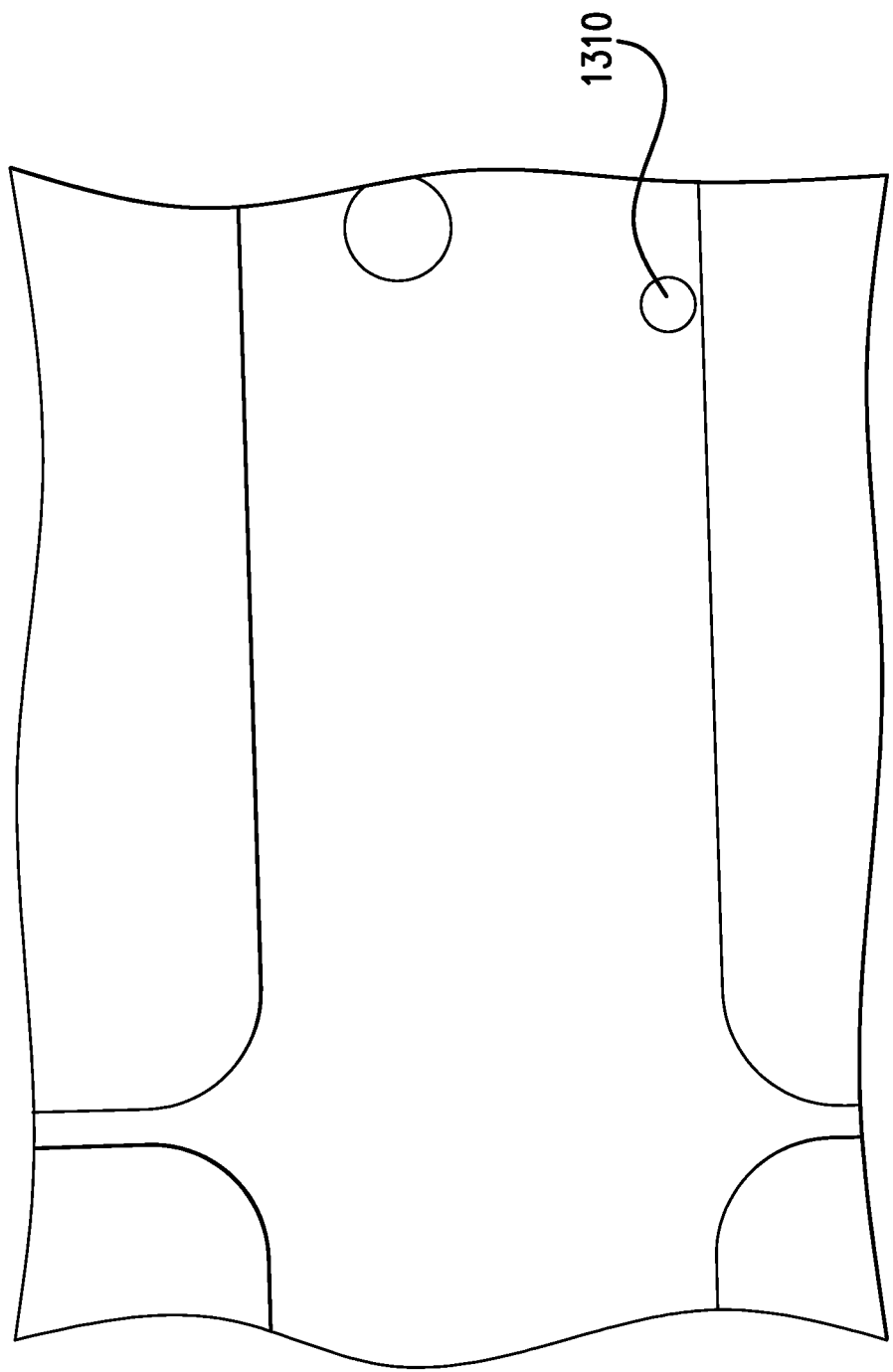

Variations of the present invention can also utilize electronic force sensors or optical displacement sensors instead of an optical read-out of a calibrated flexible probe. As shown in FIG. 13A, these can be implemented with rigid probes 1354 that provide stresses on piezoelectric sensors, or capacitive membrane sensors, or resistance bridge assemblies or other electronic force sensors 1360. Possible advantages of such systems could include faster parallel read-outs of arrays of tissue constructs. Any implementation of these rigid probes will probably need to incorporate a mechanical adjustment to bring the probe into the desired contact position with the tissue construct 1320, in this embodiment with a calibrated mechanical stage with fixed 1240 and moving parts 1350. All of these components are mounted on a base plate that includes the construct culture chamber 1378. In all implementations of the disclosed device it is important to consider the inertial component of sensor response, especially in the context of electrically stimulated muscle responses of low-volume muscle constructs. A key feature of such embodiments of this invention is that the stage displacement mechanism and the flexible probe could be replaced by a miniature, on-chip lateral displacement mechanism and a stiff load cell 1360 as shown in FIG. 13A. In this case, the delivery of force to the construct 1320 is done with a rigid probe 1354 that is attached to the load sensor in a manner that prevents any flexing of the connection or the probe. FIG. 13B shows how six of the devices shown in FIG. 13A with rigid probes 1354 and moveable force transducers 1360 on moveable 1350 stages 1340 could be mounted on the lid 1331 of a well plate with six-wells 1332 to make six independent measurements of six tissue constructs. FIG. 13B shows how six of the devices shown in FIG. 13A with rigid probes 1354 and moveable force transducers 1360 on moveable 1350 stages 1340 could be mounted on the lid 1331 of a six-well-plate to make six independent measurements of six tissue constructs. FIG. 13C is a photograph of a single linear servo with fixed 1340 and moving 1350 parts mounted on the lid 1331 of a six-well plate. The rigid actuator 1354 is mounted to the moving portion 1350 of the servo and extends down into the culture chamber 1372 contained in one of the wells 1332. FIG. 13D is a photograph of the tip of a 300 μm flexible probe 1310 at the edge of a 3 mm wide cell-culture channel, as recorded with a compact CCD inspection camera with built-in LED illumination.

Example 5

A Servo System Force Actuation with Flexible Probes and Optical Read-Out

Figure 14A:
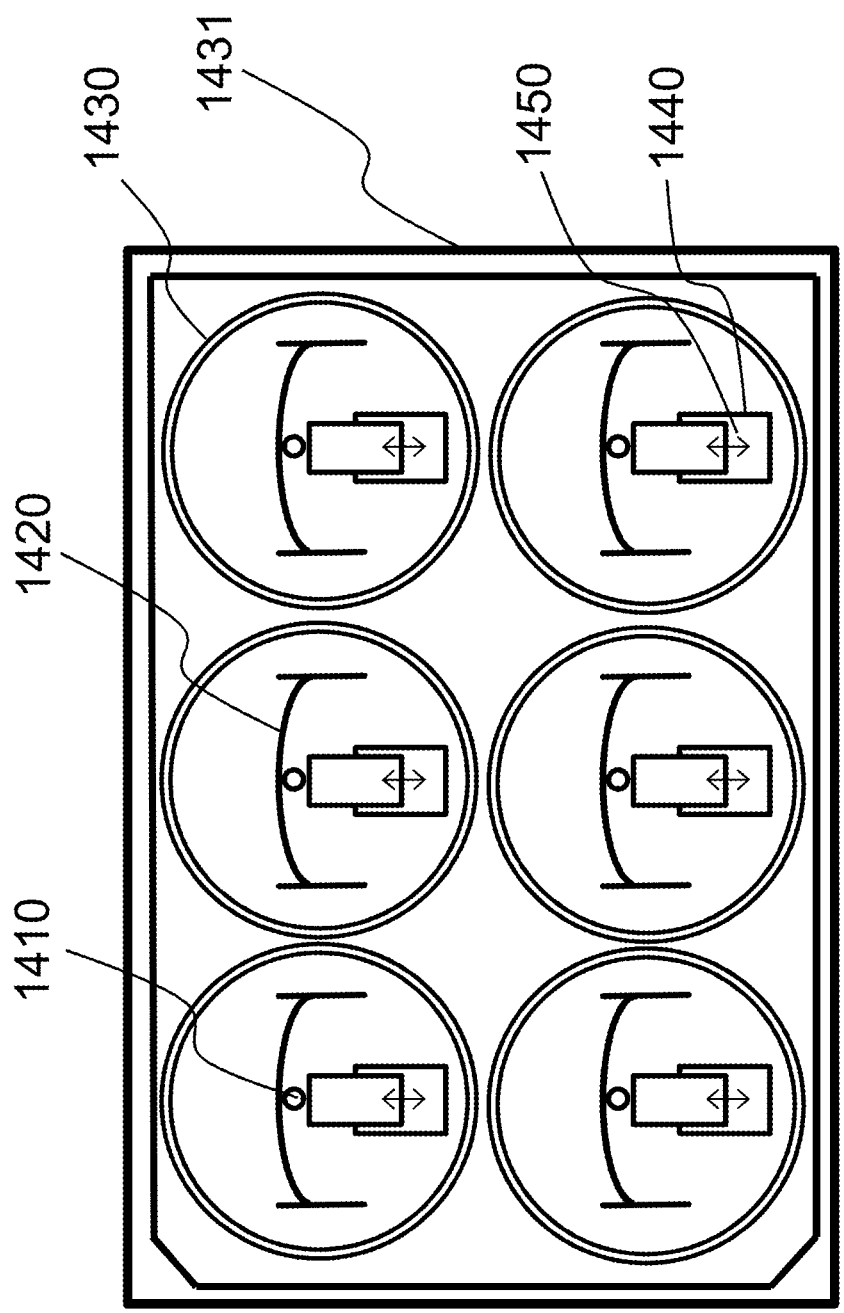
FIG. 14A schematically shows arrangements of the mechanical actuator within the well-plate according to one embodiment of the present invention.
Figure 14B:
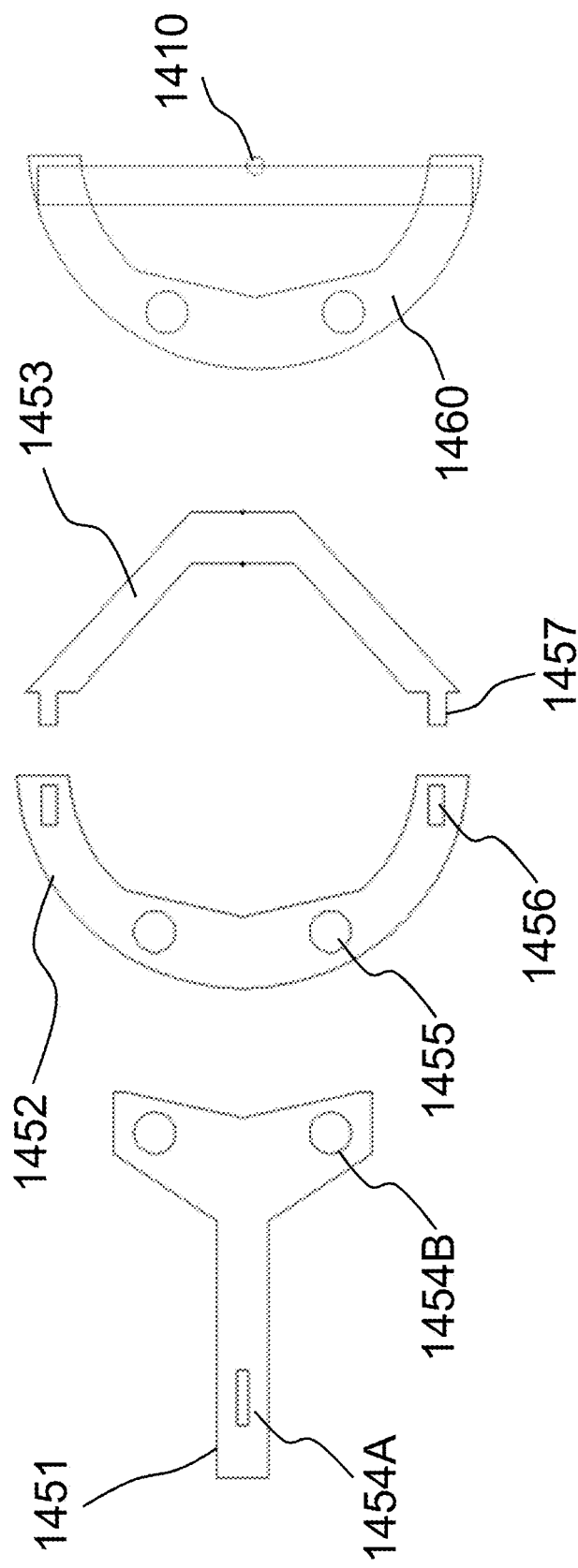
FIG. 14B schematically shows the structure of an actuator according to one embodiment of the present invention.

The greatest limitation of devices mounted on the lid of the well plate is that the force cannot be maintained when the lids are removed to change the media, which often must be done daily. In a certain embodiment of this invention, shown in FIG. 14A, the mechanical actuator 1440 and 1450 could be placed within the well 1430 of the well-plate 1431, so that the removal of the cover would not affect the adjustment of the flexible probe 1410 as it applies force to the construct 1420. For this to be possible, it is necessary to provide mechanical actuation through the bottom of the well plate, and to have all components in the well plate to be biocompatible and non-metallic. FIG. 14B shows one embodiment that satisfies these requirements. There are three components, an actuator arm 1451 that is moved beneath the well plate by an external servo, a C-shaped support base 1452, and a V-shaped probe support 1453. The actuator arm 1451 has a hole 1454A for engagement with the servo, and two holes 1454B to hold rare-earth magnets. The C-shaped support base 1452 also has two holes 1455 to contain the magnets that mate to those in the actuator arm 1451, so that when the arm 1451 is moved laterally by the servo, the base 1452 tracks that motion. There are two rectangular holes 1456 in the support base 1452 that mate to corresponding legs 1457 in the probe support 1453. Hence the support base 1452 and the probe support 1453 together form a movable, biocompatible, non-metallic probe holder 1460 that resides within the well and holds the flexible probe 1410. FIG. 14C shows the actuating assembly in their proper vertical alignment. The bottom of the well-plate would be between 1451 and 1460.

Figure 14E:
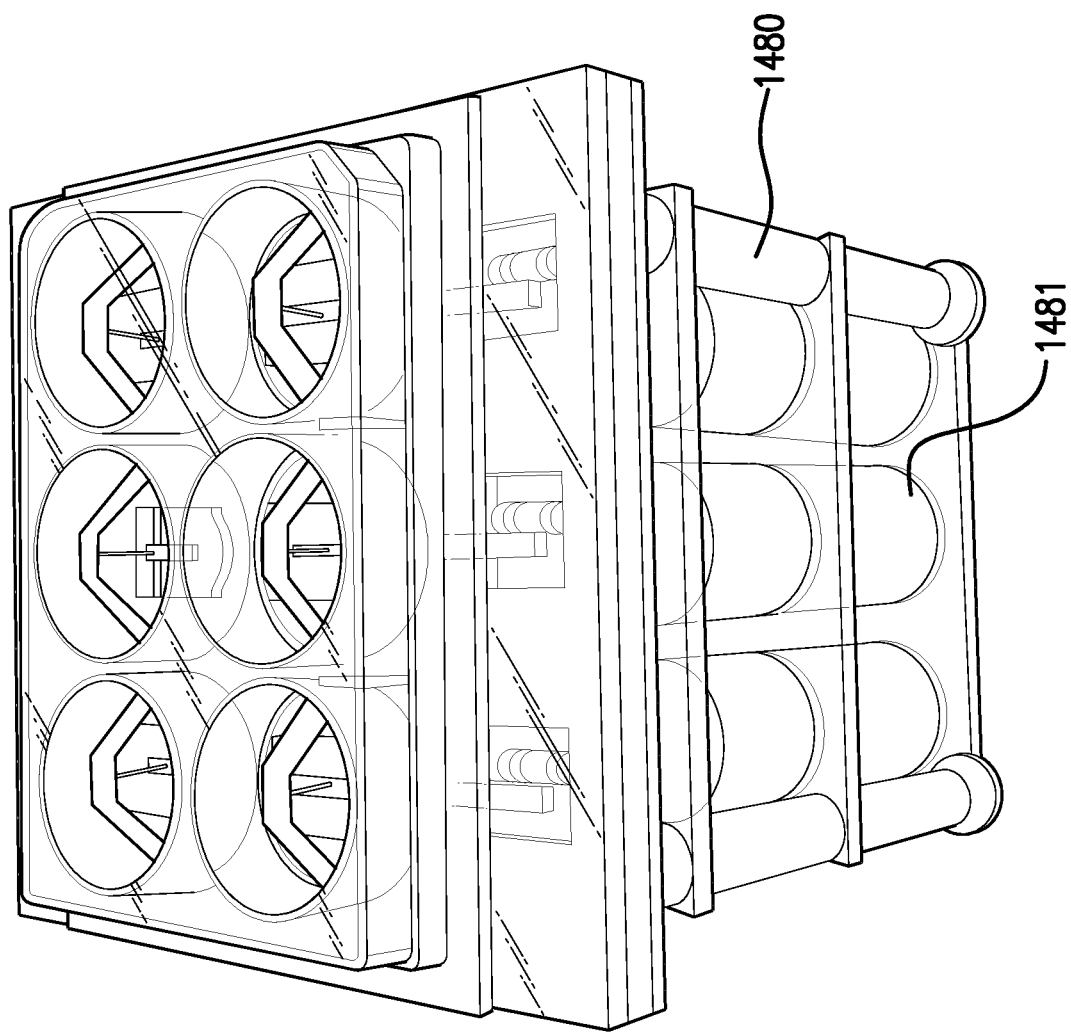
Figure 14F:
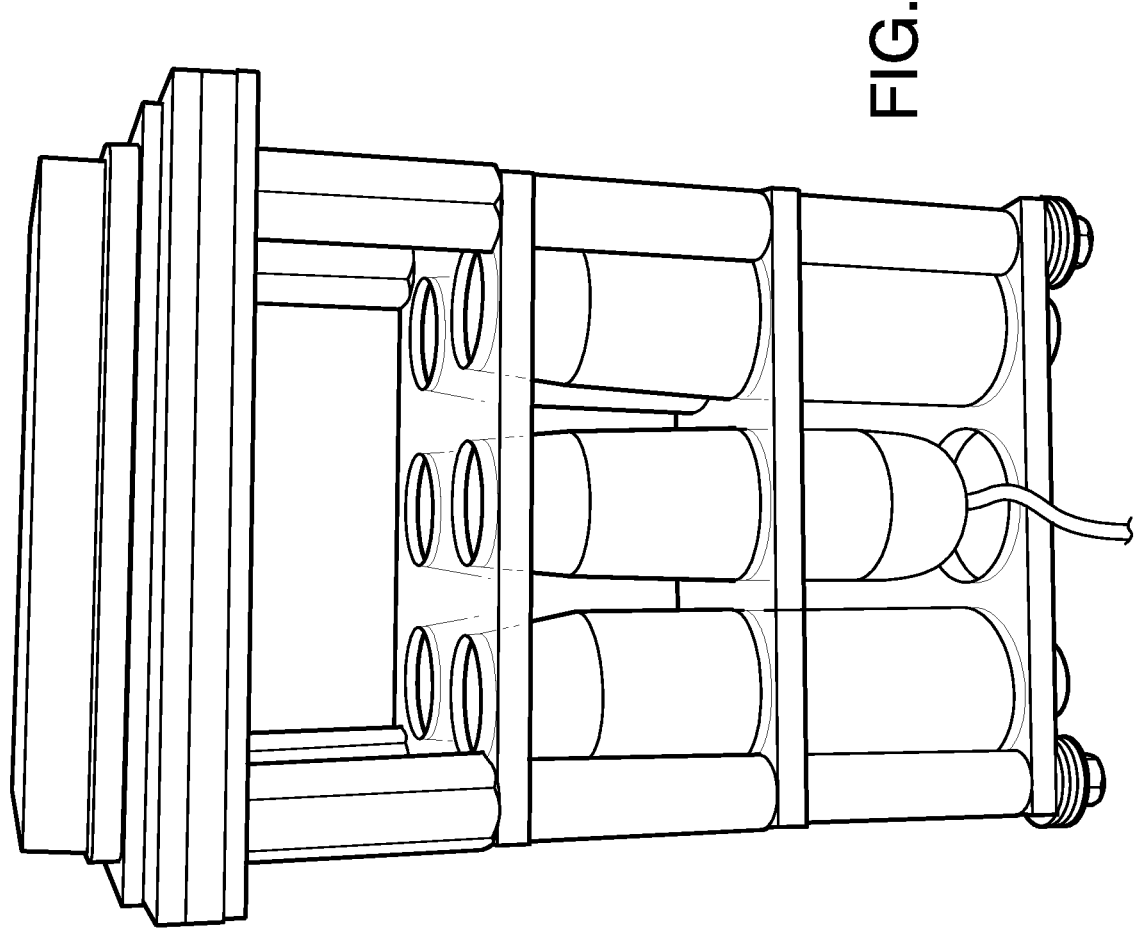

FIG. 14D shows a photograph of one embodiment of the present invention, where the concept is described in FIGS. 14A-14C. The servo actuator 1450 is supported by a base plate 1445 and drives the actuator arm 1451 underneath the well plate. Magnets 1458 connect the actuator arm toe the probe support frame 1460, which in turn supports the flexible probe. In this embodiment, the longitudinal axis of the tissue culture chamber 1472 is parallel to the motion of the actuator arm 1451 for experiments to stretch fibers longitudinally. FIGS. 14E and 14F show the six-well system, including a support frame 1480 and six cameras 1481 for recording the displacement of the probe tip. FIG. 14G shows how the approach of FIGS. 14A-14F can be used to apply with the flexible probe a lateral force to a construct that is attached at each end by two fixing portions 1474 that are stationary with respect to the moving probe support 1460. The applied force delivered by the flexible probe 1410 and the displacement of the construct can then be measured with the camera 1481 in FIG. 14E. FIG. 14H shows how the addition of a transverse fixing point 1490 to the end of the flexible probe 1410, when used in conjunction with a stationary fixing point 1474 can apply and measure longitudinal forces on the construct. The primary difference between longitudinal and lateral forces is the orientation of the construct with respect to the axis of motion of the probe support 1460, and, in the longitudinal case, that the free end of the probe has a fixing point that allows it to serve as the attachment point for one end of the construct. The location of the probe support 1460 totally within the well plate and its biocompatibility ensures that the forces being applied in FIGS. 14G-14H can be applied over the days to weeks required to mature a tissue construct, and that over these intervals the forces applied to the constructs can be modulated with ease.

Example 6

Various Types of Tissue Construct Holders

There is a need to develop high-throughput analytical devices to measure the mechanical characteristics of tissue constructs, especially in the context of induced pluripotent stem cells (iPSC) designed to perform bioremediation of damaged tissue, and of the need to develop high-throughput, organ-on-chip systems to investigate tissue-drug interactions and to evaluate possible toxic environmental compounds as they might affect particular tissue types or particular stages of tissue development. One such biological construct is the bone, cartilage, joint formation system currently being investigated by a number of labs and of interest to the EPA, DARPA, DTRA, and the NIH are funding programs in MicroPhysiological Systems that could benefit from this invention. The present invention could, with minor variations, be used to interface with a variety of tissue construct holders, which are outlined in this section and illustrated in FIGS. 15-20.

Figure 15:
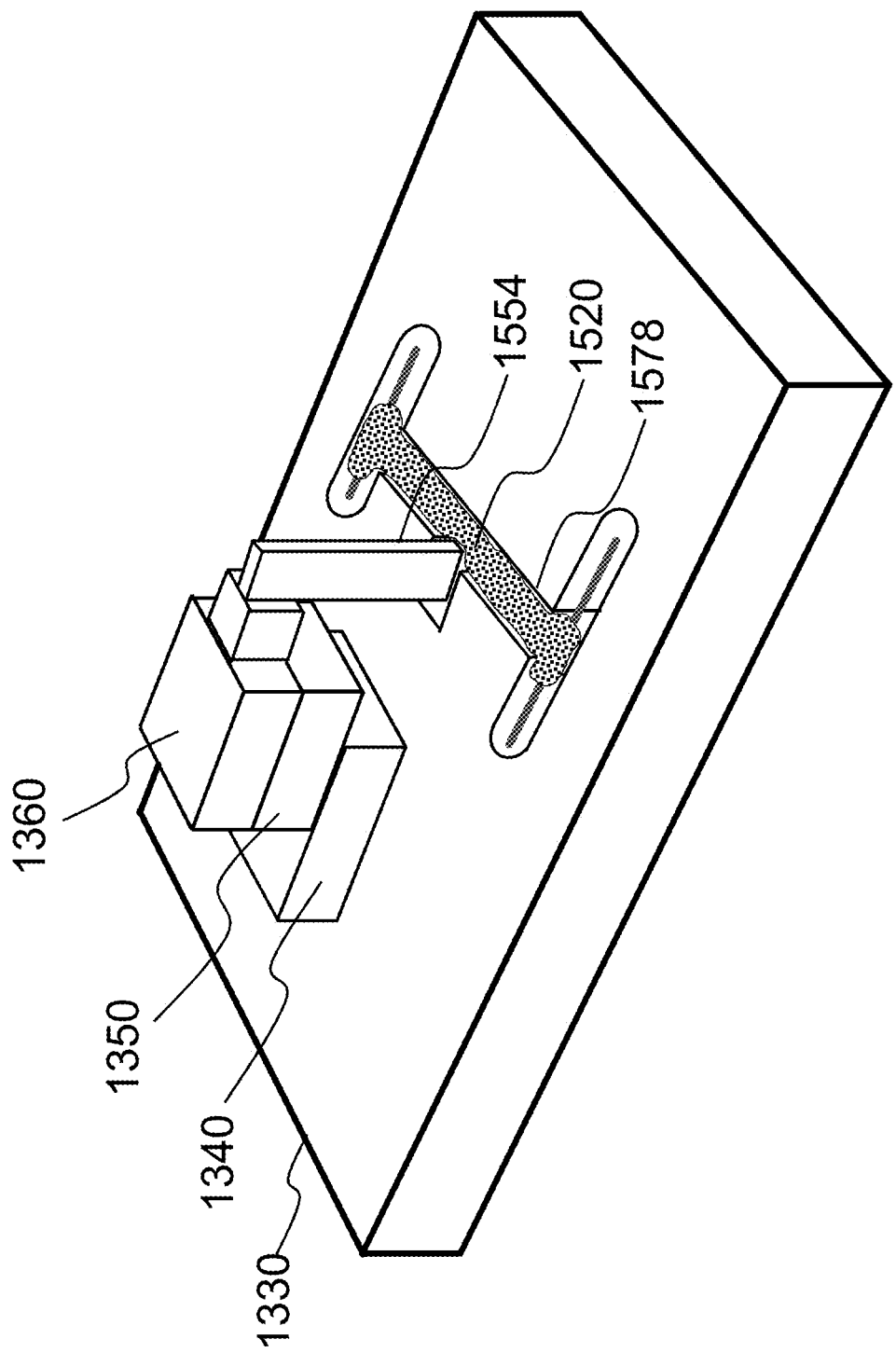
FIG. 15 schematically shows an alternative method of delivering force to the midsection of a tissue construct and measuring tension according to one embodiment of the present invention.

FIG. 15 indicates an alternative method of delivering force to the midsection of a tissue construct, for example neonatal bone segments, that is rigidly attached at both ends. Using an embodiment building upon FIG. 13A, the actuator 1554 driven by the mechanical stage 1340-1350 is very stiff and is recessed into the wall of the culture chamber 1578. The thick construct 1520 can be compressed locally by 1554.

Figure 16:
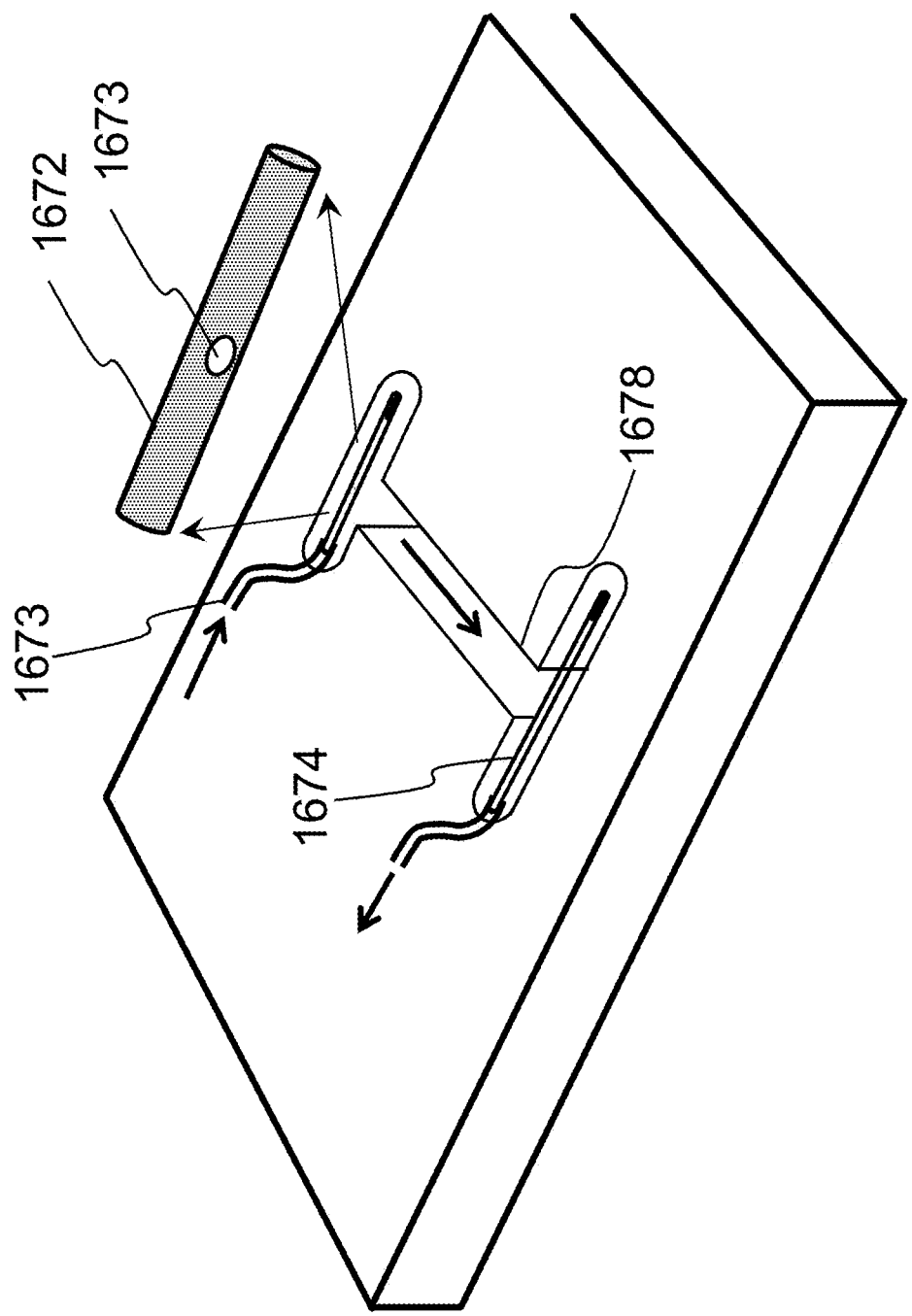
FIG. 16 schematically shows a means to stimulate vascularization of the cardiac tissue construct according to one embodiment of the present invention.

FIG. 16 provides a means to stimulate vascularization of the cardiac tissue construct by superimposing a directional flow in the interstitial space as the tissue construct develops. The rods at each end of the construct are replaced by fine-gauge tubing 1672, for example a segment of a hypodermic needle, that has a single hole 1673 in the side facing the opposite segment of tube. Plastic tubing 1674 connects an external pump or pressurized reservoir to the tube 1672 so that flow proceeds down one tube, across the cell culture chamber 1678, and returns by reentering the hole in the opposite tube 1674. A plate would seal the top of the cell culture chamber, or a matched pump could be used to suck the same amount of fluid as the first pump delivers. The presence of endothelial cells within the cell mixture should lead to the self-assembly of at least one microvessel along the axis of the mature construct. It would also be possible to place a hollow fiber between the two openings 1673 to support seeding with endothelial cells on the interior while other cells, such as cardiomyocytes, are cultured on the outside. The hollow fiber could be biodegradable. Either of these approaches would produce a perfused construct that could then be studied using the mechanical means discussed in this invention.

FIGS. 17A-17F indicate a method of bending a biological construct near its center point by rotating or bending a specially shaped tissue construct holder around a hinge point. The holder could be fabricated of a flexible polymer, such as PDMS, which will allow flexure without breaking.

FIG. 17A is a concept drawing for a bendable bone construct. A flexible PDMS mold 1778 shaped like an hour glass contains a chamber that is used to cast the cells and matrix that will be used to grow the tissue construct 1720. The protrusions at each end of the rod keep the construct in the mold while being bent, as shown in FIGS. 17B and 17C.

Figure 17E:
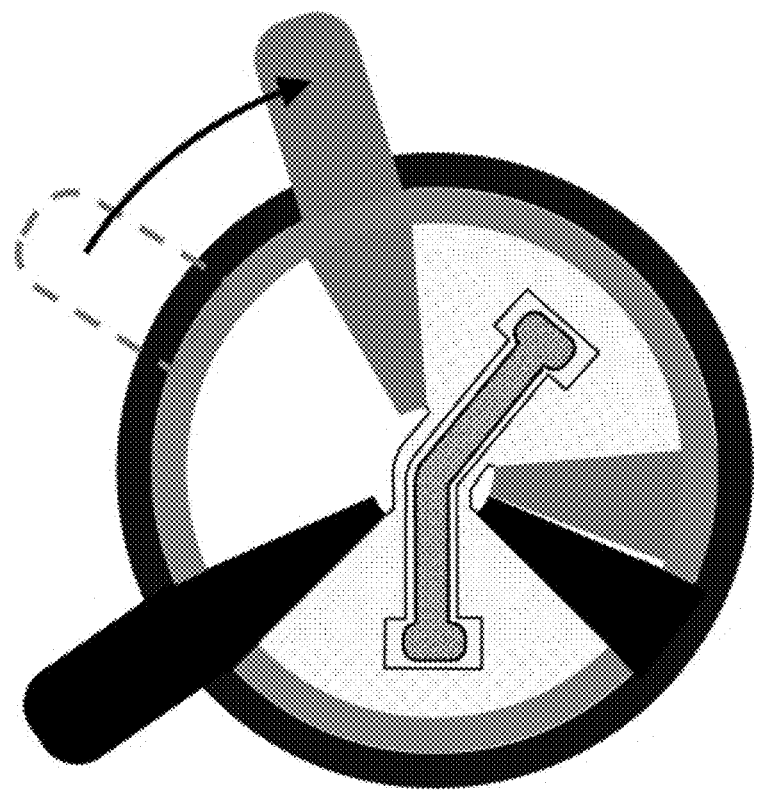
Figure 17D:
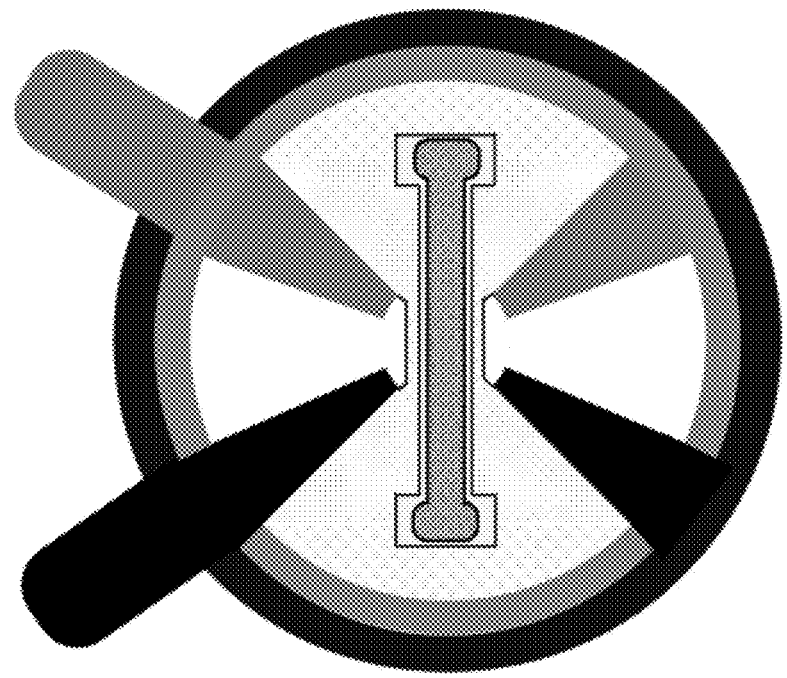

A circumferential structure such as that indicated in FIG. 17D-17E could be used to make certain that the axis of the construct hinge point is in the center of the biological construct. The two mold halves are each fixed to a ring in a concentric circular bearing (left attached to the black, outer ring, and right attached to the gold gray ring). When the inner ring is rotated relative to the outer one, the limb construct is bent. The concentric ring bearing ensures that the bending occurs at the midpoint of the construct, with one side of the construct being compressed and the other side stretched. The PDMS mold at the neck is thin enough to accommodate the stretching and compression. More advanced devices would use a miniature servo to control the time course of the bending.

Figure 17F:
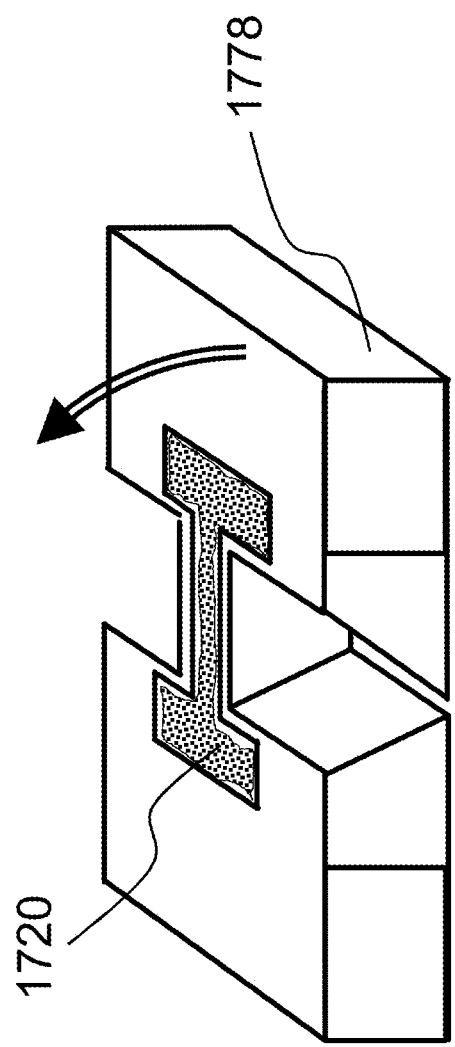

FIG. 17F indicates an alternative method of causing a bend in the middle section of a biological construct. This involves a rotational motion around a hinge point located near the bottom of the biological construct holder.

Figure 18:
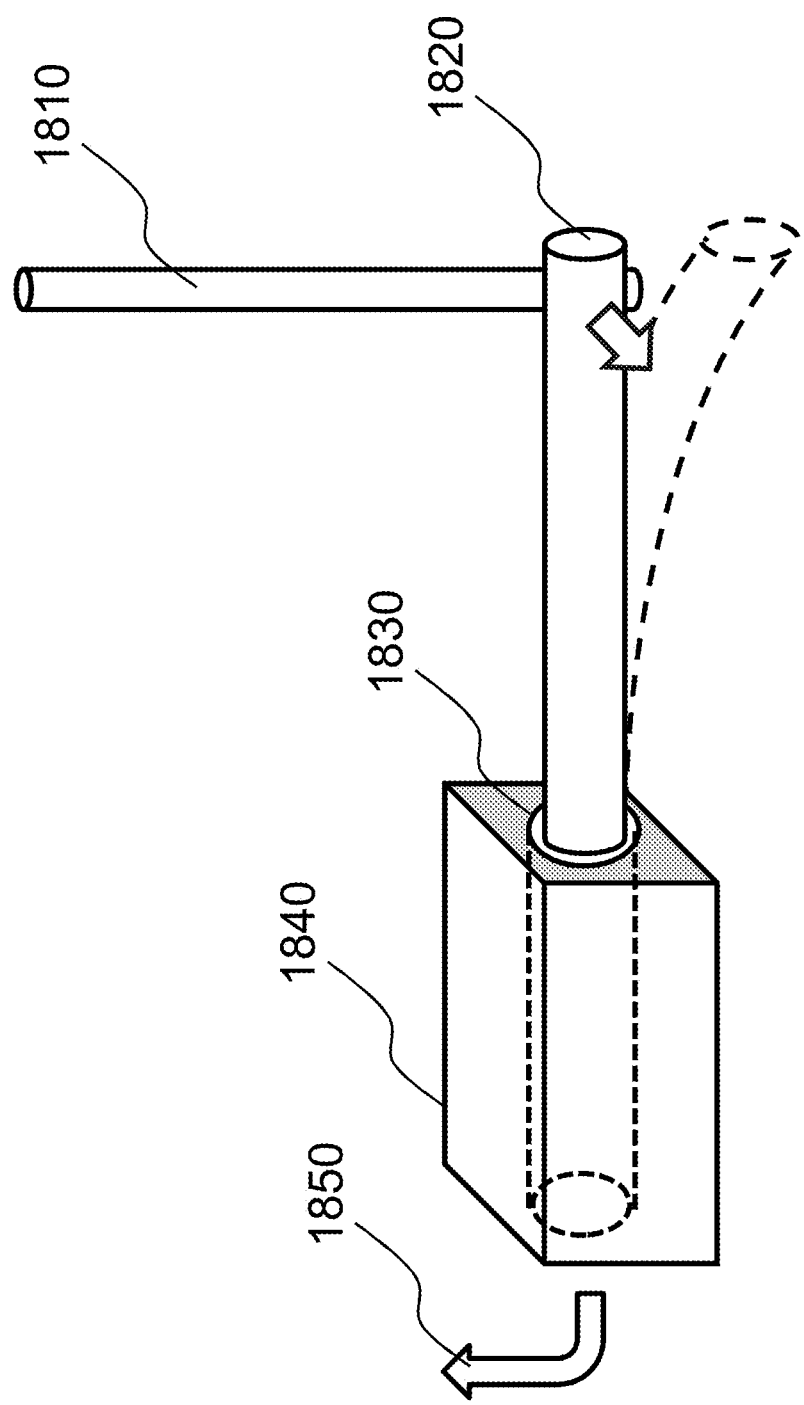
FIG. 18 schematically shows a method of producing a localized bending force on a biological tissue construct according to one embodiment of the present invention.

FIG. 18 indicates a method of producing a localized bending force on a biological tissue construct. This could be easily accomplished by using the technology in this present invention, and it may provide a very useful platform for investigations of bone joint formation, local tissue damage, wound healing, or inflammation response studies. In the certain embodiment shown in FIG. 18, a cylindrical bone construct 1820 is cast in a cylindrical mold and then drawing into a suction/perfusion port 1830 in a block 1840 that is connected to an external pump to provide suction 1850. The flexible probe 1810 is used to apply a lateral force on the end of the construct, and measurement of the deflection of both the probe and the construct can be used to determine the elastic properties of the construct. Embodiments such as those shown in FIGS. 13 and 14 would allow the measurement of six or more constructs.

The difficulty with the approach shown in FIG. 18 is that the constructs are fragile early in their development and are difficult to handle. In addition, an unsupported, immature construct can alter its shape as it matures, departing from the originally molded cylinder. The approach in FIG. 18 also does not lend itself to parallelization as might be required for high throughput screening. FIGS. 19A-19D addresses these problems by casting the construct in a hydrogel and then deforming the hydrogel while it contains the construct. We will explain the approach considering only a single construct, but the approach can readily be parallelized to create multiple constructs in the same hydrogel. All of the drawings will be of a cross-section through the construct.

Figures 19A, 19B:
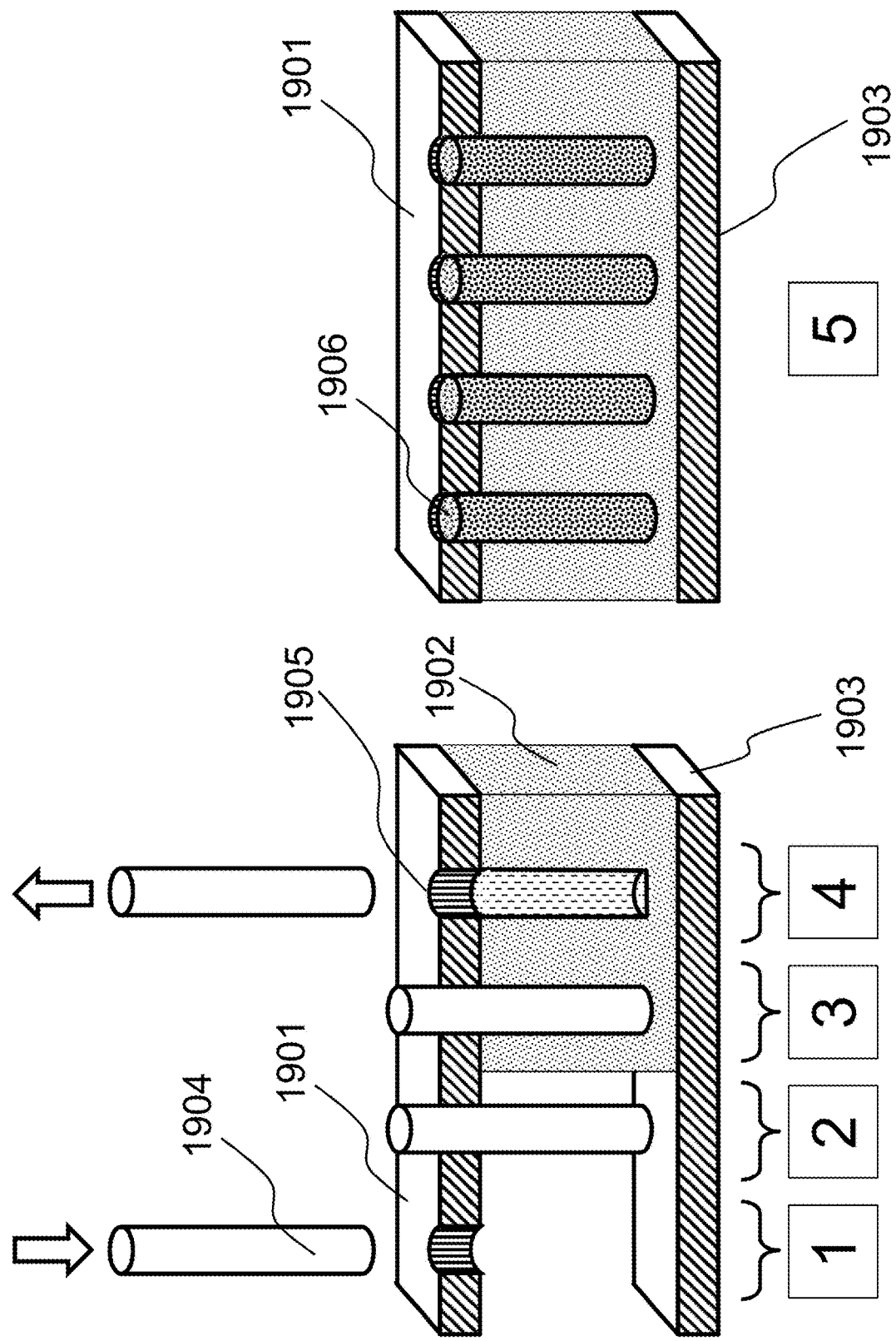
FIGS. 19A-19D schematically shows casting the construct in a hydrogel according to one embodiment of the present invention.

FIG. 19A shows the cross-section of two rigid plates 1901 and 1903 that have between them a flexible hydrogel 1902 which bonds to the rigid plates. Prior to crosslinking the hydrogel, a solid cylinder 1904 is inserted into the space between solid, rigid plates 1901 and 1903 by means of holes in plate 1901 (Step 1 and 2). After the hydrogel has crosslinked and has been transformed into a flexible solid (Step 3), the solid cylinder 1904 is removed (Step 4) thus leaving a hollow cylinder area 1905, which can be used as a bioreactor chamber to allow certain types of biological cells to form a semi-rigid biological tissue structure (Step 5).

FIG. 19B shows the two rigid plates 1901 and 1903 and the biological tissue structures 1906 which have formed within the previously hollow cylindrical voids. As shown in FIG. 19C, when the lower plate 1903 is moved laterally relative to the upper plate 1901 it will deform the flexible hydrogel separating the two plates if the hydrogel is firmly bonded to the two plates. The three dimensional structure of the hydrogel will transfer shear forces to the biological construct 1906 and will cause it to bend.

Figure 19D:
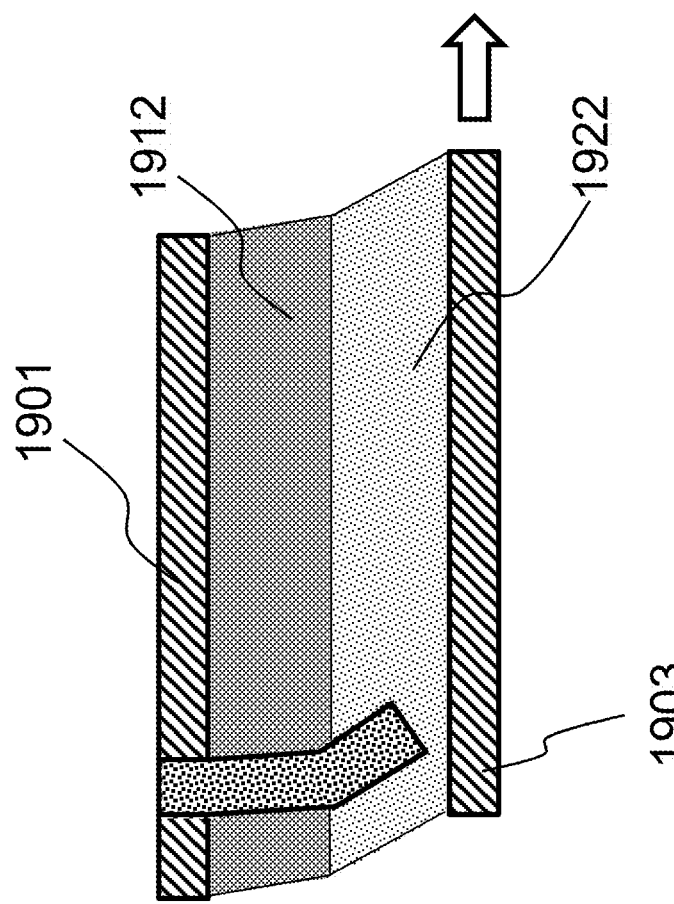
Figure 19C:
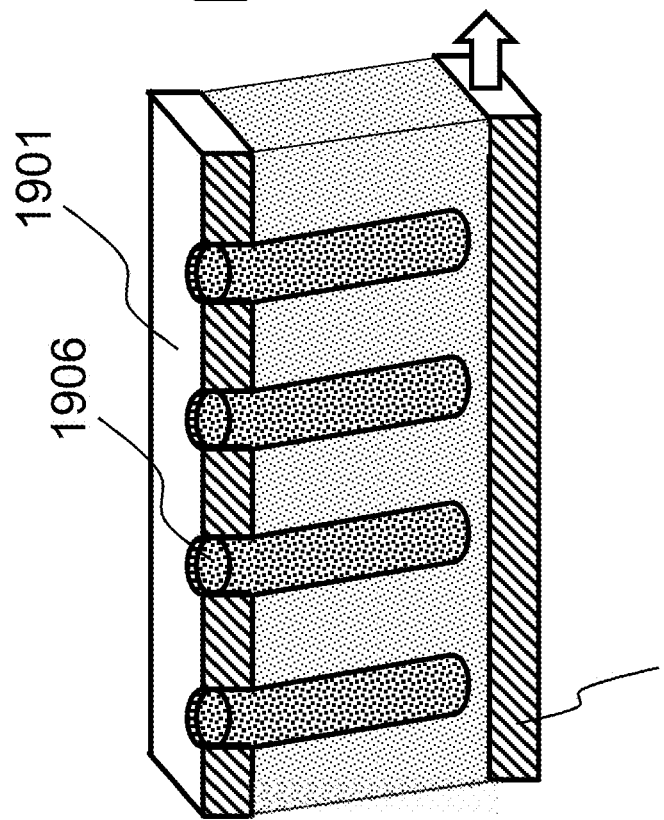

FIG. 19D shows a variation of this technique wherein the biological construct is shown to be defined by a two-layered hydrogel, where the upper layer 1912 is stiffer than the lower one 1922. In this case the deformation caused by the hydrogel-carried shear forces will cause more bending to occur in the softer region of hydrogel containing the biological construct. When rigid plate 1901 is moved relative to rigid plate 1903, then the shear forces transferred through the hydrogel regions 1912 and 1922 will not be uniform and this will result in different amounts of bending force being transmitted to the biological structure regions in those two layers, thus creating a transition region of bending near the interface region of the two differing stiffness hydrogel regions.

Another embodiment of this aspect of the invention would be to have a tapered or stepped plug 1904 to define the shape of the bioreactor into which the cell/matrix mixture is cast. In this case, the differing stiffness of the cast construct would also lead to bending, as long as the stiffness of the construct was stiffer than the hydrogel being used. Note that one of the key advantages of this approach is that the hydrogels can be chosen to be highly permeable to cell culture media, and as a result, the constructs can be perfused while they are in the hydrogel. In addition, this process can be massively parallelized. Furthermore, by making the lower plate 1903 optically transparent, it will be possible to visualize the construct while it is maturing. If the sets of constructs in FIGS. 19C and 19D were laid on their side against a glass coverslip after the initial casting, it would be possible to visualize the constructs over their entire length. There are numerous variations of this approach to molding constructs in hydrogel and then applying shear forces to distort them so as to examine force-dependent changes in gene expression and cellular phenotype.

FIG. 20A shows an alternative method of distorting the hydrogel. In this case, the hydrogel is molded and polymerized in the form of walls 2001 rising above an integral, solid base 2002. When the hydrogel is cast, rods are used to form one or more vertical holes 2003 in each wall 2001 that penetrate deep into the base 2002, which allows the casting of long cellular constructs 2004. Once the constructs are ready for bending, a series of ganged plates 2010 are inserted between the walls. Pivots at the bottom (2022) and top (2021) of the plates allows the levers 2031 and 2041 to move the top row of pivots to the right while lever 2032 holds the bottom edges of the plates stationary. The design of the plates can be such that the actual pivots lie outside of the culture vessel, by having notches 2050 in the plates that span the walls of the dish 2055 in which the hydrogels have been cast.

FIG. 20D shows how a flexible probe 2010 that is moved laterally by probe support 2060 can be used to distort a construct 2004 that is contained in a flexible hydrogel wall 2003 that contains a cylindrical cell culture chamber 2001 and that is an integral part of a hydrogel base 2002 that also contains a portion of the construct 2004. Multiple probes could be used to distort and measure the stiffness of multiple walls, or a single probe could be moved from wall to wall. In another embodiment, the hydrogel walls are replaced by hydrogel posts, each integrally attached to the hydrogel and containing a single construct. In this case, the measurement of the force required to deflect a single construct/post combination would be possible, rather than the multiple constructs in a wall. The hydrogel posts could either be rectangular or round.

The devices outlined in this invention could be used to provide precisely defined local forces, or, through the use of a rigid probe system coupled to a command servo, these well plate-based devices could provide precisely known local deformation intrusions or distortions of the biological construct. Minor variations of this system could include a C-shaped pushing assembly that could, when pressed against the tissue construct, act to limit that local portion of tissue access to media-borne nutrients or gases—thus serving as a model for ischemic injury to tissue. FIGS. 17A through 20C indicate a method of using a flexibly hinged tissue construct holder assembly to create a localized region of bending stress. This construct might prove useful in the study of bone joint formation. The mechanical rotation indicated on the diagram could be implemented using a variation of the mechanical servo actuators shown elsewhere in this invention disclosure.

Example 7

I-Wire Heart-on-a-Chip

In certain embodiments, the present invention provides a three-dimensional (3D) cardiac tissue model that is intermediate between a cellular monolayer and a complete ventricle. Specifically, a small-diameter, cylindrical heart-on-a-chip cardiac fiber construct is provided, which is termed the I-Wire engineered cardiac tissue construct (ECTC), or more simply the "construct." The ECTC does not require vascularization and is large enough to simplify quantitative measurements of both electrophysiological responses and the passive and active elastic properties of the constructs under different stimulus, mechanical loading, and drug and toxin protocols. In certain embodiments, the I-Wire system and the ECTC are suitable to be used in drug development, toxicology, and physiology.

In certain embodiments, the I-Wire system can be implemented at low cost and small size to readily enable medium-throughput screening, which could include sustained electrical, mechanical, and/or pharmacological stimulation with continuous electrical and intermittent biomechanical recording. The system can be implemented with small fluid volumes to allow electrochemical and mass spectrometric characterization of the bioenergetic and metabolomic responses to electrical stimulation, mechanical loading, drugs, and toxins. One specific example is described as follows.

Method step 1. Preparing the PDMS casting mold: An array of six casting mold cavities was machined into a solid cast acrylic sheet using a 0.79 mm diameter end mill and a desktop CNC milling machine (MicroProto Systems, Chandler, Ariz., USA) driven by Mach3 software and a personal computer. Each cavity had a depth of 3 mm and incorporated a set of four distinct thin ridges to define channels suitable for later placement of anchoring wires. After cleaning the machined cavities, a narrow rim of card stock paper was placed around the 75 mm×75 mm array of six cavities, and each of the cavities was filled to overflowing with liquid PDMS activated in a 10:1 weight ratio with curing agent (SYLGARD™ 184 kit, Dow Corning, Midland, Mich., USA). The filled mold array was placed in a vacuum chamber for 15 minutes to degas the PDMS, and then a flat plastic plate was lowered onto the array for meniscus elimination and surface leveling. The assembly was placed in a 65° C. oven overnight to cure the PDMS. Thereafter, the six-I-Wire array was removed from the mold and individual devices were separated and transferred to the six-well plate. Two platinum or titanium wires were inserted in the channels on opposite sides of the device (FIG. 21A) to serve as anchors at each end of the construct.

Figure 21C:
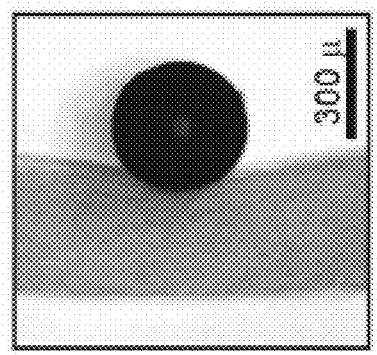
FIG. 21C shows an image of the central part of the ECTC and the tip of the flexible probe recorded with a Zyla sCMOS camera.
Figure 21B:
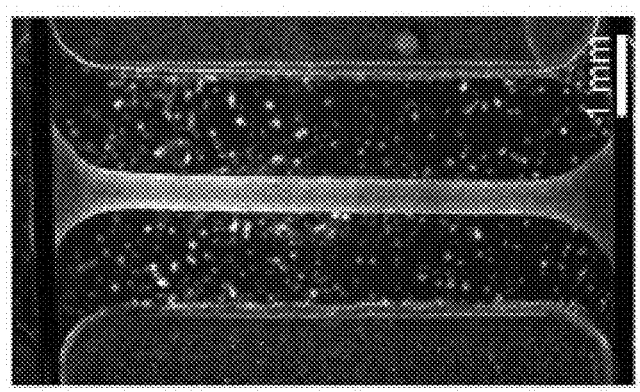
FIG. 21B shows a magnified image of an engineered cardiac tissue construct (ECTC) depicted by the white rectangle in FIG. 21A. The construct is attached to titanium wires.
Figure 21A:
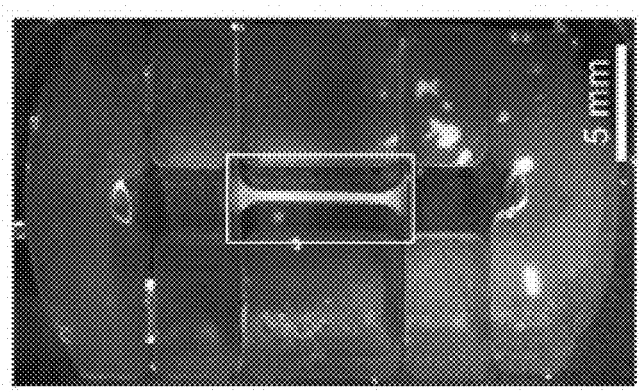
FIG. 21A shows a PDMS-fabricated insert that fits into a six-well plate with its cardiac tissue construct according to one embodiment of the present invention, where two additional grooves are for electrodes for long-term field stimulation.
Figure 21D:
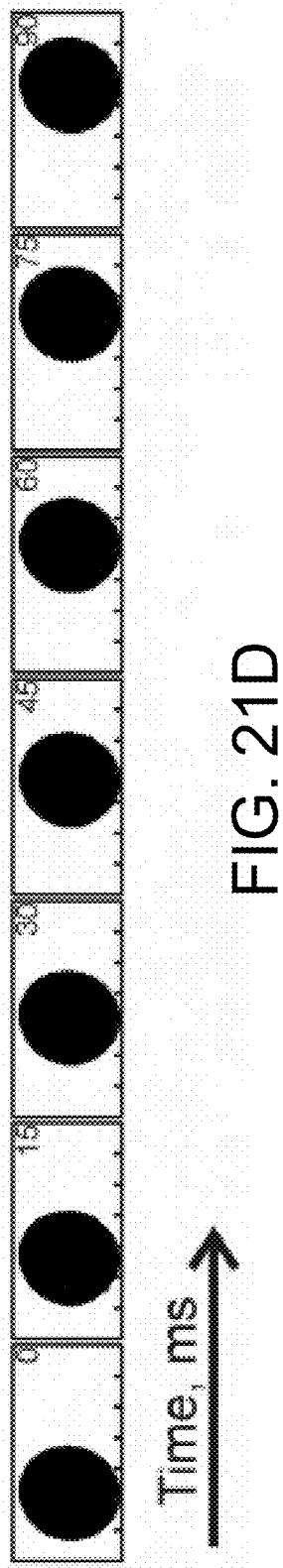
FIG. 21D shows the sequence of processed binary images showing probe tip location during an ECTC contraction. The number in the upper right corner of each image represents elapsed time (ms). The image dimension is 700 µm×350 µm.
Figure 21E:
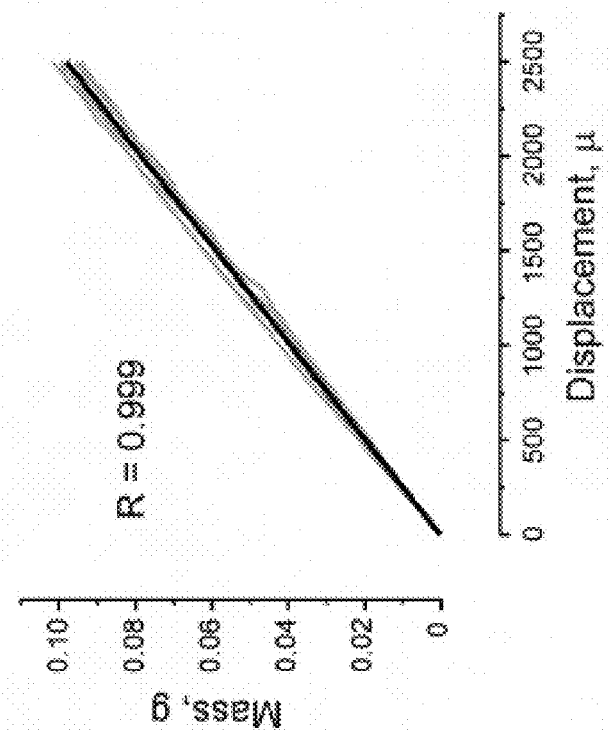
FIG. 21E shows a force sensor calibration graph. The graph includes three probes with two measurements for each probe at each plotted point.

Method step 2. Cell isolation and culturing: Neonatal rat ventricular cells were obtained from 2-day-old neonatal Sprague-Dawley rats using a trypsin digestion protocol with agitation overnight at 4° C. and plating cells for 40 minutes at 37° C. The population of isolated cells is heterogeneous and besides cardiomyocytes includes cardiofibroblasts, endothelial cells, and vascular smooth muscle cells. The presence of the different cell types is important for formation of the extracellular matrix and tissue structure. The isolated cells were mixed with fibrinogen (5 mg/mL, Sigma-Aldrich, St. Louis, Mo., USA)/Matrigel™ (100 µL/mL, BD Biosciences, San Jose, Calif., USA) plus thrombin (15 µL, 100 U/mL, Sigma-Aldrich, St. Louis, Mo., USA), and pipetted in a casting mold (FIG. 21A). Thereafter, cells were kept at 37° C. in a 5% $CO_2$ humidified cell culture incubator for 1 hour. When fibrinogen was polymerized, 2 mL of cell culture media was added per well. The culture medium consisted of DMEM (Gibco Fisher Scientific, Waltham, Mass., USA), 10% horse serum (Gibco Fisher Scientific, Waltham, Mass., USA), 2% chick embryo extract (US Biological Fisher Scientific, Waltham, Mass., USA), 1% penicillin/streptomycin (Gibco Fisher Scientific, Waltham, Mass., USA), 10 µg/mL insulin (Sigma-Aldrich, St. Louis, Mo., USA), 400

μM tranexamic acid (Sigma-Aldrich, St. Louis, Mo., USA), and 33 μg/mL aprotinin (Sigma-Aldrich, St. Louis, Mo., USA). Over time, the preparation condensed to form elongated muscle fibers of 350-400 μm in diameter and 7 mm long. After 13-15 days of culturing, the contractility and stiffness of the ECTC (FIGS. 21B and 21C) could be measured using our microscope-based optical setup (FIG. 3A).

Method step 3. Registration system for the contraction recording: To apply tensional force to the ECTC and detect contraction, a flexible PEEK tube of 365 μm in outer diameter and 120 μm bore (Putnam Plastics, Dayville, Conn., USA) and 28 mm length was glued to a Plexiglas cantilever adjuster attached to a cantilever support plate with two embedded position-control magnets (FIG. 3A). The stiffness of the probe was roughly matched to that of the ECTC; one might choose to use either a softer or stiffer probe to study ECTCs with different mechanical properties. The cantilever support plate with cantilever adjuster and flexible probe was mounted with a friction fit to the condenser of the inverted optical microscope (Eclipse Ti, Nikon, Melville, N.Y., USA) equipped with a digital camera system (Zyla sCMOS Camera, Andor Technology, Belfast, Northern Ireland). The 16.6×14.0 mm sensor has 2560×2160 pixels resolution, and a spatial resolution of 3.25 μm/pixel. Movies (15 seconds in duration) were acquired at 200 frames per second. The microscope was equipped with a motorized stage (MS-2000 Flat-Top XYZ Automated Stage, ASI, Eugene, Oreg., USA), which could be moved precisely in a horizontal plane and thereby apply a lateral horizontal force at the mid-section of the ECTC normal to the long axis of the ECTC, which was anchored at both ends (FIG. 21B). The spring characteristic of the plastic cantilever was calibrated using an analytical balance (Ohaus Corporation, Parsippany, N.J., USA) and a high precision micromanipulator (Newport, Irvine, Calif., USA), and it demonstrated a linear weight—displacement relationship (FIG. 3A). During contraction of the ECTC, the optical registration of the distance of probe tip displacement was used to calculate the force involved in deforming the ECTC.

Method step 4. Registration of action potential and reconstruction of electrical and mechanical restitution: Action potentials were recorded by utilizing floating micropipettes filled with 3-M KCl. The micropipettes were pulled from borosilicate glass capillaries (WPI, Sarasota, Fla.) by a micropipette puller (P80/PC, Sutter Instruments, Novato, Calif., USA). The tips of the micropipettes were mounted on a platinum wire of 50 μm diameter. The reference Ag/AgCl electrode (EPB, WPI, Sarasota, Fla., USA) was placed in the well next to the PDMS insert. The electrodes were connected with a dual differential electrometer (Duo 773, WPI, Sarasota, Fla., USA) and signals were digitized, visualized, and recorded by a digital oscilloscope (TDS5034B, Tektronix, Beaverton, Oreg., USA). The sampling rate was 25 kHz. The recorded data were processed with a Savitzky-Golay digital filter (OriginLab, Northampton, Mass., USA). To inhibit contractility, the excitation-contraction uncoupler blebbistatin (Sigma-Aldrich, St. Louis, Mo., USA) was applied at a concentration of 6 μM. A red filter (Edmund Optics, Barrington, N.J., USA) was used to prevent photolysis of blebbistatin during microscopic observation. The action potential duration (APD) was detected at a level of 90% of recovery. The dynamic pacing protocol started with a stimulation interval of 2500 ms and was gradually reduced with steps of 50-500 ms. The voltage (six times threshold) was delivered via the anchoring titanium wires (0.25 mm, Sigma-Aldrich, St. Louis, Mo., USA) by a Grass square pulse stimulator (Grass SD9, Warwick, R.I., USA). To reconstruct the mechanical restitution curve, the ECTCs were paced with frequencies of 0.5, 1, 2, 3, and 4 Hz at an applied transverse force of 0.54 mN. The contractility was also tested by β-adrenergic stimulation using isoproterenol (Sigma-Aldrich, St. Louis, Mo., USA) at a concentration of 1 μM.

Figures 24A, 24B:
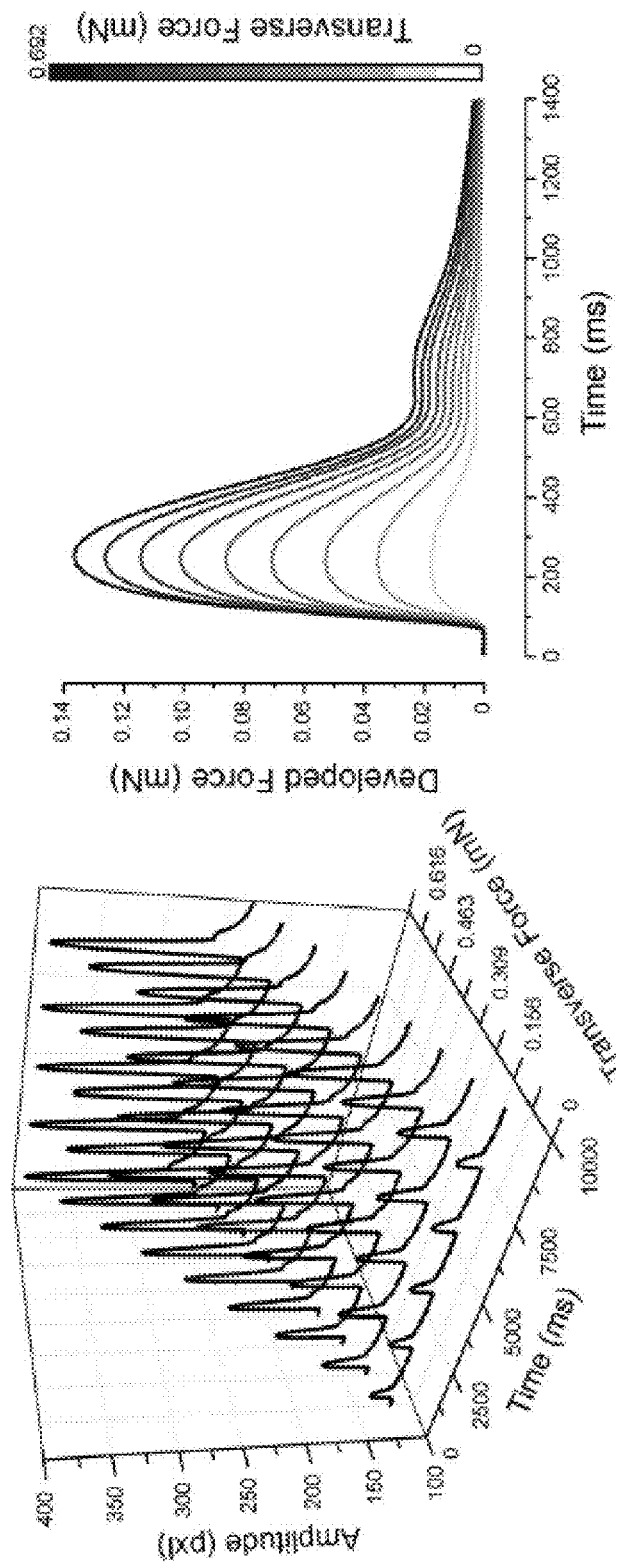
FIGS. 24A-24F show contractile properties of the ECTC.
Figures 24C, 24D:
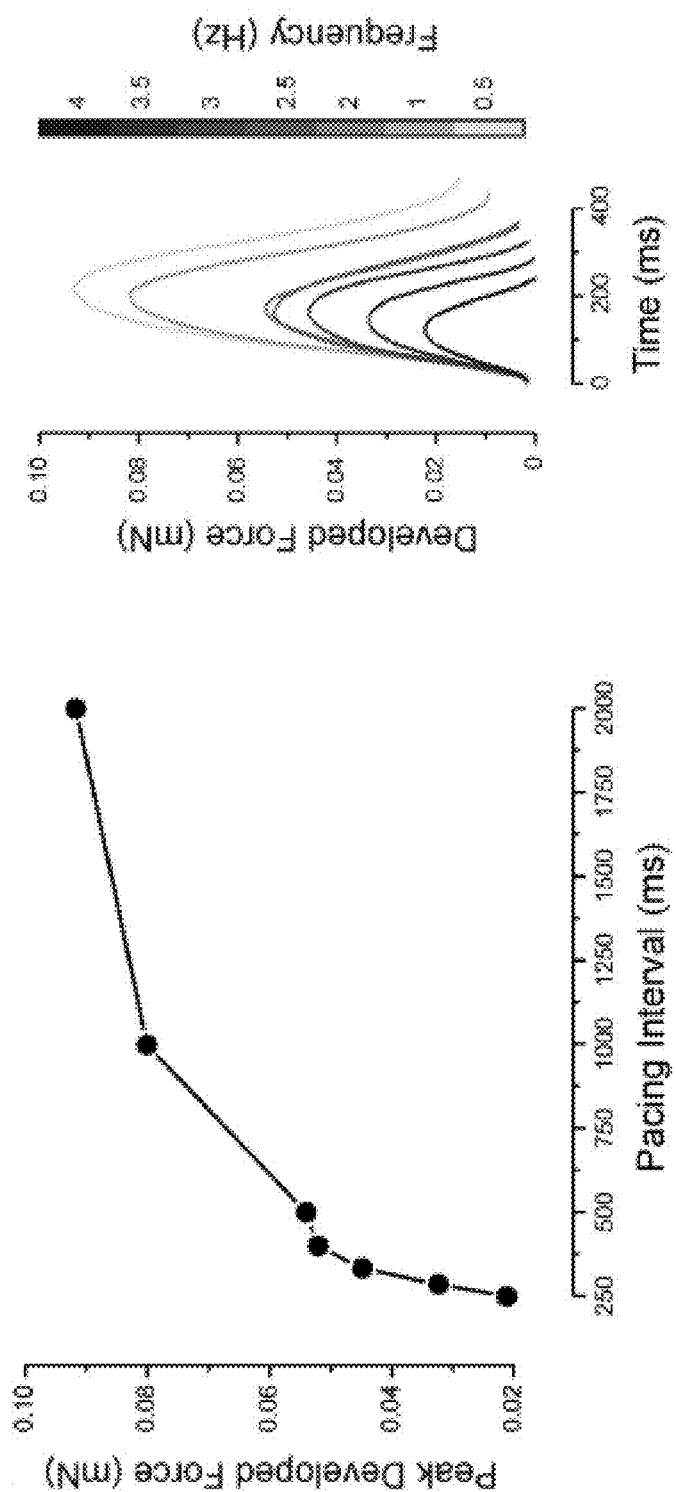

Method step 5. Data processing and analysis: The optical recordings of contracting ECTCs were imported as movies into MATLAB (MathWorks, Natick, Mass., USA) for the following analysis. First, the image contrast was adjusted to image only the tip of the flexible cantilever (FIG. 24C). Thereafter, the data were processed to create a binary (black and white) image (FIG. 24D). Then, the coordinates of the centroid were detected for each image in a binary movie data set. The resulting traces are depicted in FIG. 24A. To represent a single contraction, seven successive contractions in one recording were averaged. Movies showing contracting ECTCs at different tension and stimulation frequency and a binary movie demonstrating the displacement of only the flexible probe tip were prepared.

Using the optical measurement of the probe tip displacement, we computed the lateral displacement of the ECTC, the length of the anchored ECTC, the geometry of the probe placement, and the developed force in the ECTC as a function of time. The exerted force during contraction and relaxation is represented by the maximal force measured in the ECTC during contraction and the minimal force measured during relaxation, respectively. The developed force was shown by the change in the location of the probe tip over time. The maximum contraction velocity was determined as a maximum of the derivative of the contraction trace. ECTC stretch was calculated as a fraction of ECTC length change in relation to initial ECTC dimension. The cross-sectional area of the construct was computed based on the ECTC diameter as a mean value of three measurements: at the middle point of the ECTC and at two points 1 mm distant from the middle point on the left and right sides.

Method step 6. Calculation of elastic modulus: The described system can also be used to provide important information concerning the elastic properties of the ECTC. To estimate the contribution of the passive and active contractile elements in elasticity, the recordings were acquired before and after administration of 6 μM of blebbistatin in the same ECTCs. Blebbistatin is a reversible specific inhibitor of adenosine triphosphatase associated with myosin II isoforms and hence blocks active muscle contraction.

At first, the linear part of the ECTC stretch-force curve was fitted using a linear equation and the amount of change of ECTC length was calculated. The value of elastic modulus, E, was computed as a stress/strain ratio:

$$E = \frac{L_o F_C}{A_o \Delta L},$$

where $F_C$ is the longitudinal force exerted on the construct, $L_o$ is the length of the ECTC, $A_o$ is the cross-sectional area, and $\Delta L$ is the amount by which the length of the construct changed. Taking into account the geometry, we computed the elastic modulus using the equation $$E = \frac{2 L_o F_P \sqrt{(d_s - d_t)^2 + a^2}}{\pi D^2 \Delta L (d_s - d_t)},$$

where $F_P$ is the transverse force applied by the probe to the ECTC, $d_s$ is the distance between the initial and current position of the stage, $d_t$ is the distance between the initial and current position of the flexible probe tip, a is one-half the length of the resting construct, and D is the diameter of the ECTC.

Method step 7. Immunohistochemistry: After two weeks' incubation in the mold and after the measurements, the ECTC was fixed in 4% paraformaldehyde for 15 min, washed 3 times with PBS, processed, and embedded in paraffin blocks. The embedded ECTC was sliced into 5-μm sections. The antigens were retrieved by incubation sections at 94° C. in 10 mM sodium citrate buffer (pH 6.0) for 10 min. Antibodies were utilized as follows: mouse monoclonal antibodies against the heavy chain of myosin II (MF 20, 1:15, Developmental Studies Hybridoma Bank) and a rabbit polyclonal antibody specific for connexin 43 (H-150, 1:100, Santa Cruz Biotechnology, Dallas, Tex., USA). The secondary staining was conducted using goat anti-mouse Alexa 568-conjugated and donkey anti-rabbit Alexa 488-conjugated antibodies (Thermo Fisher Scientific, Waltham, Mass., USA) for MF 20 and H-150, respectively. Nuclear staining was performed using DAPI (DAPI Fluoromount-G, Southern Biotech, Birmingham, Ala., USA).

Method step 8. Statistical methods: Group data are presented as mean±SE. The statistical comparisons between two groups were made with an unpaired and paired Student's t-test. Values of P<0.05 were considered statistically significant. We utilized regression analysis to estimate the relationship between weight and displacement during calibration of the flexible probe.

Result 1. Structural and electrophysiological phenotype of the ECTC: We examined ECTCs that were created by mixing neonatal cardiac cells with Matrigel™/fibrinogen gel and thrombin and seeding them in PDMS casting molds at a final density of $4\times10^6$ cells/mL. At the beginning, the gel containing rounded cells distributed uniformly within the PDMS mold. As the cultured cells matured within the construct, they elongated, aligned along the long axis between two wires, remodeled and contracted the gel, and started synchronously beating after 5-6 days of culture. By the 10th-12th day of culture, the construct formed an elongated cardiac muscle of 300-400 μm in diameter. FIG. 22A illustrates H & E staining of the ECTC sectioned along the longitudinal axis, with the ECTC cross-section shown in the insert. One can see densely packed myofibers with elongated nuclei. ECTC immunostaining for myosin II heavy chain (FIG. 22B) illustrates even distribution of the cardiomyocytes across the preparation. Immunostaining using antibodies specific for electrical coupling protein connexin-43 (FIG. 22C) revealed consistent spreading of the gap junctions throughout the ECTC (FIG. 22C). The higher magnification in FIG. 22D shows elongated, longitudinally aligned cardiomyocytes (CMs) with a developed sarcomeric structure and colocalized gap junctions.

We characterized the electrophysiological properties of the ECTC using microelectrode measurements. The AP amplitude (APA) and resting potential were 86±3.4 mV and −67±4.1 mV (N=5) at a pacing interval (PI) of 2000 ms (FIGS. 23A-23C). The change of pacing rate from 2000 ms down to 500 ms significantly decreased APD from 236±28 ms to 177±12 ms, respectively (P<0.01).

Result 2. Mechanical restitution in the ECTC: FIGS. 24A-24F illustrate a typical experiment when contractility was measured as a function of applied transverse force (FIGS. 24A-24B) and pacing rate (FIG. 24C-24F). The gradual elevation of the applied force to 0.69 mN by gradual translation of the microscope stage resulted in both an extension of the ECTC (shift in base line) and an increase in contraction amplitude (Panel A). The Frank-Starling relationship is evident in FIG. 24B, when calibrated traces of a single contraction are superimposed.

Figure 24F:
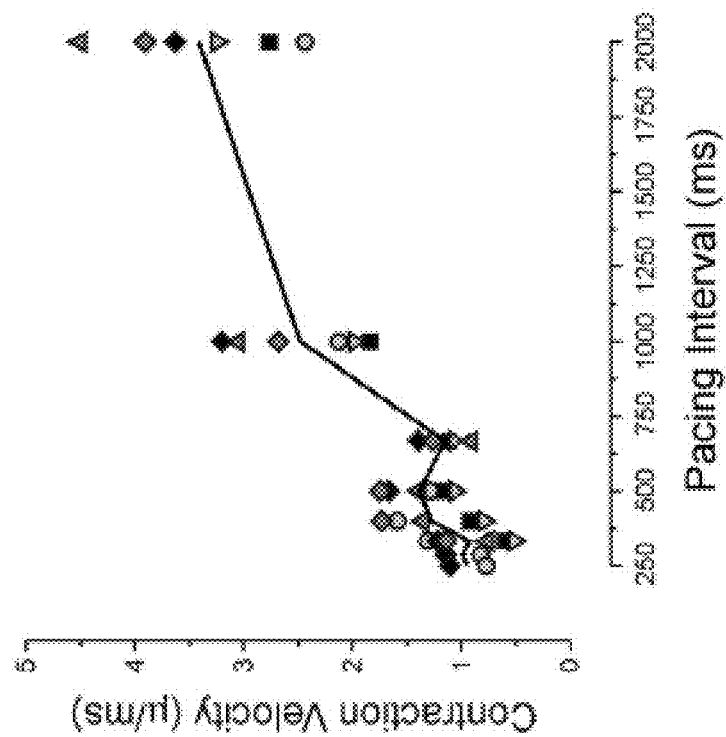

The contraction force of cardiac muscle depends on the previous recovery time. To examine the force-frequency relationship, the pacing rate was progressively increased from 0.5 Hz to 4 Hz. The characteristic time course of mechanical restitution and related contraction traces recorded in a single experiment are represented in FIGS. 24C and 24D. The amplitude of the contraction force decreases with an increase of the stimulation frequency, indicating behavior termed "negative staircase." FIG. 24E demonstrates the force-interval relationship including six different experiments. It should be noted that the mechanical restitution curve has a flat interval between PIs of 500 ms and 660 ms. The related dip in contraction velocity-interval curve occurs at a PI of 660 ms (FIG. 24F).

Figures 25A, 25B:
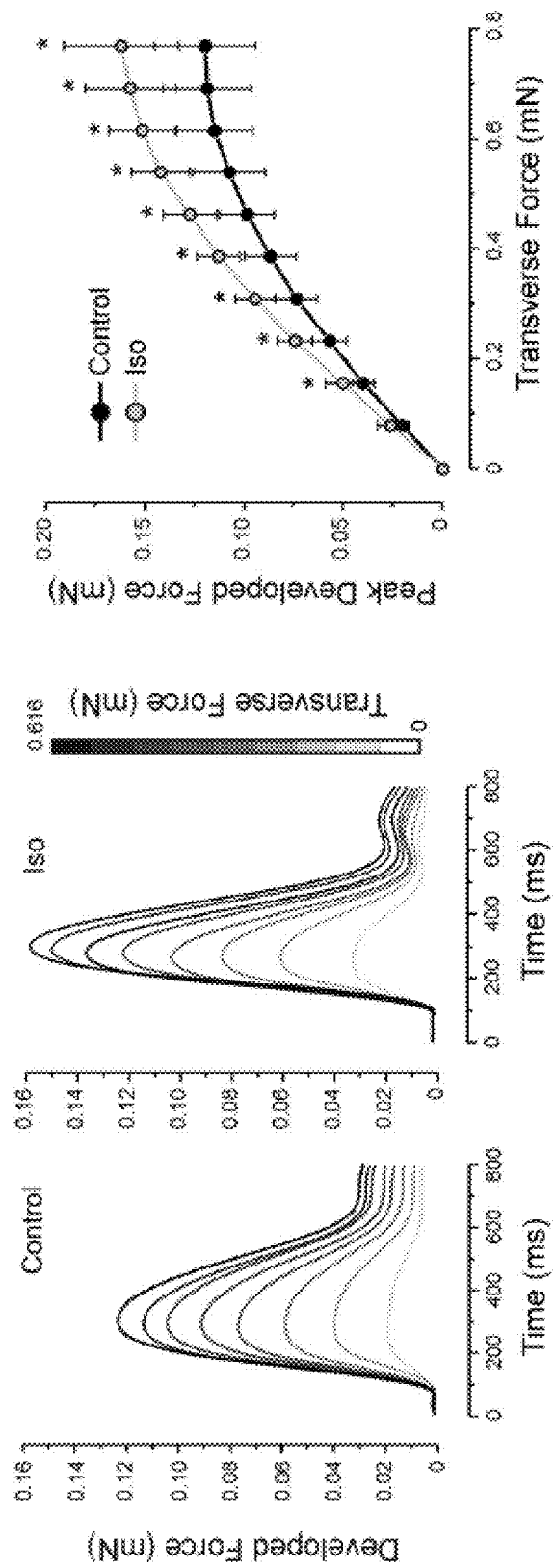
FIGS. 25A-25D show the inotropic response of the ECTC to β-adrenergic stimulation.
Figure 25D:
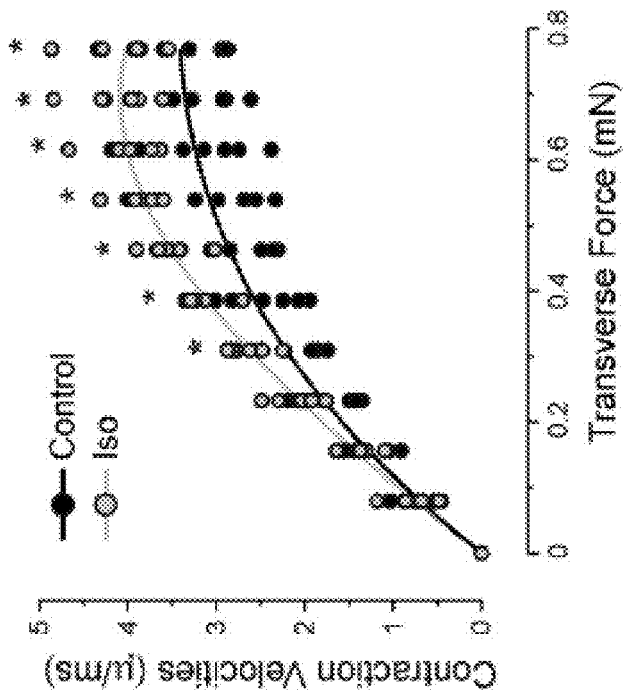
Figure 25C:
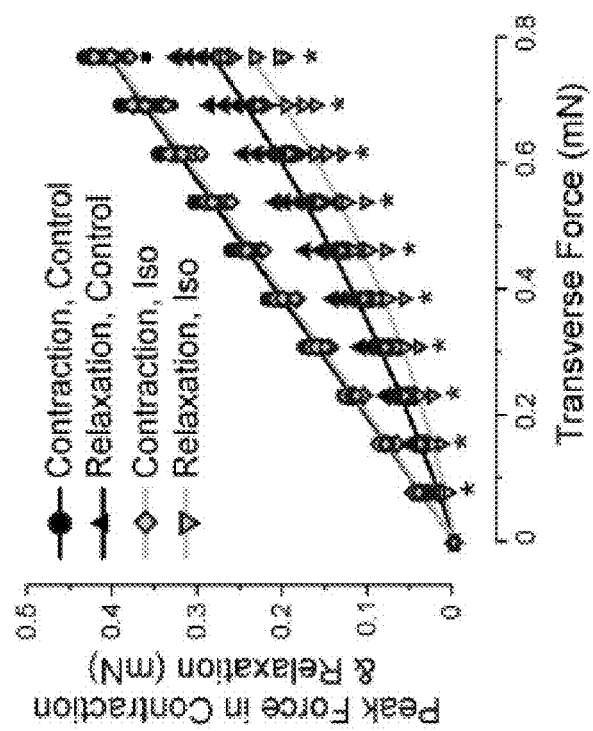

Result 3. Adrenergic stimulation: The most important regulation of cardiac inotropy is mediated by adrenergic stimulation. In the current work, we administered isoproterenol at a concentration of 1 μM to assess the degree of ECTC maturation and to validate the potential of ECTCs for investigation of the effects of pharmacological agents. The inotropic response of β-adrenergic stimulation is demonstrated in FIGS. 25A-25D. Application of the isoproterenol caused a significant increase of the developed force for applied transverse forces greater than 0.156 mN and statistically significant acceleration of the contraction velocity when the applied force exceeded 0.233 mN (P<0.05, N=7). The separate analysis of the effect of the β-adrenergic agonist on the force exerted by the ECTC during contraction and relaxation revealed that a significant change occurs only in the phase of relaxation, indicating that the drug-induced elevation of the developed force was offset almost exactly by the enhanced relaxation (FIG. 25C).

Figure 26A:
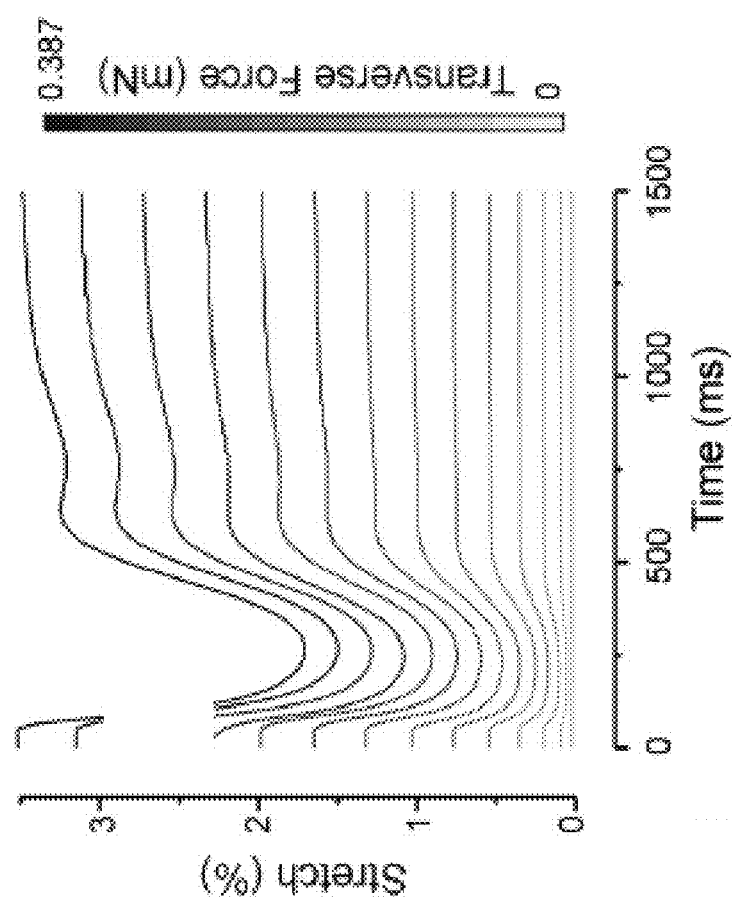
FIGS. 26A-26C show the change of ECTC elasticity in response to application of blebbistatin.
Figures 26B, 26C:
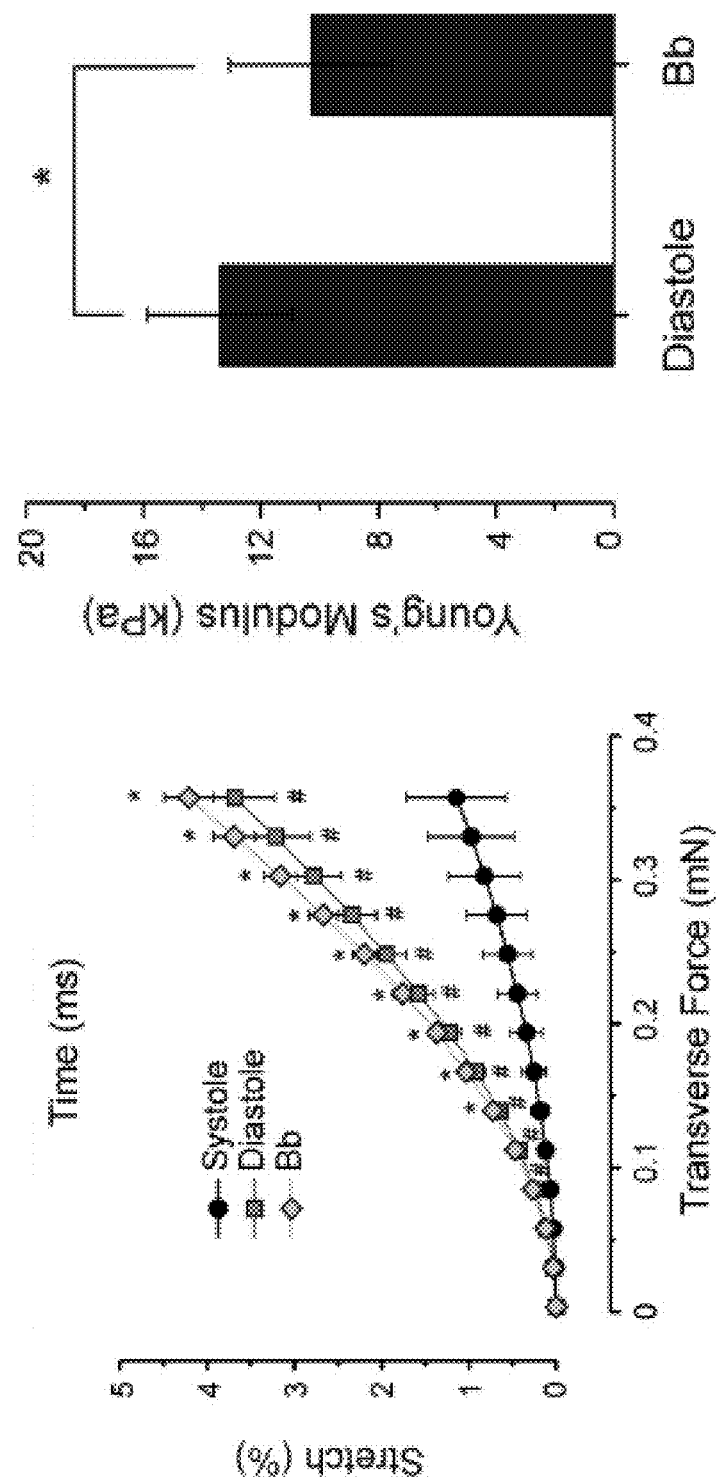
Figures 27A, 27B:
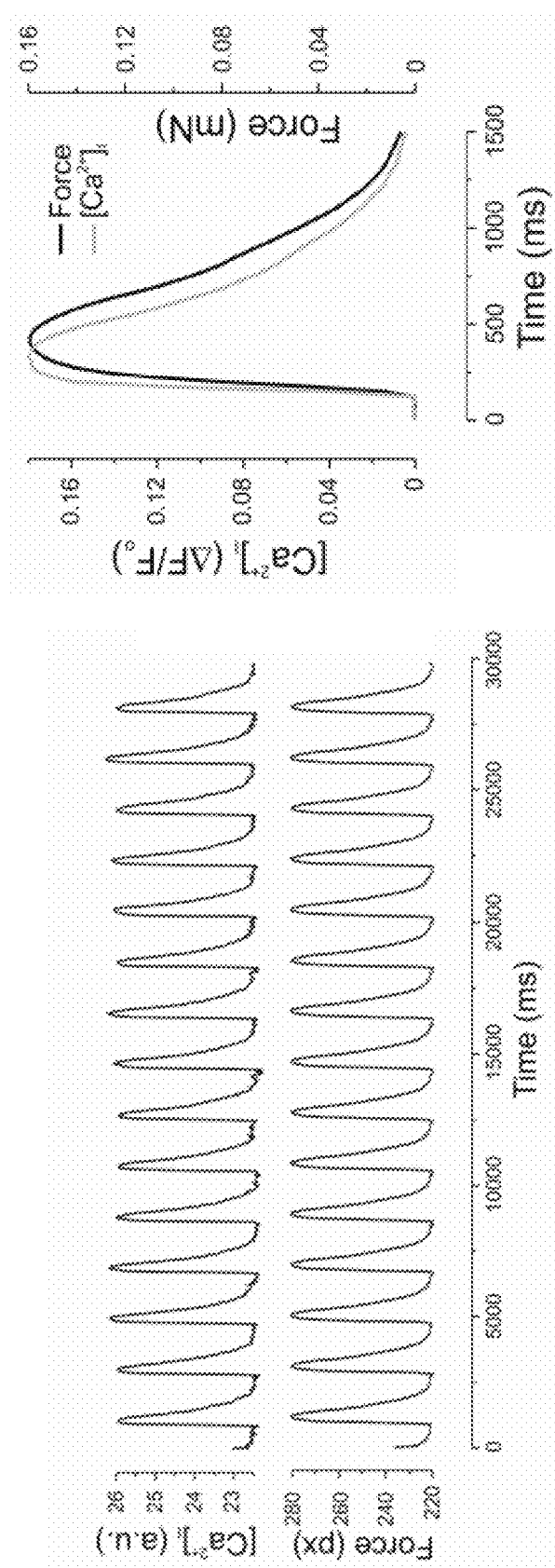
FIGS. 27A-27B show simultaneous recording of Fluo-4 $[Ca^{2+}]_i$ fluorescence and contraction in neonatal rat ECTC.
Figures 28A, 28B:
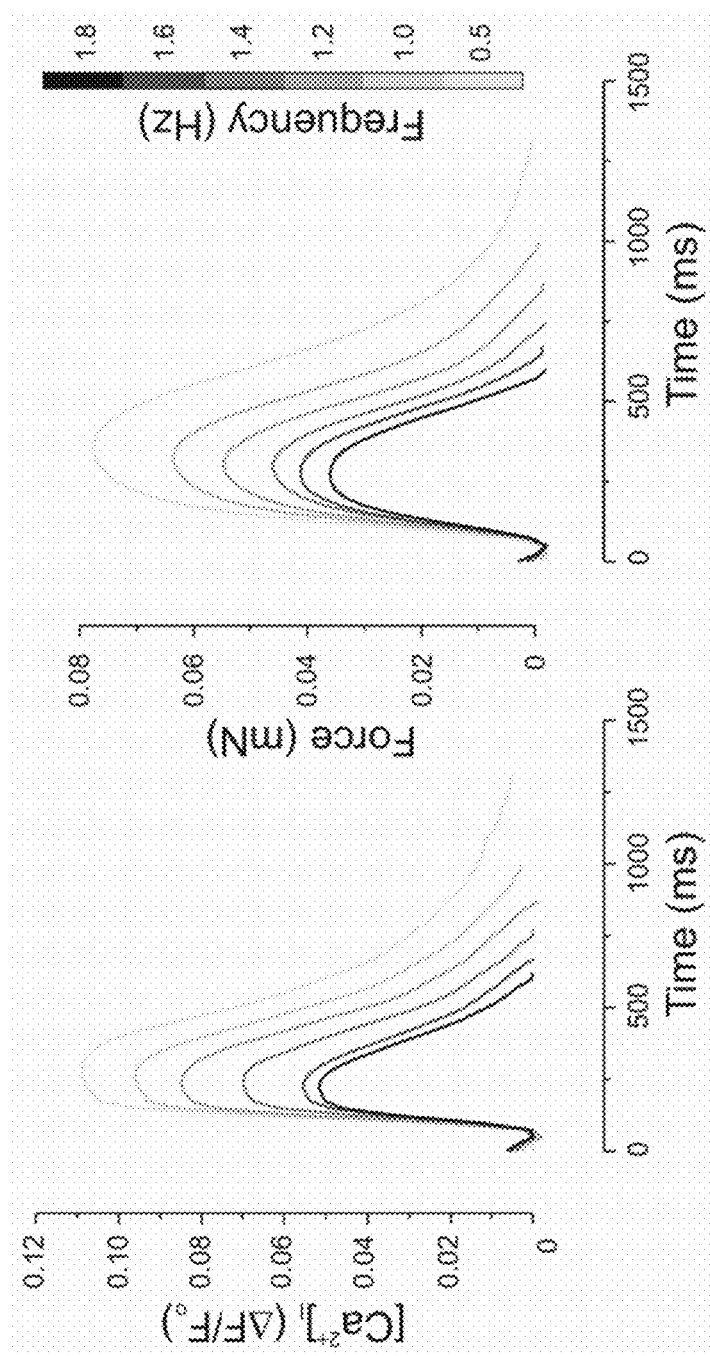
Figures 29A, 29B:
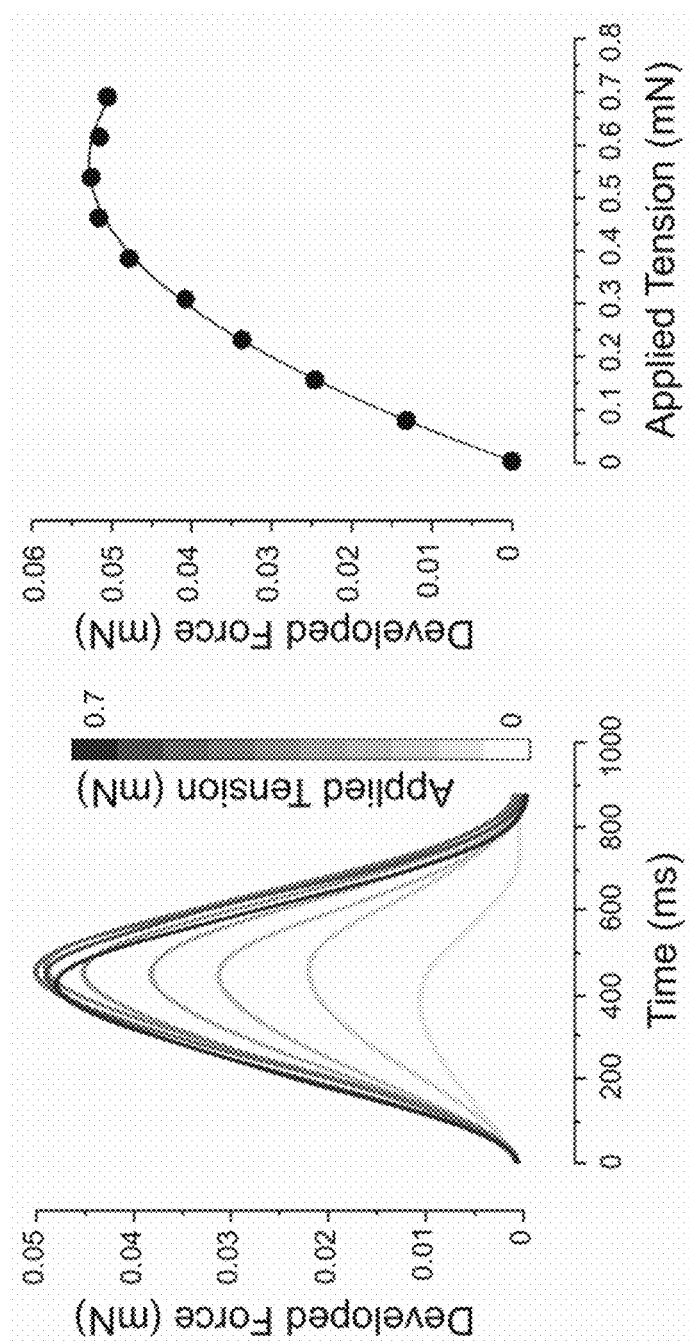
FIGS. 29A-29D show the effect of the applied tension (FIG. 29A and FIG. 29B) and pacing rate (FIG. 29C and FIG. 29D) on contractility in ECTC grown using hiPSC derived cardiomyocytes.
Figures 29C, 29D:
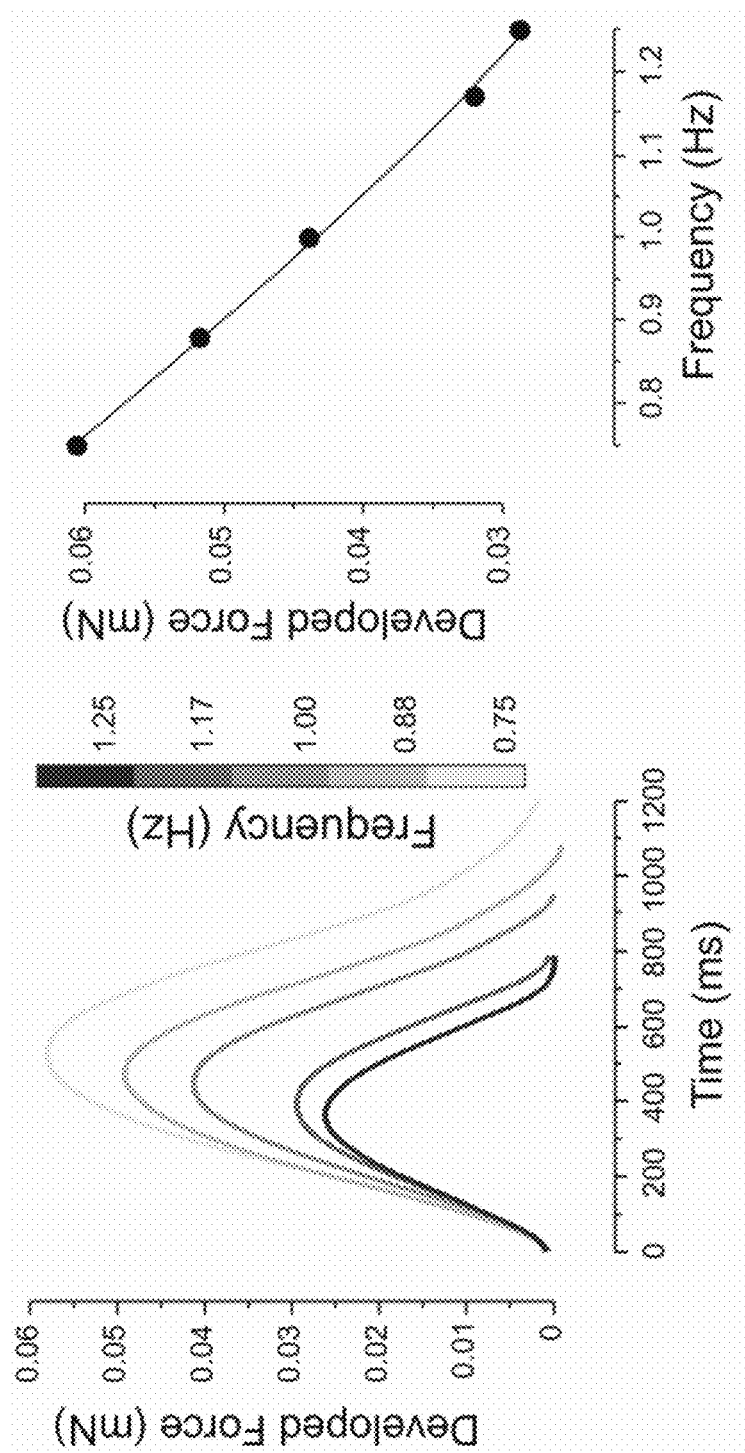
Figure 30B:
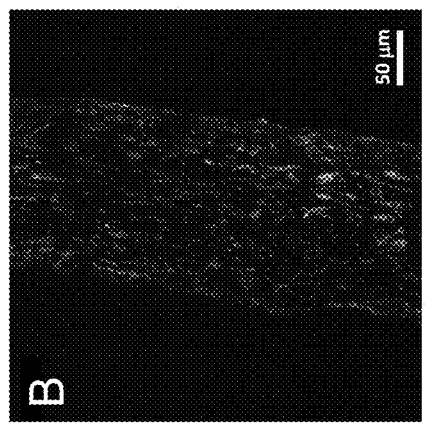
FIGS. 30A-30D show histological imaging of the tissue construct engineered from cardiac fibroblasts after 12 days of culturing.
Figure 30D:
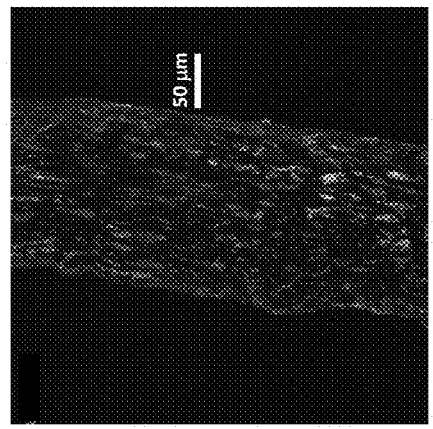
Figure 30A:
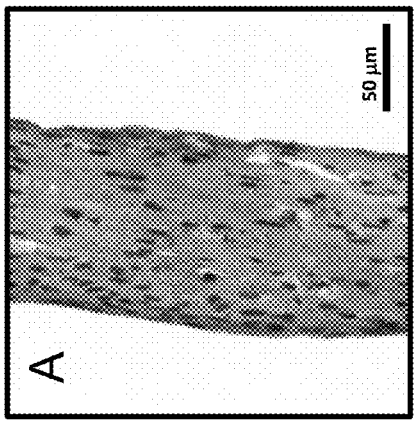
Figure 30C:
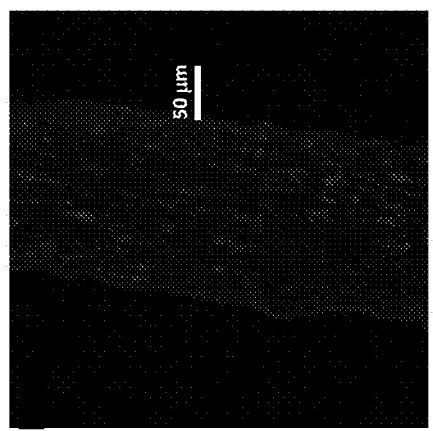
Figure 31B:
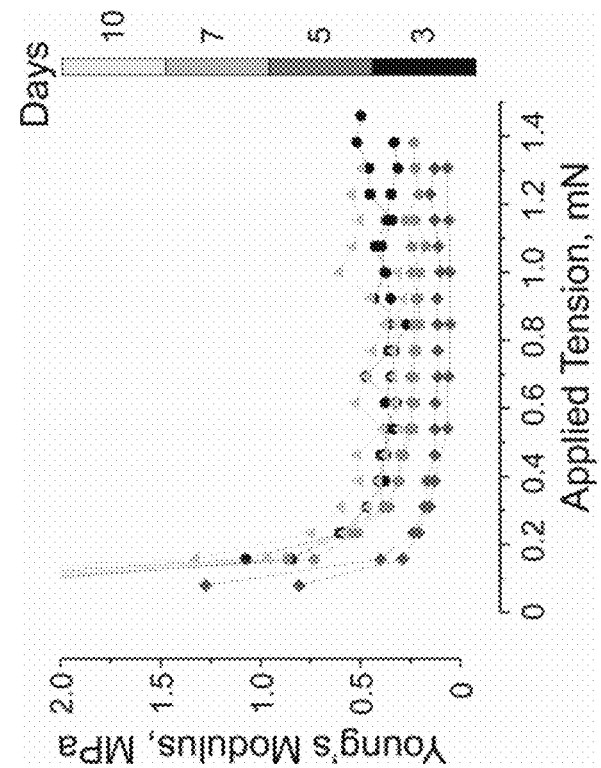
Figure 31A:
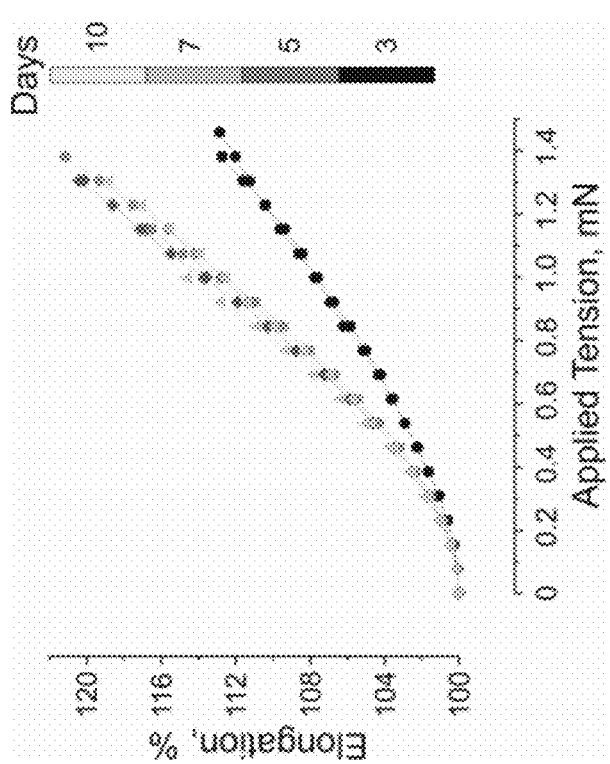

Result 4: Elasticity measurement: The elastic modulus of an object is defined as the slope of its stress-strain curve in the elastic deformation region. To measure the elastic properties of the ECTC, the stretch-stress curve was reconstructed and then the slope of the linear part of the curve was utilized to calculate Young's modulus. FIG. 26A illustrates a typical experiment showing how the length of the ECTC alters during contraction as a function of the tensional force. It is evident that extensions of the ECTC in both contraction and relaxation phases increase in relation to stress. The stretch-stress curves created for contraction and relaxation phases as well as for ECTCs treated with blebbistatin to block contraction are represented in FIG. 26B. A substantial elongation of the ECTC is observed when the tensional force is increased above 0.15 mN. All three conditions demonstrated progressive increase of ECTC length as the applied force was increased. The slopes of the fitted straight line for systolic, diastolic, and blebbistatin-treated ECTCs were 4.9, 15.1 and 17.5%/mN, respectively. FIG. 26C shows the effect of blebbistatin on elasticity of the ECTC more clearly. The treatment with 6 μM of blebbistatin significantly decreased the Young's modulus of the ECTC from 13.4±2.5 kPa to 10.3±2.8 kPa (FIG. 6C; N=5, P<0.05), a value that represented the intrinsic stiffness of the 3D construct.

Discussion: Characterization of ECTCs: To estimate the functionality of engineered 3D cardiac tissue, the majority of techniques incorporate measurements of the contractility using a force transducer or an optical system that records the deflection of a passive cantilever. The drawback of force transducer systems is that they record isometric contraction, in which the ends of the construct are fixed and muscle length cannot change and perform external work, which is the product of force times distance shortened. The weakness of prior systems based on optical recording of passive cantilever deflection is the inability to control the tensional force applied to the construct. Magnetically actuated microcantilevers have been used to control the applied forces, but this technology has yet to be extended to ECTCs.

Interpretation of I-Wire results: In this work we described the I-Wire platform we developed to grow 3D cardiac tissue constructs and to conduct measurements of their mechanical and electrophysiological parameters to estimate the functionality of the ECTC in both normal and pharmacologically modified conditions. The advantage of our approach over others that measure the passive deflection of PDMS posts is that we can control the force applied to the ECTC by the cantilever probe, and measure the passive and active responses to different applied transverse forces, all using a single ECTC. While the measurements we report on ECTCs could be accomplished with a force transducer and a linear actuator, as has been reported for skeletal muscle, these two instruments are both large and expensive and, like classical measurements of biomaterials elasticity, require the mounting of the construct in a separate instrument. In our approach, a low-cost mold with embedded wires is used to grow the ECTC, which need not be removed from the culture system for characterization. The wires can be used for electrical stimulation, either acutely during the measurement or chronically during culture. We are currently devising a compact system that can apply a steady, controlled mechanical force to each ECTC during culture, and it will be only a modest extension of this approach to implement a flexible, controlled cantilever that is dedicated to each construct in a well plate, thereby scaling this approach to at least medium throughput, with all measurements made in a closed, sterile incubator.

Our approach to form and characterize ECTC was assessed by utilizing neonatal rat cardiomyocytes (CMs) and a fibrin/Matrigel™-based extracellular matrix (ECM). After molding and 13-15 days of culture, the neonatal CMs had differentiated into highly functional 3D cardiac fibers with well-organized tissue and sarcomeric structure.

Figure 24E:
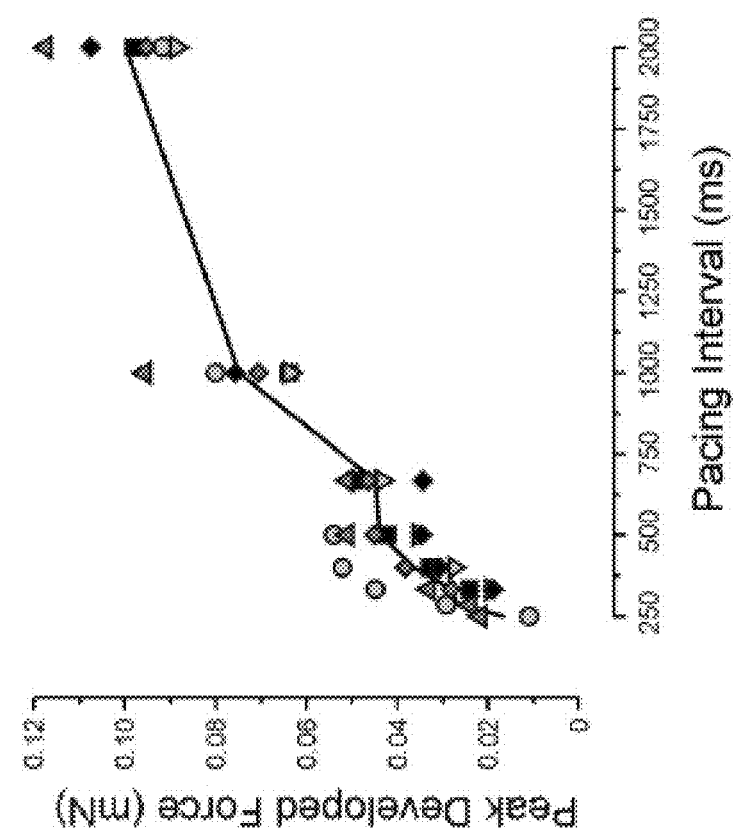

The electrical restitution curve recapitulated the restitution dynamic characteristic for native myocardium, which has a slope >1. Along with APD restitution, the mechanical restitution or force-frequency relationship is an essential inherent mechanism to regulate heart contractility. It is accepted that the integrated intracellular $Ca^{2+}$ change is generally responsible for the force-frequency relationship, and intracellular $Ca^{2+}$ dynamics are mainly determined by sarcoplasmic reticulum $Ca^{2+}$ load, L-type $Ca^{2+}$ channels, and $Na^+$—$Ca^{2+}$ exchanger. The mechanical restitution curves constructed from our measurements demonstrated two phases. The first phase of the negative staircase, when the increase in stimulation frequency reduced the developed force, was detected for pacing intervals longer than 660 ms. The subsequent transient plateau phase appeared in a range of 660-500 ms and was followed by a second phase of negative force-frequency relationship for a faster stimulation rate (FIG. 24E).

It should be noted that the behavior of the force-frequency relationship is markedly species-dependent. Most species exhibit positive staircase. In rabbit hearts the positive force-frequency relationship was observed during slow stimulation rates and staircase became negative when pacing rate was increased to physiological beating frequencies, thereby demonstrating biphasic mechanical restitution. The force-frequency relationship in rat and mouse myocardium change was the opposite: negative during slow pacing, up to 1-2 Hz, and positive for stimulation frequencies in a range of 1-4 Hz.

Bers et al. have suggested that due to high intracellular $Na^+$ in rat and mouse CMs, the reversal potential for $Na^+/Ca^{2+}$ exchanger is slightly lower than transmembrane potential, and that this facilitates $Ca^{2+}$ uptake during diastole and could result in negative staircase in rodent hearts detected at long pacing intervals. Recently, Godier-Furnémont et al. demonstrated that concurrent mechanical and electrical stimulations of the ECTC can determine the force-frequency relationship. In particular, stimulation with a frequency of 4 Hz for 5 days after day 8 of culture of ECTC grown from neonatal rat cardiomyocytes resulted in a positive staircase for pacing faster than 1 Hz, but stimulation with lower frequencies led to a negative staircase. The authors emphasize that the difference in formation of T-tubules and maturated sarcoplasmic reticulum underlies the observed phenomenon. It should be noted that because of an undeveloped vascular system, the fast pacing-induced metabolic starvation also could be responsible for the negative treppe effect at short stimulation intervals.

ECM, by linkage with the cytoskeleton and myofilaments through matrix receptors, is critical to maintain elasticity and to support the mechanical stress in the heart, hence remodeling of ECM and change of the cardiac tissue elasticity are often related with cardiac disease. There is also a strong relationship of CM maturation and contractility to the elasticity of ECM or substrate stiffness in vitro. In particular, Jacot et al. have shown that neonatal CMs plated on gels with an elasticity of 10 kPa demonstrated larger calcium transients, more developed sarcoplasmic calcium stores, and greater mechanical force than cells grown on stiffer or softer substrates. Another group found that to support function of the CMs isolated from chick embryos for a long time, the optimal matrix elasticity should be within 9-14 kPa. The elastic modulus determined in our measurements was 13.4 kPa. This value is between the lower number of 10 kPa considered as optimal for substrate to grow 2D cardiac tissue, and higher values of 18-25 kPa measured in normal rat heart muscle. The present results suggest that neonatal cardiac cells are able to form the I-Wire construct with a biomechanical microenvironment similar to that of normal heart muscle.

To modify the elasticity of the ECTC, we utilized blebbistatin, which inhibits both the adenosine triphosphatase and the gliding motility of myosin II. Specifically, it binds to the myosin-ADP-$P_i$ complex, impedes phosphate release, and thereby stabilizes the metastable state of myosin. The application of 6 μM of blebbistatin decreased ECTC stiffness by 23%. In experiments on isolated mice CMs using a carbon fiber system, King et al. observed significant lowering (30%) of the diastolic stress after application of the blebbistatin, suggesting that interaction between actin and myosin during diastole is not completely interrupted and that titin plays the key role in both restoration and passive stress of the intact CMs. In engineered tissue, the ECM, cell-to-cell and cell-ECM junctions, and the passive action of titin likely contribute to stiffness and could explain the lower effect of the blebbistatin in the ECTC.

The β-adrenergic stimulation predictably caused an increase in the developed force amplitude and velocity of contraction, but led to shortening of the contraction duration in the ECTCs (FIGS. 25 A-D). A separate analysis of the exerted force developed in systole and diastole revealed a significant effect of the isoproterenol only during the diastolic phase. This is consistent with effects of the β-adrenergic stimulation in native myocardium, wherein the phosphorylation of phospholamban and troponin I mostly contributes to enhanced diastolic relaxation.

It should be noted that Frank-Starling systems commonly apply a uniaxial tensional force, though the "classical" Starling's law describes the volume-pressure relationship in the whole heart. The length-tension relationship is considered a manifestation of this law at the cell or tissue level. The behavior of the Starling curve is mainly determined by actin-myosin interaction, and our system faithfully reproduces the physiological range of the length-tension relationship: the ascending limb and plateau. It is important to note that during the cardiac cycle the ventricular wall undergoes not only uniaxial but lateral force as well. This also relates to trabeculae on the endocardial surface. From this perspective we believe that our model closely reproduces in vivo physiology.

It is also important to recognize that the small diameter of our constructs (350-400 μm) and their being surrounded by media ensure that each myocyte is within 175-200 μm of well-oxygenated media, which should preclude the metabolic insufficiencies associated with thick, engineered muscle slabs. The classic studies on isolated papillary muscles, ventricular trabeculae, and cardiac Purkinje fibers have been conducted without the benefit of perfused microvasculature. Undoubtedly, we anticipate the development of vascularized or at least internally perfused constructs in the near future.

Conclusion: The optical registration of the flexible sensor movement allows quantitative measuring of contraction forces under different auxotonic loading conditions and pharmacological interventions. The quantitative measurements and modeling enabled by our I-Wire platform have great potential in pharmacology for new drug screening, cardiotoxicity, and basic science to investigate mechanisms of cardiac disease in both transgenic animal models and in human 3D cardiac tissue engineered from hiPSC-derived CMs. Obvious future extensions of the technique include its use with other mesenchymal cells and with CMs derived from the hiPSCs from both normal subjects and patients with cardiac disease, and fluorescent measurements of AP propagation along the fiber and the associated $Ca^{2+}$ signals. The small volume of fluid surrounding the ECTC is ideal for electrochemical measurements of glucose and lactate fluxes, oxygen consumption and acidification, and mass spectrometric measurements of cardiac metabolomics.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A system for applying and measuring tensions of a plurality of bio-object constructs, comprising:
   a base; and
   a flexible body disposed on the base, wherein the flexible body defines a plurality of construct holes for accommodating the plurality of bio-object constructs, such that when the flexible body is bent, the bending of the flexible body causes tensions to be applied to the plurality of bio-object constructs, thereby causing displacements of the plurality of bio-object constructs.

2. The system of claim 1, further comprising:
   a measuring mechanism configured to determine the displacements of one or more of the plurality of bio-object constructs when a force is applied to the flexible body, so as to measure the stiffness of one or more of the plurality of bio-object constructs according to the determined displacements.

3. The system of claim 2, further comprising:
   a plurality of plates,
   wherein the flexible body further defines a plurality of slots for receiving the plurality of plates, wherein the plurality of construct holes and the plurality of slots are alternatively positioned, such that when the plurality of plates moves, the movement of the plurality of plates causes the displacements of the plurality of bio-object constructs.

4. The system of claim 3, wherein each of the construct holes has a depth greater than a depth of each of the measuring slots.

5. The system of claim 1, wherein the flexible body is formed of a flexible gel.

6. A method for applying and measuring tensions of a plurality of bio-object constructs, comprising:
   providing a flexible body, wherein the flexible body defines a plurality of construct holes for accommodating the plurality of bio-object constructs, such that when the flexible body is bent, the bending of the flexible body causes forces to be applied to the plurality of bio-object constructs; and
   applying forces to the plurality of bio-object constructs, by bending the flexible body, thereby causing displacements of the plurality of bio-object constructs.

7. The method of claim 6, further comprising:
   determining the displacements of the plurality of bio-object constructs so as to measure the stiffness of the plurality of bio-object constructs according to the determined displacements.

8. The method of claim 7, wherein the flexible body further defines a plurality of slots for receiving a plurality of plates, wherein the plurality of construct holes and the plurality of slots are alternatively positioned, such that when the plurality of plates moves, the movement of the plurality of plates causes the displacements of the plurality of bio-object constructs.

9. The method of claim 8, wherein each of the construct holes has a depth greater than a depth of each of the measuring slots.

* * * * *